United States Patent [19]

Suganuma

[11] Patent Number: 5,477,099
[45] Date of Patent: * Dec. 19, 1995

[54] DRIVING DEVICE FOR ULTRASONIC WAVE MOTOR

[75] Inventor: Ryoichi Suganuma, Yokohama, Japan

[73] Assignee: Nikon Corporation, Tokyo, Japan

[*] Notice: The portion of the term of this patent subsequent to Nov. 3, 2012, has been disclaimed.

[21] Appl. No.: 319,737

[22] Filed: Oct. 7, 1994

Related U.S. Application Data

[62] Division of Ser. No. 970,956, Nov. 3, 1992, Pat. No. 5,376,855, which is a continuation of Ser. No. 653,701, Feb. 11, 1991, abandoned.

[30] Foreign Application Priority Data

Feb. 14, 1990 [JP] Japan ................................. 2-33460
Mar. 24, 1990 [JP] Japan ................................. 2-74794

[51] Int. Cl.⁶ .................................................. H01L 41/08
[52] U.S. Cl. .................................................. 310/316
[58] Field of Search .................... 310/316, 317, 310/323; 318/116

[56] References Cited

U.S. PATENT DOCUMENTS 4,743,788  5/1988  Takagi et al. ............................ 310/316
4,833,358  5/1989  Suzuki et al. ............................ 310/316
4,853,579  8/1989  Kawasaki et al. ....................... 310/116
5,376,855  12/1994 Suganuma ................................ 310/316

OTHER PUBLICATIONS

Patent Abstracts of Japan, unexamined applications, E field, vol. 13, No. 92, Mar. 3, 1989, The Patent Office Japanese Government, p. 95 E 722; (JP-A-63 268 474).

Patent Abstracts of Japan, unexamined applications, E field, vol. 12, No. 397, Oct. 21, 1988, The Patent Office Japanese Government, p. 8 E 673, (JP-A-63 140 678).

Primary Examiner—Mark O. Budd
Attorney, Agent, or Firm—Shapiro and Shapiro

[57] ABSTRACT

A driving device for an ultrasonic wave motor has a limit detecting circuit for that the drive voltage for the ultrasonic wave motor has reached a limit, and, in response, a drive voltage limiting circuit controls the drive voltage so as not to go beyond the limit value. Such control is conducted on the voltage or frequency of a signal for driving the ultrasonic wave motor. In another aspect of the invention, a drive state detecting circuit detects the drive state of the ultrasonic wave motor, and a drive frequency (or voltage) setting circuit controls the frequency (or voltage) of a signal for driving the ultrasonic wave motor so as to attain the maximum efficiency in the motor, based on the output of the drive state detecting circuit.

4 Claims, 44 Drawing Sheets

1: VOLTAGE DETECTING CKT
2: UPPER LIMIT DETECTING CKT
3: LOWER LIMIT DETECTING CKT
4: DRIVE VOLTAGE SETTING CKT

FIG. 25

| INPUT LEVEL OF MPX CONTROL TERMINAL | | | SELECTED MPX INPUT |
|---|---|---|---|
| X INPUT | Y INPUT | Z INPUT | |
| OUTPUT OF UPPER LIMIT DETECTING CKT. | OUTPUT OF LOWER LIMIT DETECTING CKT. | START INPUT | |
| — | — | LOW | INPUT D |
| HIGH | HIGH | HIGH | INPUT B |
| LOW | HIGH | HIGH | INPUT C |
| HIGH | LOW | HIGH | INPUT A |

1: VOLTAGE DETECTING CKT
2: UPPER LIMIT DETECTING CKT
3: LOWER LIMIT DETECTING CKT
4: DRIVE VOLTAGE SETTING CKT

1: VOLTAGE DETECTING CKT
2: UPPER LIMIT DETECTING CKT
3: LOWER LIMIT DETECTING CKT
5A: DRIVE FREQUENCY SETTING CIRCUIT

F I G. 37
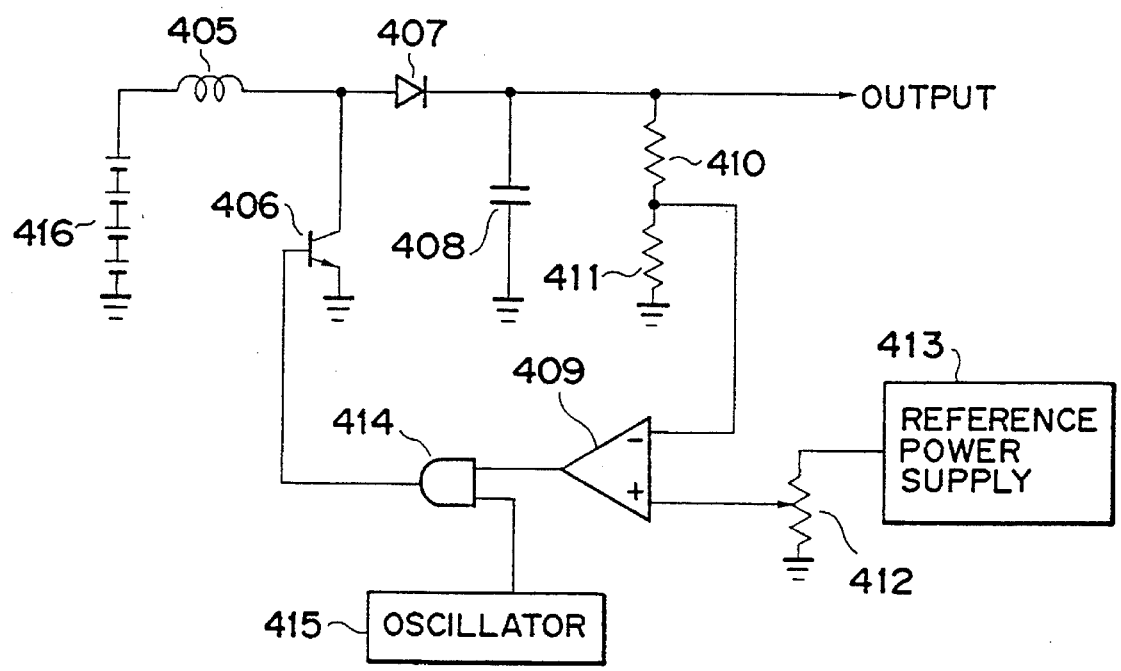

402 OUTPUT VOLTAGE

DRIVING DEVICE FOR ULTRASONIC WAVE MOTOR

This is a division of application Ser. No. 07/970,956 filed Nov. 3, 1992, now U.S. Pat. No. 5,376,855 which is a continuation of application Ser. No. 07/653,701 filed Feb. 11, 1991, (abandoned).

BACKGROUND OF THE INVENTION

1. Field of the Invention

The present invention relates to a driving device for an ultrasonic wave motor for driving a movable member by means of a travelling vibration wave generated in an elastic member by a piezoelectric member.

2. Related Background Art

Conventionally there have been proposed various types of driving devices for the ultrasonic wave motor.

At first the structure of an ultrasonic wave motor will be briefly explained with reference to the attached drawings. FIG. 1 is a cross-sectional view of an ultrasonic wave motor, in which a rotor (movable member) is composed of a main rotor member 100-1 and a sliding member 100-2 which are mutually adhered. Also a stator is composed of an elastic member 100-3 and a piezoelectric member 100-4 which are mutually adhered. Said rotor and stator are maintained in mutual pressure contact to constitute said ultrasonic vibration motor.

FIG. 2 is a view showing the arrangement of electrodes in said piezoelectric member 100-4. Input electrodes 100-4a, 100-4b receive AC drive voltages of a mutual phase difference of $\pi/2$. A common electrode 100-4c is grounded. A monitor electrode 100-4d does not contribute to the oscillation of the elastic member but provides an AC output voltage corresponding to the vibration state of the stator.

Thus the ultrasonic wave motor consists of the main rotor member, sliding member, elastic member and piezoelectric member explained above. The structure and function of such motor will not be explained in detail as they are already known for example from the U.S. Pat. No. 4,510,411. In brief, drive voltages are supplied to said electrodes 100-4a, 100-4b of the piezoelectric member to oscillate said member, thereby generating a travelling vibration wave in the elastic member, and driving said rotor maintained in pressurized contact with said stator by pressurizing means (not shown).

A drive control device for such ultrasonic wave motor is already disclosed for example in the Japanese Laid-open Patent Appln. Nos. 59-204477 61-251490. These drive control devices are either (1) to control the frequency of the drive voltage signals according to the voltage obtained from the monitor electrode 100-4d, or (2) to control the frequency of the drive voltage signals according to the phase difference between the wave form of the drive voltage signals applied to the piezoelectric member 100-4 and that of the voltage signal obtained from the monitor electrode 100-4d.

In addition, for driving such ultrasonic wave motor, there have been proposed various methods by varying the drive voltage or by varying the drive voltage and the drive frequency, as disclosed for example in the Japanese Laid-open Patent Appln. Nos. 61-124275 and 62-19276.

In the drive control of the ultrasonic wave motor, it is known that the drive speed of the motor becomes unstable or the motor generates abnormal noises if the frequency of the drive voltages applied to the drive electrodes, namely the drive frequency, is selected close to the resonance frequency specific to the ultrasonic wave motor. It is also known that the motor loses the drive speed rapidly and enters a very unstable operation state if the drive frequency is selected lower than said resonance frequency.

FIG. 3 shows the relationship between the drive frequency and the drive speed of the ultrasonic wave motor, in which F1 indicates the resonance frequency specific to the ultrasonic wave motor. By dividing the entire frequency range into regions a and b by a drive frequency F3 slightly higher than said resonance frequency F1, the drive frequency region a suffers the above-mentioned abnormalities in the drive, while the drive frequency region b from said frequency F3 to a higher frequency F2 where the drive speed approaches to zero provides stable drive control. The conventional drive control devices for the ultrasonic wave motor effects the drive control within such frequency region b.

However the present applicant has experimentally confirmed that the following drawbacks are encountered even when the ultrasonic wave motor is driven with a frequency within said frequency region b allowing stable drive control:

(1) When the drive voltage is increased beyond a certain value (hereinafter called upper limit), the motor shows unstable drive speed or generates abnormal noises. This is presumably due to an undesirable relationship between the stator and the rotor maintained in pressure contact by the pressurizing means, induced when the amplitude of the travelling vibration wave exceeds a certain value;

(2) On the other hand, when the drive voltage is decreased beyond a certain value (hereinafter called lower limit), the operation of the ultrasonic wave motor becomes unsmooth and the motor may eventually stop. This phenomenon is presumably due to a fact that the oscillating force generated by the piezoelectric member cannot overcome the pressurizing force of the pressurizing means, due to the influence of the load, in the contact portions of the stator and the rotor, when the amplitude of the travelling vibration wave becomes smaller than a certain value.

Thus, in the speed control of the ultrasonic wave motor, the drive frequency may become positioned outside the region b providing stable drive because of the above-mentioned drawbacks if the drive voltage exceeds the upper limit or decreases beyond the lower limit. Thus the drive frequency enters the region a involving the above-mentioned unstable drive state, thus rendering the function of the ultrasonic wave motor unstable.

In addition, in case the drive voltage is given to the drive electrode of the motor from a power amplifier through a coil or a transformer provided therebetween, a resonance is generated between the inductance of such coil or transformer and the capacitance of the piezoelectric member, whereby the drive voltage on the drive electrode may fluctuate depending on the drive frequency even if the output voltage of the power amplifier is maintained constant. As a result, even if the drive frequency is selected at the middle of the region b, the drive frequency may be shifted from the stable region b due to fluctuation in the drive voltage, whereby the function of the ultrasonic wave motor may become unstable due to such unstable drive frequency.

A first aspect of the present invention, to be explained later, is to control the magnitude of the drive voltage between the upper and lower limits thereby driving the ultrasonic wave motor in stable manner.

However, the conventional drive devices for the ultrasonic wave motor are still associated with a drawback that they cannot constantly provide a high driving efficiency even when a stable drive state is obtained, as will be explained in the following with reference to the attached drawings. FIG. 4 shows the drive current, drive speed and drive efficiency as a function of drive frequency, under a drive voltage of 25 VRMS and a load torque of 900 g.cm, measured by the present inventor. From a lower frequency side, the drive current reaches a maximum at a drive frequency F0, then decreases to reach a minimum at a drive frequency F4, and gradually increases again at the higher frequency side. On the other hand, the drive speed is highest at a frequency F1, and decreases both at the higher or lower drive frequency sides. The frequency region usually used for driving the ultrasonic wave motor is at the higher frequency side of said frequency F1. The drive efficiency is highest in the vicinity of the drive frequency F4 where the drive current is lowest. As will be understood from these facts, the drive efficiency becomes highest in the vicinity of the frequency F4 within a frequency region higher than the frequency F1, and the conventional drive devices are unable to constantly provide the high drive efficiency since they are not designed to control the drive frequency at the highest efficiency.

Therefore, a second aspect of the present invention, to be explained later, is to provide a driving device for the ultrasonic wave motor, capable of improving the drive efficiency thereof.

SUMMARY OF THE INVENTION

At first there will be explained a first embodiment of the present invention, which is applicable to a driving device for an ultrasonic wave motor consisting of a stator for generating a travelling vibration wave in an elastic member by the oscillation of a piezoelectric member, and a rotor maintained in pressure contact with the stator by pressurizing means and adapted to be driven by said travelling vibration wave, and particularly to a driving device for achieving the drive control by a variable drive voltage.

The aforementioned object can be attained by the magnitude of the use of lower limit detecting means for detecting that the drive voltage has reached the lower limit, and first drive voltage limiting means adapted, in response to the detection of the drive voltage at the lower limit by said lower limit detecting means, for maintaining the drive voltage at said lower limit or increasing the drive voltage. There may be further provided upper limit detecting means for detecting that the drive voltage magnitude has reached the upper limit, and second drive voltage limiting means adapted, in response to the detection of the drive voltage at the upper limit by said upper limit detecting means, for maintaining the drive voltage at said upper limit or decreasing the drive voltage.

The present invention is also applicable to a driving device for achieving the drive control by a variable drive frequency.

In this case the aforementioned object can be attained by the use of lower limit detecting means for detecting that the magnitude of the drive voltage of the ultrasonic wave motor has reached a lower limit, and third drive voltage limiting means adapted, in response to the detection of the drive voltage at said lower limit by said lower limit detecting means, for controlling the drive frequency so as to maintain the drive voltage at said lower limit or to increase the drive voltage. There may be further provided upper limit detecting means for detecting that the drive voltage magnitude has reached an upper limit, and fourth drive voltage limiting means adapted, in response to the detection of the drive voltage at said upper limit by said upper limit detecting means, for controlling the drive frequency so as to maintain the drive voltage at said upper limit or to decrease said drive voltage.

In the following there will be explained the function of the above-explained driving device for the ultrasonic wave motor.

In case of voltage control of the motor, if the lower limit detecting means detects that the drive voltage is at the lower limit, the first drive voltage limiting means either maintains the drive voltage at said lower limit or increases the drive voltage. If the upper limit detecting means detects that the drive voltage is at the upper limit, the second drive voltage limiting means either maintains the drive voltage at said upper limit or decreases the drive voltage.

In case of frequency control of the motor, if the lower limit detecting means detects that the drive voltage is at the lower limit, the third drive voltage limiting means controls the drive frequency so as to maintain the drive voltage at said lower limit or to increase the drive voltage, thereby limiting the drive voltage. Also if the upper limit detecting means detects that the drive voltage is at the upper limit, the fourth drive voltage limiting means controls the drive frequency so as to maintain the drive voltage at said upper limit or to decrease the drive voltage, thereby limiting the drive voltage.

In this manner the drive voltage is controlled between the upper and lower limits, thereby driving the ultrasonic wave motor in stable manner.

In the following there will be explained a second embodiment of the present invention. In said second embodiment, the driving device of the present invention for the ultrasonic wave motor is so constructed that the drive state of the ultrasonic wave motor is constantly detected by drive state detecting means, and drive frequency setting means sets the drive frequency for the motor at a value maximizing the drive efficiency, or drive voltage setting means sets the drive voltage for the motor at a value maximizing the drive efficiency. Thus, in the second embodiment of the present invention, there is provided a driving device for an ultrasonic wave motor utilizing ultrasonic vibration and including an elastic member and a piezo electric member with at least a pair of input electrodes for oscillating said elastic member, the driving device comprising drive frequency setting means for setting the drive frequency for said ultrasonic wave motor;

phase shifting means for releasing cyclic signals with a mutual phase difference, based on the output of said drive frequency setting means;

drive voltage setting means for setting the cyclic signals, released from said phase shifting means, at a voltage required to drive said ultrasonic wave motor; and drive state detecting means for detecting the drive state of said ultrasonic wave motor and sending an output to said drive frequency setting means, wherein said drive frequency setting means is adapted to set the drive frequency for said ultrasonic wave motor at a value maximizing the drive efficiency of said motor with respect to said voltage, based on the output of said drive state detecting means. There is also provided a driving device for an ultrasonic wave motor utilizing ultrasonic vibration and including an elastic member and a piezo-electric member with at least a pair of input electrodes for oscillatingsaid elastic member, the driving device comprising;

drive frequency setting means for setting the drive frequency for said ultrasonic wave motor;

phase shifting means for releasing cyclic signals with a mutual phase difference, based on the output of said drive frequency setting means;

drive voltage setting means for setting the cyclic signals, released from said phase shifting means, at a voltage required to drive said ultrasonic wave motor; and drive state detecting means for detecting the drive state of said ultrasonic wave motor and sending an output to said drive voltage setting means;

wherein said drive voltage setting means is adapted to set the drive voltage for said ultrasonic wave motor at a value maximizing the drive efficiency of said motor with respect to said cyclic signals, based on the output of said drive state detecting means.

As explained in the foregoing, it is clarified from the experiment of the present inventor that the ultrasonic wave motor can be constantly driven with a high efficiency by maintaining the drive frequency at a value F4 shown in FIG. 4. At said drive frequency the magnitude of the drive current becomes minimum and the drive efficiency becomes maximum. FIG. 5 is an equivalent circuit diagram of the ultrasonic wave motor, wherein C0 is the self capacitance of the motor, and a serial resonance circuit is composed of L, C and R. When the ultrasonic wave motor is in the resonance state, said serial resonance circuit is considered also in a resonance state, and, in such case the impedance becomes minimum and the current flowing into said equivalent circuit becomes maximum as already known. Also as already known, such serial resonance circuit has an antiresonance frequency, and, with an input of such antiresonance frequency, the impedance becomes maximum and the flow-in current becomes minimum. Based on these facts, the aforementioned drive frequency F0 is considered as the resonance frequency of the ultrasonic wave motor, and the drive frequency F4 is considered as the antiresonance frequency of said motor because the drive current becomes minimum. Consequently, a high-efficiency drive of the ultrasonic wave motor can be achieved by maintaining the drive frequency therefor at the antiresonance frequency specific to said motor. The antiresonance frequency means a frequency providing a minimum drive current at the currently used drive voltage.

As explained above, constantly efficient drive of the ultrasonic wave motor can be achieved by constantly matching the drive frequency of the motor with said antiresonance frequency. Even if complete matching is difficult to achieve, a considerably high drive efficiency can be obtained for example by setting the drive frequency in a frequency range C in the vicinity of the antiresonance frequency as shown in FIG. 4. Said range C may be so selected that the drive frequency is at least equal to 0.8× the maximum efficiency.

Instead of setting the drive frequency at a single value, it is naturally possible to set the drive frequency in a range corresponding to said range C including the antiresonance frequency F4.

Also the experiments of the present inventor have confirmed that the drive frequency F4 providing the minimum drive current and the maximum drive efficiency varies with a change in the drive voltage. FIG. 6 is a chart showing the relationship between the drive speed and the drive frequency when the drive voltage is changed from 15 to 35 VRMS, indicating that the drive speed becomes higher with the increase in the drive voltage. FIG. 7 is a chart indicating the change in the resonance frequency F0 and the antiresonance frequency F4 at the drive voltages shown in FIG. 6. The drive frequency F4 providing the minimum drive current and the maximum drive efficiency moves to a lower frequency with the increase in the drive voltage, while the drive frequency F0 providing the maximum drive current is little affected by the drive voltage, so that the difference between the frequencies F4 and F0 decreases with the increase in the drive voltage. This phenomenon is not clearly explained at present, but is presumed to be based on a change in the resonance characteristics of the motor depending on the drive voltage. Also the reason why the maximum drive speed is not obtained at the drive frequency where the drive current becomes maximum is not yet clarified, but is presumably based on the unstable operation of the elastic vibrating member in the vicinity of the resonance frequency and on fluctuations in performance and errors in positions of the two driving electrodes of the piezoelectric member. FIG. 8 shows the drive speed at the drive frequency F4, at different drive voltages shown in FIG. 6. As will be apparent from FIG. 7, a constantly high drive efficiency cannot be obtained with a constant drive frequency if the drive voltage varies. It is however possible to drive the ultrasonic wave motor in stable manner and to constantly obtain a high drive efficiency, by setting the drive frequency at the antiresonance frequency F4 corresponding to the current drive voltage.

Based on the foregoing facts, a driving method for the ultrasonic wave motor with variable drive voltage and with drive frequency selected at the antiresonance frequency corresponding to said drive voltage will enable arbitrarily regulating the drive speed and constantly achieving a high drive efficiency at the arbitrarily regulated drive speed.

It is also possible to regulate the drive speed by a change in the drive frequency and to constantly obtain a high drive efficiency by controlling the drive voltage in such a manner that said drive frequency corresponds to the antiresonance frequency.

In the following there will be explained methods for constantly maintaining the drive frequency at the antiresonance frequency F4.

A first method is based on the control of the drive frequency, according to the phase difference $\phi m$ between the drive voltage of the ultrasonic wave motor and the output voltage of the monitor electrode 100-4$d$. This will be explained with reference to FIG. 9, showing the drive speed and said phase difference $\phi m$ as a function of the drive frequency, under a drive voltage and a load torque same as in FIG. 4. A curve $\phi m1$ corresponds to a case in which the input voltage to the electrode 100-4$a$ shown in FIG. 2 is advanced by 90° in comparison with that to the electrode 100-4$b$, and indicates the phase difference between the drive voltage to said input electrode 100-4$a$ and the output voltage of said monitor electrode. A curve $\phi m2$ corresponds to a case in which the input voltage to the electrode 100-4$b$ is advanced by 90° in comparison with that to the electrode 100-4$a$, with an opposite driving direction. The antiresonance frequency F4 is where the drive efficiency becomes maximum, and $\phi m11$ and $\phi m21$ indicate phase differences at said frequency F4. From this chart it will be understood that the drive frequency can be matched with the antiresonance frequency, by controlling the drive frequency so as to satisfy a condition $\phi m1 = \phi m11$ or $\phi m2 = \phi m21$. FIG. 10 shows the phase difference $\phi m$ at the antiresonance frequency, at different drive voltages. It will be understood that the phase difference $\phi m$ between the drive voltage at the antiresonance frequence and the output voltage of the monitor electrode substantially remains constant at $\phi m11$ or $\phi m21$ in spite of the change in drive voltage. It is therefore possible to maintain the drive frequency at the antiresonance frequency constantly by controlling the drive frequency so as to satisfy the condition $\phi m1=\phi m11$ or $\phi m2=\phi m21$, thereby achieving a high efficiency in the drive of the ultrasonic wave motor.

A 2nd method is to control the drive frequency at the antiresonance frequency, based on the output voltage VM of said monitor electrode. FIG. 11 shows the drive speed and said output voltage VM of the monitor electrode as a function of the drive frequency of the ultrasonic wave motor, under a drive voltage and a load torque same as in FIG. 4 or in the 1st method explained above. Said output voltage VM varies according to the drive frequency, and assumes a value VMN at the antiresonance frequence F4. Thus the drive frequency can be matched with the antiresonance frequency by controlling the drive frequency so as to satisfy a condition VM=VMN. However, as the condition VM=VMN may be satisfied at a drive frequency lower than the frequency providing the maximum speed of the motor, said condition VM=VMN is to be satisfied at a drive frequency at least higher than the drive frequency F1 where the drive speed becomes maximum. FIG. 12 shows the change of VMN as a function of the drive voltage. By establishing the relationship between the drive voltage and VMN beforehand, the ultrasonic wave motor can be constantly driven with the antiresonance frequency even in the presence of variation in the drive voltage, by controlling the drive frequency in such a manner that VM corresponds to said drive voltage, and a high drive efficiency can therefore be assured.

A 3rd method is, in case of providing the motor with the driving power through inductive elements connected to the input electrodes 100-4a, 100-4b as shown in FIG. 13, to match the drive frequency with the antiresonance frequency by detecting the phase difference $\phi v$ in the voltage across said inductive element. FIG. 14 shows an example of behavior of the drive speed and said $\phi v$ as a function of the drive frequency, under a drive voltage and a load torque same as in FIG. 4. However, as the drive voltage VI supplied to the input electrode is not constant even if the voltage VL applied to said inductive element is made constant as will be explained later, said voltage VL applied to the inductive element is made a square wave of 15 V peak-to-peak, and the load torque is selected as 900 g.cm as in the case of FIG. 4. Said inductive element has to be selected according to each ultrasonic wave motor. In the present case, the inductance is experimentally determined as 3.9 mH. As shown in FIG. 14, said phase difference $\phi v$ assumes a value $\phi v1$ at the antiresonance frequency F4. Consequently the drive frequency may be so controlled as to satisfy a condition $\phi v=\phi v1$. However, since said condition $\phi v=\phi v1$ is again satisfied in the lower frequency region than F4, the drive frequency is preferably maintained not lower than the frequency providing the maximum phase difference. Also said VI varies depending on the VL. FIG. 15 shows the change in the phase difference $\phi v1$ at the antiresonance frequency, as a function of VL. Though not particularly illustrated, the antiresonance frequency F4 varies depending on VL in a similar manner as shown in FIG. 7 and moves to a lower or higher frequency as the VL becomes higher or lower. FIG. 15 indicates that the phase difference $\phi v$ between voltages across said inductive element at the antiresonance frequence substantially remains at $\phi v1$ regardless of the change in VL. Consequently the drive frequency for the ultrasonic wave motor can be constantly maintained at the antiresonance frequency, thus achieving a high drive efficiency, by a control of the drive frequency so as to satisfy a condition in phase difference $\phi v=\phi v1$.

In a 4th method, as in the 3rd method, the driving power is supplied to two input electrodes of the ultrasonic wave motor through inductive elements. In such case it is experimentally found that the voltage VI of the drive voltage signals supplied to said input electrodes varies depending on the drive frequency, even if the voltage VL of the voltage signals applied to said inductive elements is maintained constant. This phenomenon is considered due to a change in the impedance of the ultrasonic wave motor. When it is driven at the antiresonance frequency, the motor shows maximum impedance as explained before, so that the drive current flowing into said input electrodes becomes minimum. Consequently the currents in said inductive elements are likewise minimum, showing minimum voltage drops therein. FIG. 16 shows an example of the behavior of the drive speed and said VI as a function of the drive frequency, with a voltage VL applied to said inductive elements and a load torque the same as in the 3rd method and with an inductance of 2 mH in said inductive element. Said voltage VI assumes a minimum value VIL at the antiresonance frequency F4. Also FIG. 17 shows the change in said VIL as a function of the voltage applied to said inductive element. Said value VIL varies depending on the voltage applied to the inductive element. Therefore, by establishing the relationship between VIL and the voltage applied to said inductive element in advance, there can be realized a situation VI=VIL, namely the drive frequency can be matched with the antiresonance frequency, through the control of the drive frequency.

A 5th method is to control the drive frequency at the antiresonance frequency, based on a phase difference $\phi i$ between the drive voltages supplied to said two input electrodes and the drive currents flowing into said input electrodes, because said $\phi i$ varies depending on the drive frequency as shown in FIG. 18. Said $\phi i$ assumes a value $\phi iN$ at the antiresonance drive frequency F4. Also FIG. 19 shows the variation of $\phi iN$ at various drive voltages. The $\phi iN$ remains substantially constant regardless of the change in the drive voltage. Therefore, the drive frequency for the ultrasonic wave motor can be constantly maintained at the antiresonance frequency by a control of the drive frequency so as to satisfy a condition $\phi i=\phi iN$.

The above-mentioned methods allow maintaining the drive frequency of the ultrasonic wave motor at the antiresonance frequency, thereby constantly realizing a high drive efficiency in the ultrasonic wave motor.

BRIEF DESCRIPTION OF THE DRAWINGS

FIG. 25 is a table showing the relationship between the signal input and control input of a multiplexer MPX;

FIG. 37 is a circuit diagram showing an example of a variable output power source;

DETAILED DESCRIPTION OF THE PREFERRED EMBODIMENTS

[Examples of 1st embodiment of the present invention]

In the following there will be explained examples of a first embodiment of the present invention. At first there will be explained, based on the experimental results of the present inventor, a method of determining the upper and lower limits of the drive voltage for stably driving the ultrasonic wave motor.

The output voltage VM of the monitor electrode is related with the amplitude of the travelling vibration wave generated in the elastic member, and increases or decreases respectively as said amplitude increases or decreases.

Figure 20:
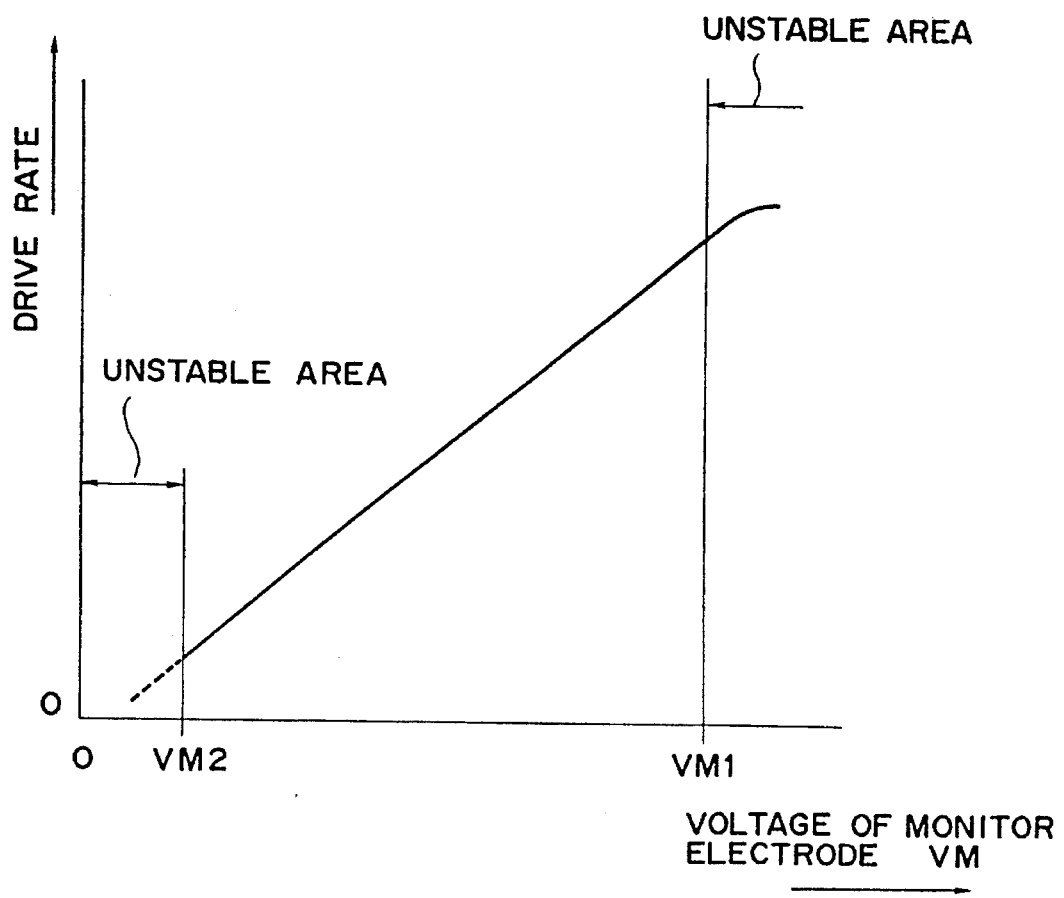
FIG. 20 is a chart showing the relationship between the drive speed and the monitor electrode voltage.

When the relationship between the drive speed and the drive frequency is investigated with the drive voltage varying at the high voltage side, there result unstable drive state and abnormal noises as described in the Related Background Art when the monitor electrode voltage VM reaches a substantially constant upper limit VM1. On the other hand, in a similar investigation with the drive voltage varying in the lower voltage side, there result unsmooth motor operation and eventual motor stoppage when the monitor electrode voltage VM reaches a substantially constant lower limit VM2 (cf. FIG. 20). The drive speed—drive frequency characteristics and the monitor electrode voltage—drive frequency characteristics at different drive voltages are respectively shown in FIGS. 21 and 22. The curves 1, 2 and 3 are obtained with drive voltages increased in this order, wherein the curve 2 corresponds to the aforementioned characteristics shown in FIG. 3. As shown in these drawings, the aforementioned frequencies F2, F3 respectively move to F2H, F3H and the region b moves to a region bH when the drive voltage is made lower. On the other hand, when the drive voltage is shifted higher, these respectively move to F2L, F3L and a region bL.

As the drive voltage substantially reaches the upper or lower limit respectively when the monitor electrode voltage VM is at VM1 or VM2, as explained above, a control to maintain a condition VM2≦VM≦VM1 under detection of the monitor electrode voltage allows to limit the drive voltage between the upper and lower limits, thereby driving the ultrasonic wave motor in stable manner. This drive control method for the ultrasonic wave motor will be explained later in the 1st example.

Figure 23:
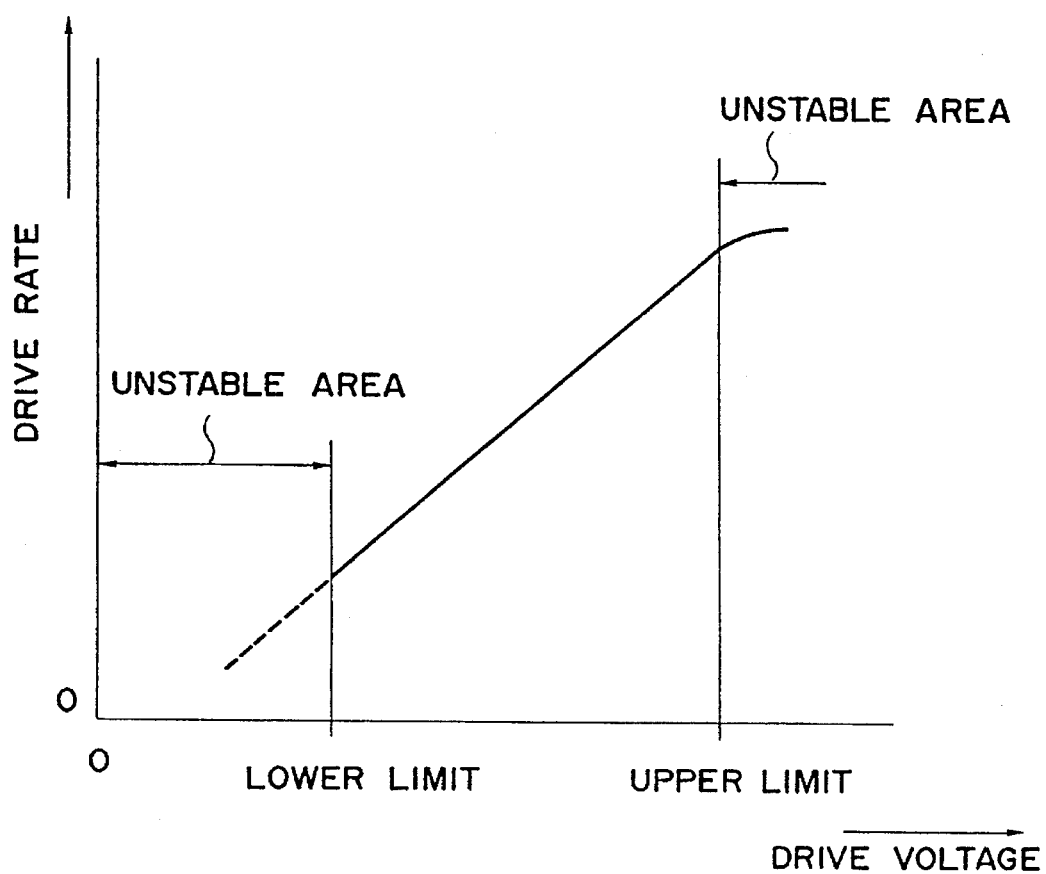
FIG. 23 is a chart showing the relationship between the drive speed and the drive voltage.

Then, in case transformers or coils are connected to the input electrodes, the upper and lower limits of the drive voltage can be determined as shown in FIG. 23 by investigating the relationship between the drive state of the motor and the drive voltage in advance, and the drive voltage can be controlled between said upper and lower limits to realize stable drive control of the ultrasonic wave motor. Such drive control method will be explained in the 2nd example.

Figure 21:
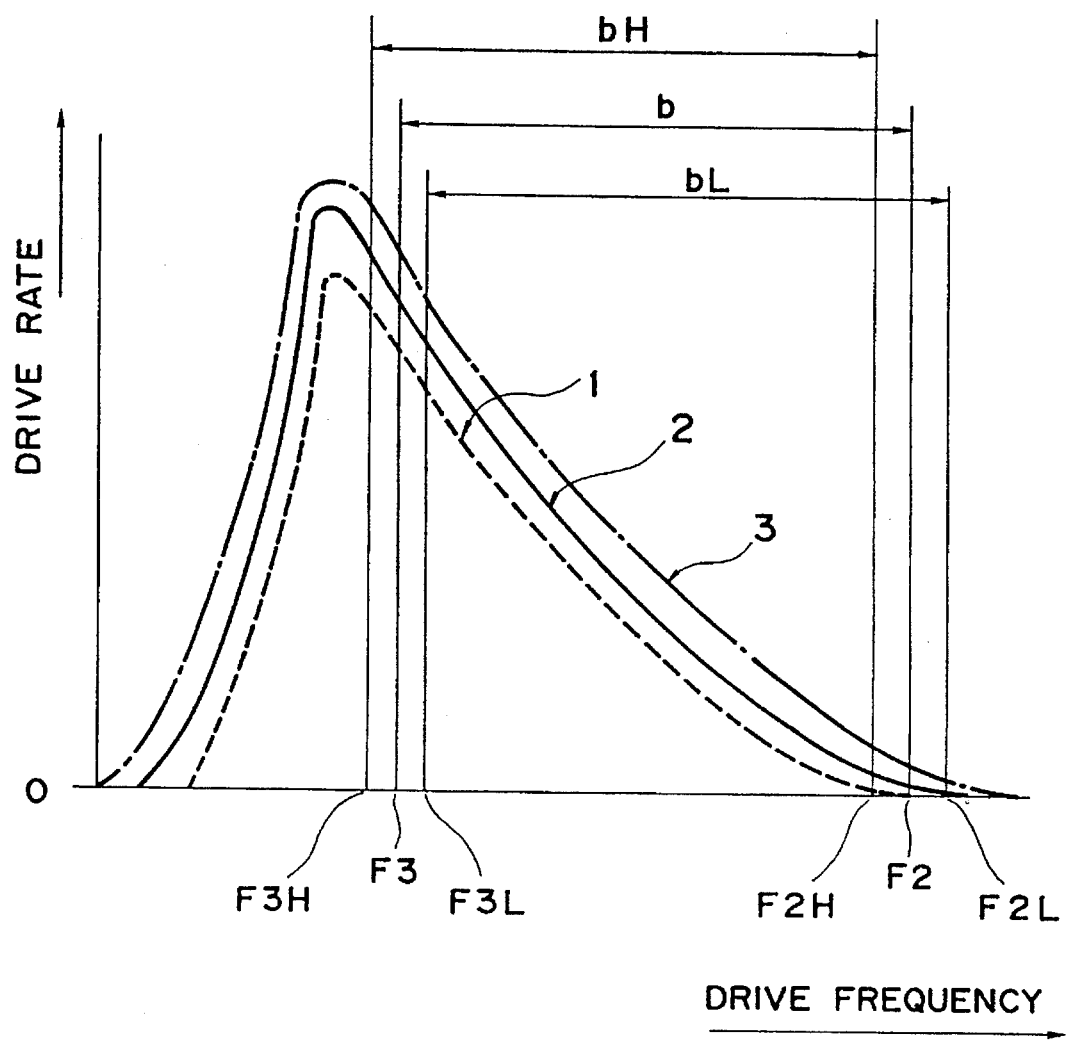
FIG. 21 is a chart showing the relationship between the drive speed and the drive frequency at different drive voltages.
Figure 22:
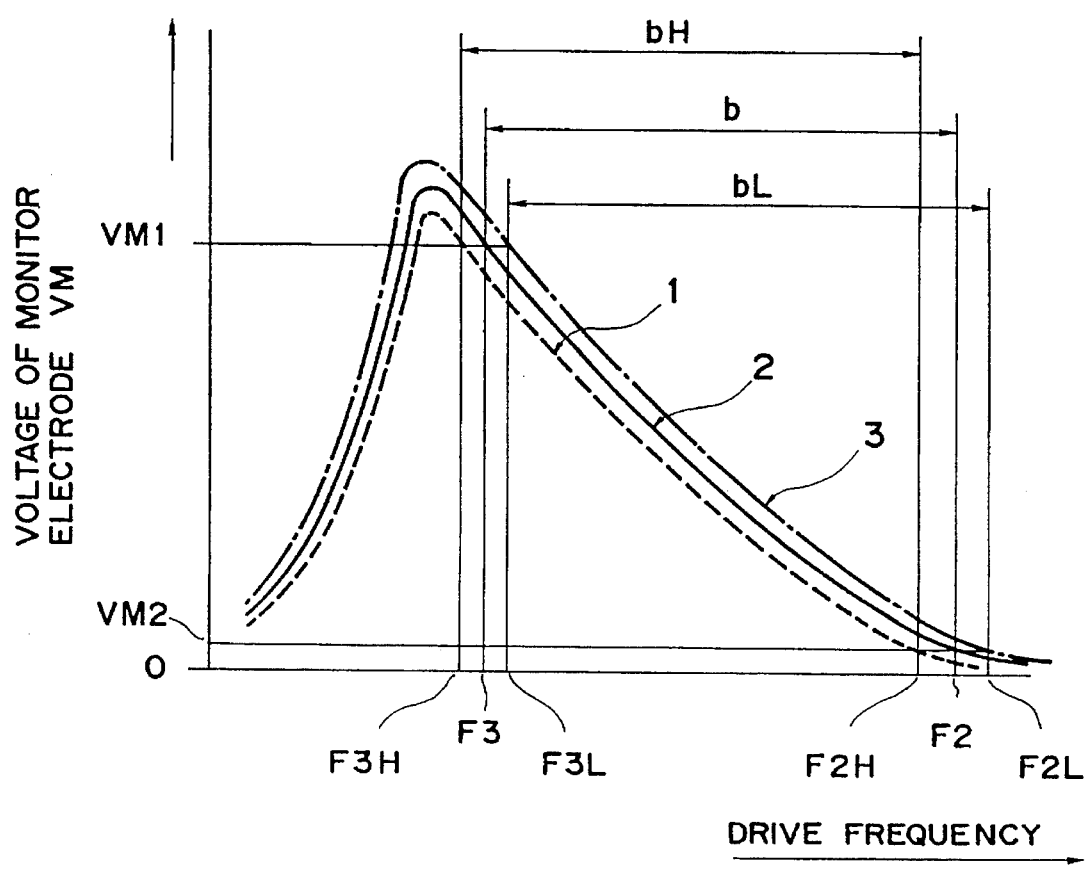
FIG. 22 is a chart showing the relationship between the monitor electrode voltage and the drive frequency at different drive voltages.

In case the motor is driven with a constant drive frequency, the drive voltage providing stable drive state at said drive frequency is determined from FIGS. 21, 22 and 23. In case the motor is driven with a variable drive frequency within a limited range, the drive voltage providing stable drive state within such range is determined from FIGS. 21, 22 and 23. Such drive control method for the ultrasonic wave motor will be explained in the 3rd example.

[1st example]

Figure 24:
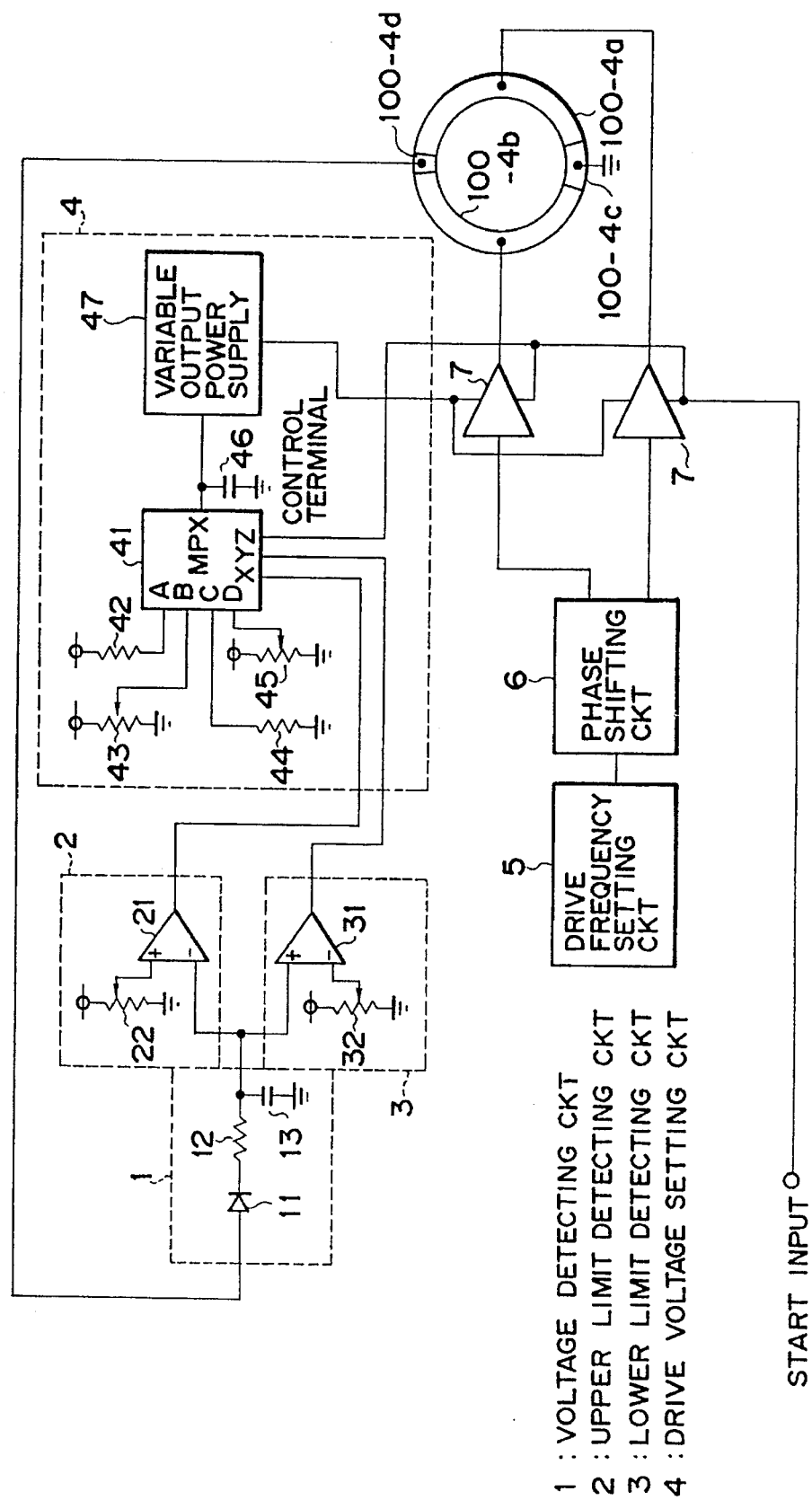
FIG. 24 is a circuit diagram of a first example.

FIG. 24 is a circuit diagram of the 1st example.

A voltage detecting circuit 1 is composed of a diode 11, a resistor 12 and a capacitor 13, and, being connected at the input terminal thereof to the monitor electrode, converts the AC output VM of said monitor electrode into a DC voltage V0.

An upper limit detecting circuit 2 is composed of a voltage comparator 21 and a variable resistor 22, and the (+) and (−) input terminals of the voltage comparator 21 are respectively connected to the output of the variable resistor 22 and the output of the voltage detecting circuit 1. The variable resistor 22 is connected between a power supply and the ground, and the output thereof is set equal to the output voltage V01 of the voltage detecting circuit 1 when the monitor voltage VM is equal to VM1. Consequently the upper limit detecting circuit 2 releases a high-level output when the output V0 of the voltage detecting circuit 1 satisfies a condition V0>V01, namely the monitor voltage VM meets a condition VM>VM1, but a low-level output when V0≦V01 or VM≦VM1.

A lower limit detecting circuit 3 is composed of a voltage comparator 31 and a variable resistor 32, and the (+) and (−) input terminals of the voltage comparator 31 are respectively connected to the output of the voltage detecting circuit 1 and the output of the variable resistor 32. The variable resistor 32 is connected between the power supply and the ground, and the output thereof is set equal to the output voltage V02 of the voltage detecting circuit 1 when the monitor voltage VM is equal to VM2. Consequently the lower limit detecting circuit 3 releases a low-level output when the output V0 of the voltage detecting circuit 1 satisfies a condition V0<V02, namely when the monitor voltage VM meets a condition VM<VM2, or a high-level output when V0≧V02 or VM≧VM2.

A drive voltage setting circuit 4 is composed of a multiplexer (MPX) 41, resistors 42, 44, variable resistors 43, 45, a capacitor 46 and a variable output power supply 47. The multiplexer 41 switches signal inputs A, B, C and D according to the signal levels entered into control inputs X, Y and Z as shown in FIG. 25. Said control input terminals X, Y, Z are respectively connected to the output of the upper limit detecting circuit 2, output of the lower limit detecting circuit 3 and a start input signal. The resistor 42 is connected between the power supply and the input terminal A of the multiplexer 41 and serves to set the lower limit of the drive voltage. The variable resistor 43 is connected between the power supply and the ground and has an output connected to the input terminal B of the multiplexer 41, thereby varying the drive voltage according to the voltage set therein. The resistor 44 is connected between the input terminal C of the multiplexer 41 and the ground and serves to set the upper limit of the drive voltage. The variable resistor 45 is connected between the power supply and the ground and has an output connected to the input terminal D of the multiplexer 41, thereby setting the drive voltage at the start of the ultrasonic wave motor. The capacitor 46 is connected, at a terminal thereof, to the output of the multiplexer 41 and the input to the variable output power supply 47 and is grounded at the other terminal, and holds the output voltage of the multiplexer 41. The variable output power supply 47 releases a DC voltage proportional to the input signal level.

Figure 1:
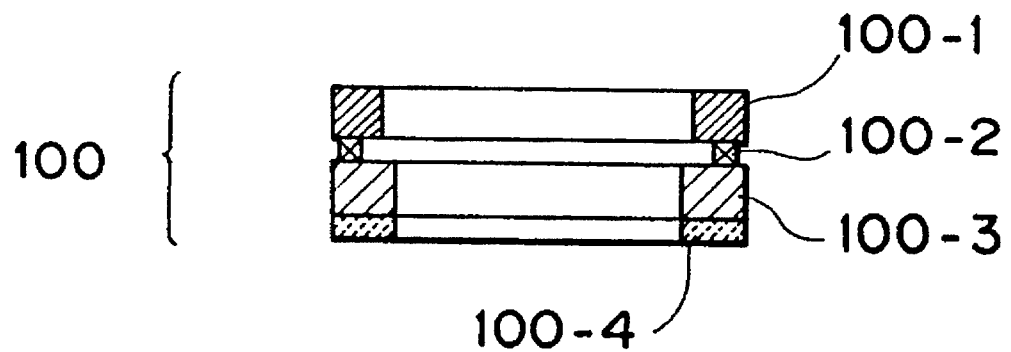
FIG. 1 is a cross-sectional view of an ultrasonic wave motor.
Figure 2:
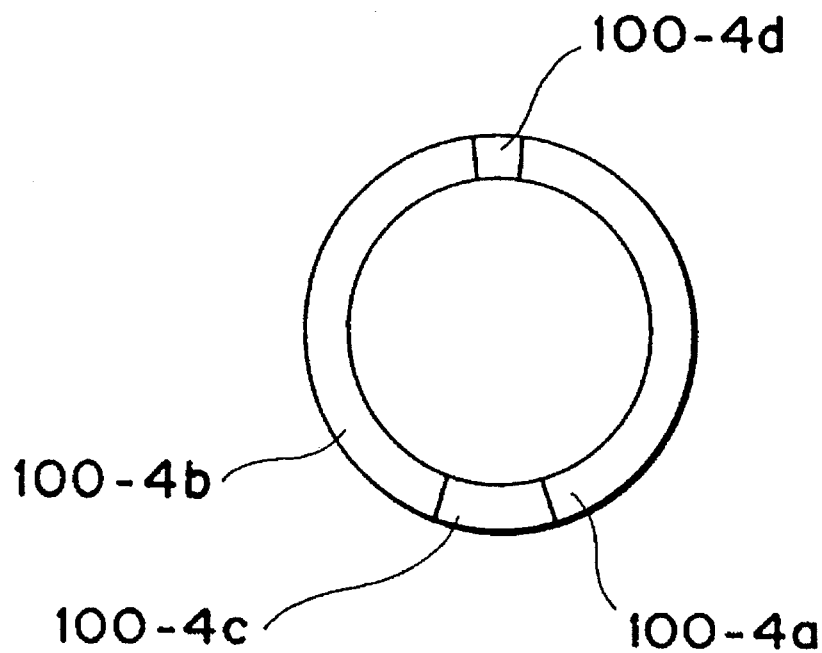
FIG. 2 is a view showing arrangement of electrodes in the piezoelectric member of an ultrasonic wave motor.
Figure 3:
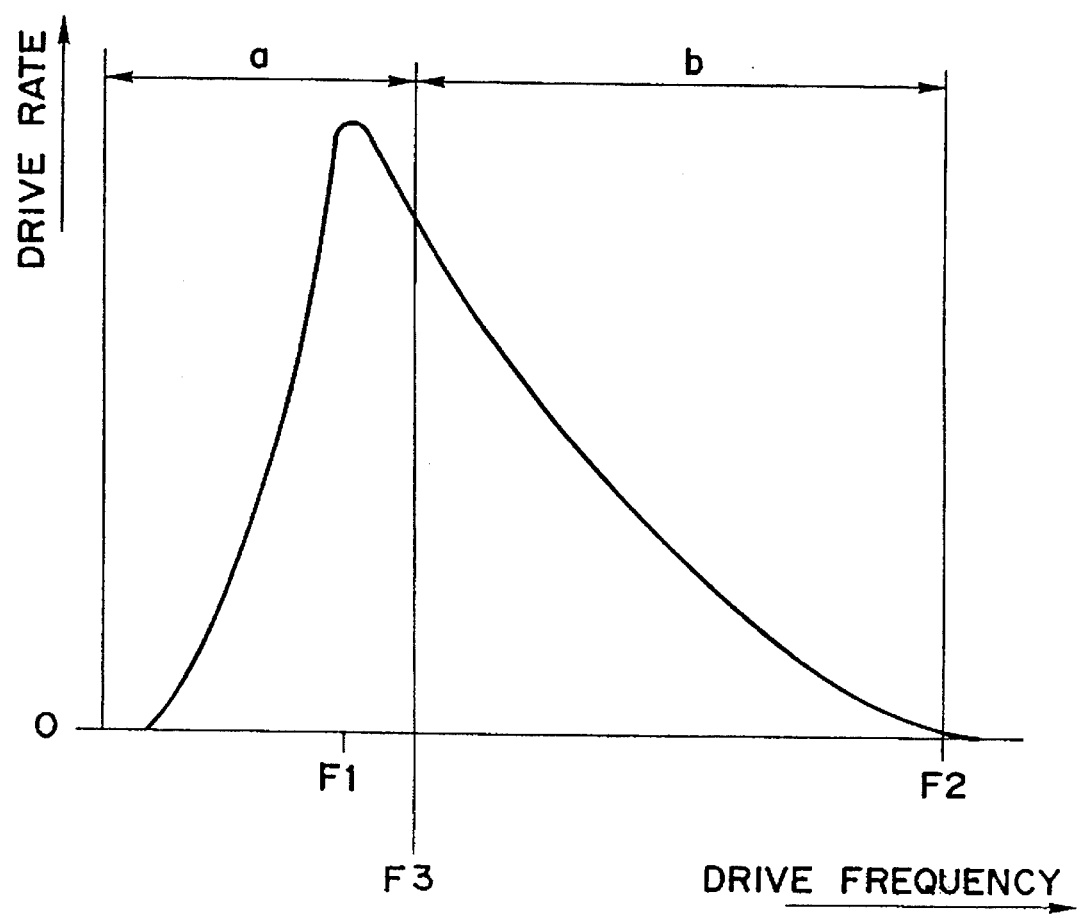
FIG. 3 is a chart showing the relationship between the drive speed and the drive frequency of an ultrasonic wave motor.

A drive frequency setting circuit 5 is a known oscillator generating a cyclic signal, and its output frequency is set within a region b, shown in FIG. 3, where the ultrasonic wave motor can function stably. The output of said circuit 5 is supplied to a phase shifting circuit 6, which generates two cyclic signals of a mutual phase difference of π/2. A power amplifier 7 amplifies two cyclic signals supplied from the phase shifting circuit 6 to the voltage supplied from the variable output power supply 47, and applies said cyclic signals to start electrodes 100-4a, 100-4b of the ultrasonic wave motor only when the start input signal is at a high-level state.

In the following there will be explained the function of the 1st example.

When the start input signal is at the low-level state, the multiplexer 41 selects the input D as shown in FIG. 25, whereby the variable output power supply 47 supplies the power amplifier 7 with a drive voltage at the start of the ultrasonic wave motor set by the variable resistor 45.

When the start input signal is shifted to the high-level state for starting the motor, the cyclic drive signals generated by the drive frequency setting circuit 5 and subjected to a mutual phase shift of π/2 by the phase shifting circuit 6 are amplified to the above-mentioned start voltage by the power amplifier 7 and supplied to the ultrasonic wave motor. Thus the motor is started by the starting drive voltage set by the variable resistor 45.

When the ultrasonic wave motor is started, the monitor electrode 100-4d generates a monitor voltage VM, which is fed back to the voltage detecting circuit 1, converted into a DC voltage V0 therein and supplied to the upper and lower limit detecting circuits 2, 3. If said DC voltage V0 satisfies a relation V02≦V0≦V01, namely if the monitor voltage VM satisfies a condition VM2≦VM≦VM1, said detecting circuits 2, 3 both release high-level output signals, whereby the multiplexer 41 selects the input B as shown in FIG. 25. Consequently the drive voltage for the ultrasonic wave motor is determined by the voltage set by the variable resistor 43, and the drive speed of the motor can be regulated by varying said set voltage.

Then, when the variable resistor 43 is shifted to a higher voltage, the drive voltage increases accordingly. When the drive voltage reaches the upper limit, the output voltage V0 of the voltage detecting circuit 1 becomes larger than V01, namely the monitor voltage VM becomes larger than VM1, so that the upper limit detecting circuit 2 releases a low-level output signal and the multiplexer 41 selects the input C as shown in FIG. 25. Consequently the potential of the capacitor 46, which is charged to the voltage of the input B, which is set by the variable resistor 43 and has been selected up to immediately before, is gradually lowered by discharge through the resistor 44, and the output voltage of the variable output power supply 47 decreases accordingly, thus reducing the drive voltage for the motor. When the monitor voltage VM is accordingly lowered to satisfy a condition VM≦VM1, the output voltage V0 of the voltage detecting circuit 1 satisfies a condition V0≦V01, whereby the upper limit detecting circuit 2 again releases a high-level output signal. Consequently the multiplexer 41 selects the input B, or the voltage set by the variable resistor 43, whereby the drive voltage is again elevated.

The voltage detecting circuit 1, the upper limit detecting circuit 2 and the drive voltage setting circuit 4 maintain the monitor voltage VM so as to satisfy a condition VM≦VM1 by repeating the above-explained operation, so that the drive voltage does not exceed the upper limit and the ultrasonic wave motor is stably driven.

Then, when the variable resistor 43 is shifted to a lower voltage, the drive voltage decreases accordingly. When the drive voltage reaches the lower limit, the output voltage V0 of the voltage detecting circuit 1 becomes smaller than V02, namely the monitor voltage VM becomes smaller than VM2, so that the lower limit detecting circuit 3 releases a low-level output signal and the multiplexer 41 selects the input A as shown in FIG. 25. Consequently the potential of the capacitor 46, which is charged to the voltage of the input B, which is set by the variable resistor 43 and has been selected up to immediately before, is gradually elevated by charging by the power supply through the resistor 42, thus elevating the drive voltage for the motor. When the monitor voltage VM is accordingly elevated to satisfy a condition Vm≧VM2, the output voltage V0 of the voltage detecting circuit 1 satisfies a condition V01≧V02, whereby the lower limit detecting circuit 3 again releases a high-level output signal. Consequently the multiplexer 41 selects the input B, whereby the drive voltage is again lowered.

The voltage detecting circuit 1, the lower limit detecting circuit 3 and the drive voltage setting circuit 4 maintain the monitor voltage VM so as to satisfy a condition VM≧VM2 by repeating the above-explained operation, so that the drive voltage does not become smaller than the lower limit and the ultrasonic wave motor is stably driven.

As explained in the foregoing, the control based on the detected monitor voltage VM so as to satisfy a condition VM2≦VM≦VM1 allows limiting the drive voltage between the upper and lower limits, thereby realizing stable drive of the ultrasonic wave motor.

In the above-explained 1st example, in case the monitor voltage VM becomes larger than VM1 or smaller than VM2, the input of the multiplexer 41 is switched to charge or discharge the capacitor 46, thereby varying the output voltage of the variable output power supply 47 and thus controlling the drive voltage for the ultrasonic wave motor, but it is also possible to intercept the output of the multiplexer 41, thereby retaining the immediately preceding voltage by said capacitor 46. In such case the output of the multiplexer 41 is connected again when a condition VM2≦VM≦VM1 is restored.

[2nd example]

Figure 26:
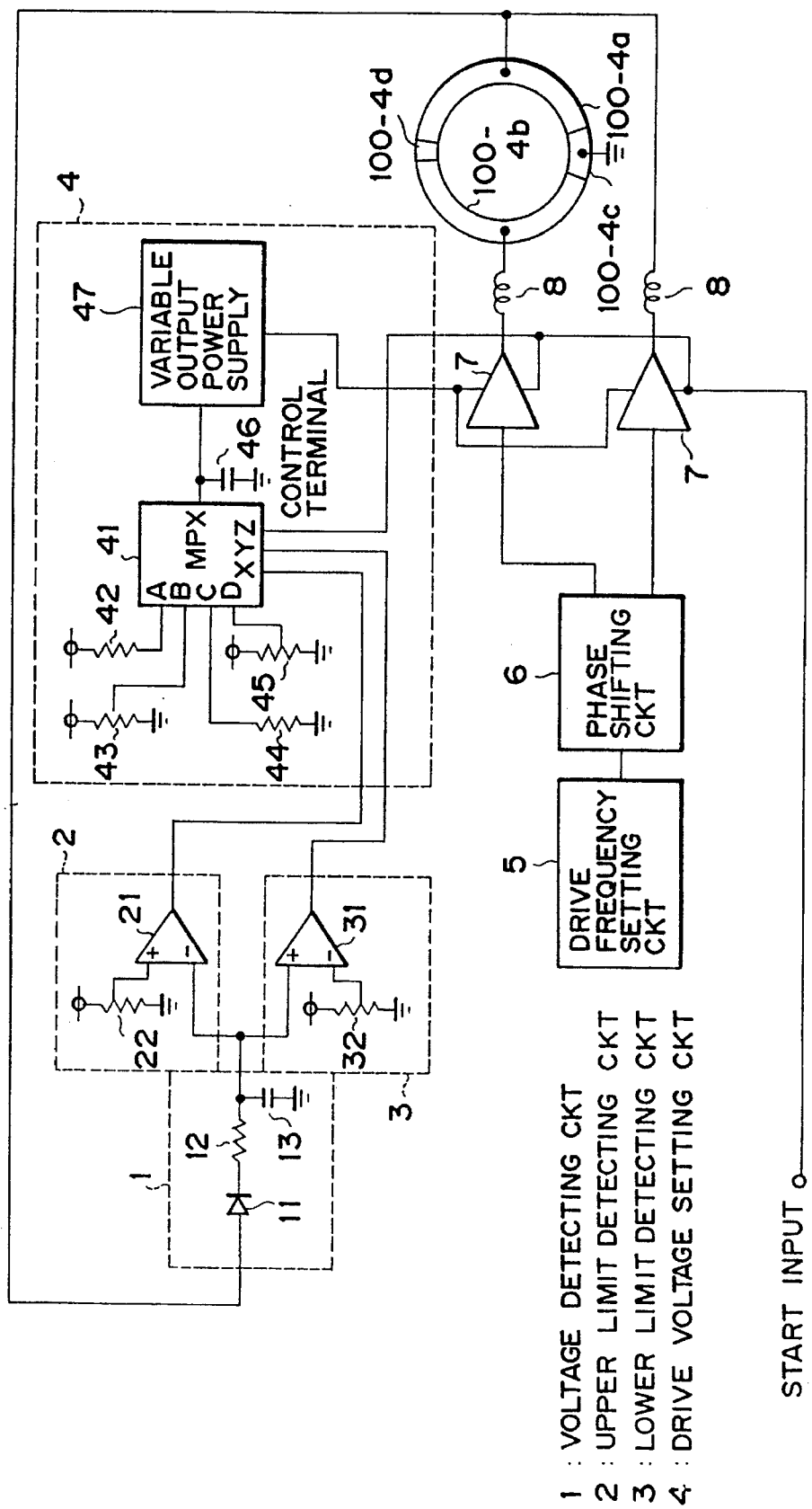
FIG. 26 is a circuit diagram of a second example.

FIG. 26 is a circuit diagram of a 2nd example, which is same as the 1st example except that the input terminal of the voltage detecting circuit 1 is connected to the drive electrode 100-4a instead of the monitor electrode 100-4d and that the output of the power amplifier 7 is connected to the drive electrodes 100-4a, 100-4b through coils 8, and such same portions will not be explained further.

In case of driving power supply to the drive electrodes 100-4a, 100-4b through coils, the drive voltage varies depending on the drive frequency even if the output voltage of the power amplifier 7 is maintained constant, as explained before. In such case, the control can be made as in the 1st example, by detecting the drive voltage from the drive electrode 100-4a as shown in FIG. 26 and feeding it back to the voltage detecting circuit 1.

The settings of the variable resistors 22, 32 and the resistances of the resistors 42, 44 for respectively determining the upper and lower limits of the drive voltage can be suitably selected in experimental manner.

In this 2nd example, the drive voltage is directly fed back to the voltage detecting circuit 1 for detecting the upper and lower limits, and is lowered or elevated respectively when the upper or lower limit is reached, Consequently the drive voltage is constantly controlled between the upper and lower limits, and the ultrasonic wave motor can be driven in stable manner (cf. FIG. 23).

[3rd example]

Figure 27:
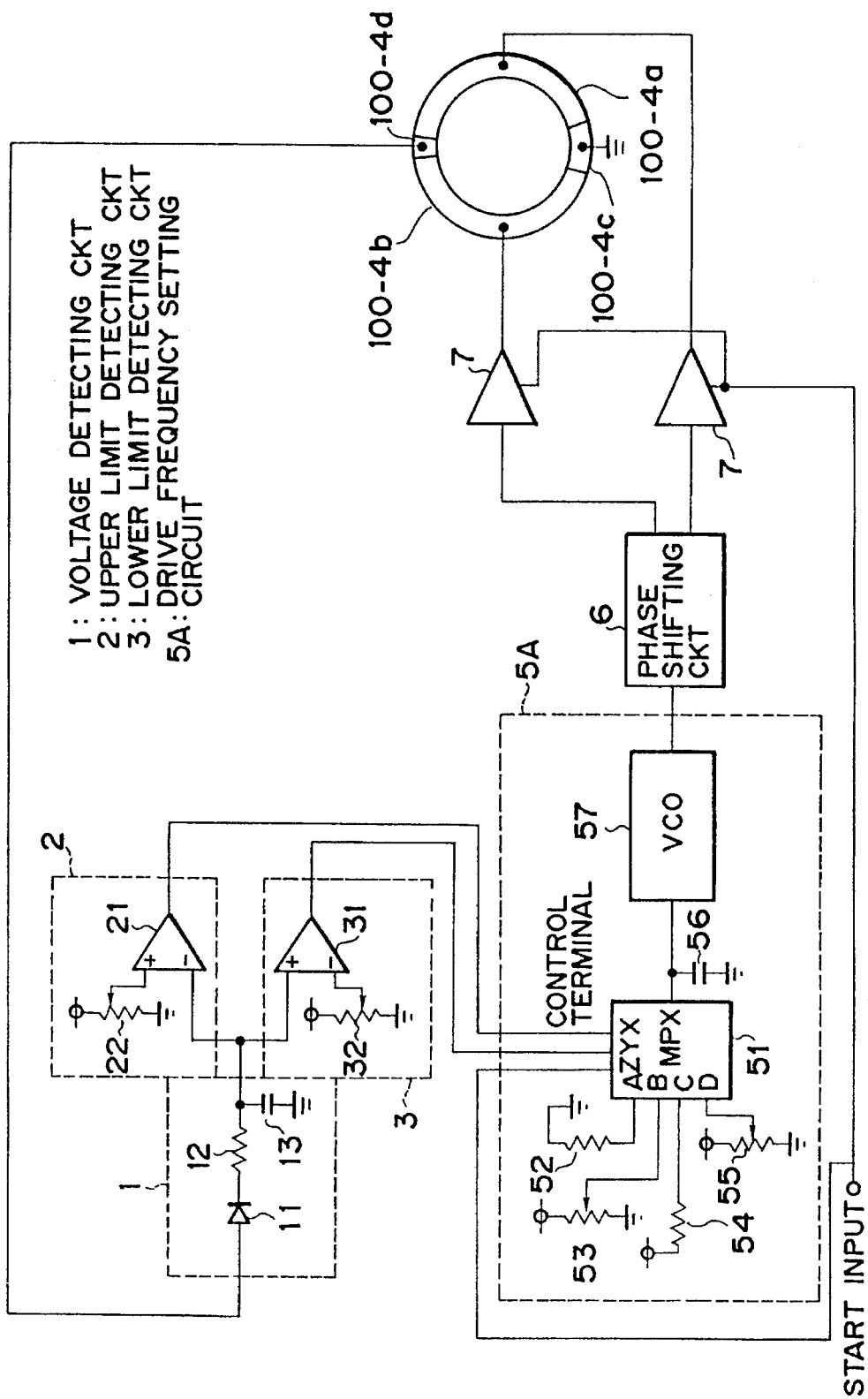
FIG. 27 is a circuit diagram of a third example.

FIG. 27 is a circuit diagram of a 3rd example, wherein same components as those in the 1st example are represented by same symbols and will not be explained further.

A drive frequency setting circuit 5A is composed of a multiplexer 51, resistors 52, 54, variable resistors 53, 55, a capacitor 56 and a voltage-controlled oscillator (VC0) 57. The multiplexer 51 is constructed same as the multiplexer 41 in the 1st example, and, as shown in FIG. 25, switches the signal inputs A, B, C and D according to the signal levels supplied to the control inputs X, Y and Z. The resistors 52, connected between the input A of the multiplexer 51 and the ground, sets a drive frequency for maintaining the drive voltage for the motor at the lower limit or elevating said drive voltage. The variable resistor 53 is connected between the power supply and the ground, and has an output connected to the input B of the multiplexer 51, thereby varying the drive frequency according to the set voltage. The resistor 54, connected between the power supply and the input C of the multiplexer 51, sets a drive frequency for maintaining the drive voltage for the motor at the upper limit or decreasing said drive voltage. The variable resistor 55 is connected between the power supply and the ground, and has an output connected to the input D of the multiplexer 51, thereby varying the drive frequency at the start of the ultrasonic wave motor. The capacitor 56 is connected, at a terminal thereof, to the output of the multiplexer 51 and the input of the voltage-controlled oscillator 57, and, at the other terminal, to the ground, and retains the output of the multiplexer 51. The voltage-controlled oscillator 57 generates a cyclic signal of a frequency proportional to the input voltage. The power amplifier 7 amplifies the cyclic output signals of the phase shifting circuit 6 to a constant drive voltage, and applies thus amplified signals to the drive electrodes 100-4a, 100-4b only when the start input signal is at the low level state.

Also if the relationship between the output voltage of the variable output power supply and the drive voltage or the monitor voltage is experimentally investigated in advance, there may be detected the output voltage of the variable output power supply instead of the drive voltage or the monitor voltage.

In the following is explained the function of the 3rd example.

When the start input signal is at the low-level state, the multiplexer 51 selects the input E as shown in FIG. 25, whereby the voltage-controlled oscillator 57 supplies the phase shifting circuit 6 with a cyclic signal for motor starting set by the variable resistor 55. In response the phase shifting circuit 6 generates two cyclic signals of a mutual phase shift of $\pi/2$ and supplies said two signals to the power amplifier 7. The variable resistor 55 is set at a stable drive frequency in the region b shown in FIG. 3.

When the start input signal is shifted to the high-level state for starting the motor, the power amplifier 7 amplifies the cyclic signals from the phase shifting circuit 6 and applies the amplified signals to the drive electrodes 100-4$a$, 100-4$b$. Thus the motor is started by the starting drive voltage set by the variable resistor 55.

When the ultrasonic wave motor is started, the monitor electrode 100-4$d$ generates a monitor voltage VM, which is fed back to the voltage detecting circuit 1, converted into a DC voltage V0 therein and supplied to the upper and lower limit detecting circuits 2, 3. If said DC voltage V0 satisfies a relation $V02 \leq V0 \leq V01$, namely if the monitor voltage VM satisfies a condition $VM2 \leq VM \leq VM1$, said detecting circuits 2, 3 both release high-level output signals, whereby the multiplexer 51 selects the input B as shown in FIG. 25. Consequently the drive frequency for the ultrasonic wave motor is determined by the voltage set by the variable resistor 53, and the drive speed of the motor can be regulated by varying said set voltage.

Then, when the variable resistor 53 is shifted to a lower voltage, the drive frequency decreases and the drive speed increases accordingly. Also the monitor voltage VM increases in proportion to the drive speed. When the monitor voltage VM exceeds VM1, namely when the output voltage V0 of the voltage detecting circuit 1 exceeds V01, the upper limit detecting circuit 2 releases a low-level output signal, whereby the multiplexer 51 selects the input C as shown in FIG. 25. Consequently the potential of the capacitor 56, charged to the voltage of the input B selected immediately before, namely the voltage set by the variable resistor 53, is gradually elevated by charging from the power supply through the resistor 54, whereby the voltage-controlled oscillator 57 accordingly increases the output frequency. Consequently the drive frequency for the ultrasonic wave motor is increased and the drive speed thereof is reduced.

As the monitor voltage VM is lowered to a state $VM \leq VM1$ by the reduction of the drive speed, the output voltage V0 of the voltage detecting circuit 1 reaches a stateup $V0 \leq V01$, whereby the upper limit detecting circuit 2 again releases a high-level output. Consequently the multiplexer 51 selects the input B, or the voltage set by the variable resistor 53, whereby the drive frequency is lowered and the drive speed of the motor is increased.

The voltage detecting circuit 1, the upper limit detecting circuit 2 and the drive frequency setting circuit 5A maintain the monitor voltage VM in a state $VM \leq VM1$ by repeating the above-explained procedure, so that the drive voltage does not exceed the upper limit.

When the variable resistor 53 is shifted to a higher voltage, the drive frequency increases and the drive speed decreases accordingly. Also the monitor voltage VM decreases in proportion to the drive speed. When the monitor voltage VM reaches a state $VM < VM2$ or when the output voltage V0 of the voltage detecting circuit 1 reaches a state $V0 < V02$, the lower limit detecting circuit 3 releases a low-level output, whereby the multiplexer 51 selects the input A. Consequently the potential of the capacitor 56, charged to the voltage of the input B selected immediately before, namely voltage set by the variable resistor 53, is gradually lowered by discharge through the resistor 52, whereby the voltage-controlled oscillator 57 accordingly decreases the output frequency. Consequently the drive frequency for the ultrasonic wave motor is decreased and the drive speed thereof is increased.

As the monitor voltage VM is elevated to a state $VM \geq VM2$ by the increase of the drive speed, the output voltage V0 of the voltage detecting circuit 1 reaches a state $V0 \geq V02$, whereby the lower limit detecting circuit 3 again releases a high-level output. Thus the multiplexer 51 selects the input B, or the voltage set by the variable resistor 53, and the drive frequency increases while the drive speed decreases.

The voltage detecting circuit 1, the lower limit detecting circuit 3 and the drive frequency setting circuit 5A control the monitor voltage VM so as to maintain a state $VM \geq VM2$ by repeating the above-explained procedure, so that the drive voltage does not becomes smaller than the lower limit.

As explained in the foregoing, the drive frequency is controlled so as to maintain the drive voltage between the upper and lower limits, so that the ultrasonic wave motor can be stably driven. [4th example]

Figure 28:
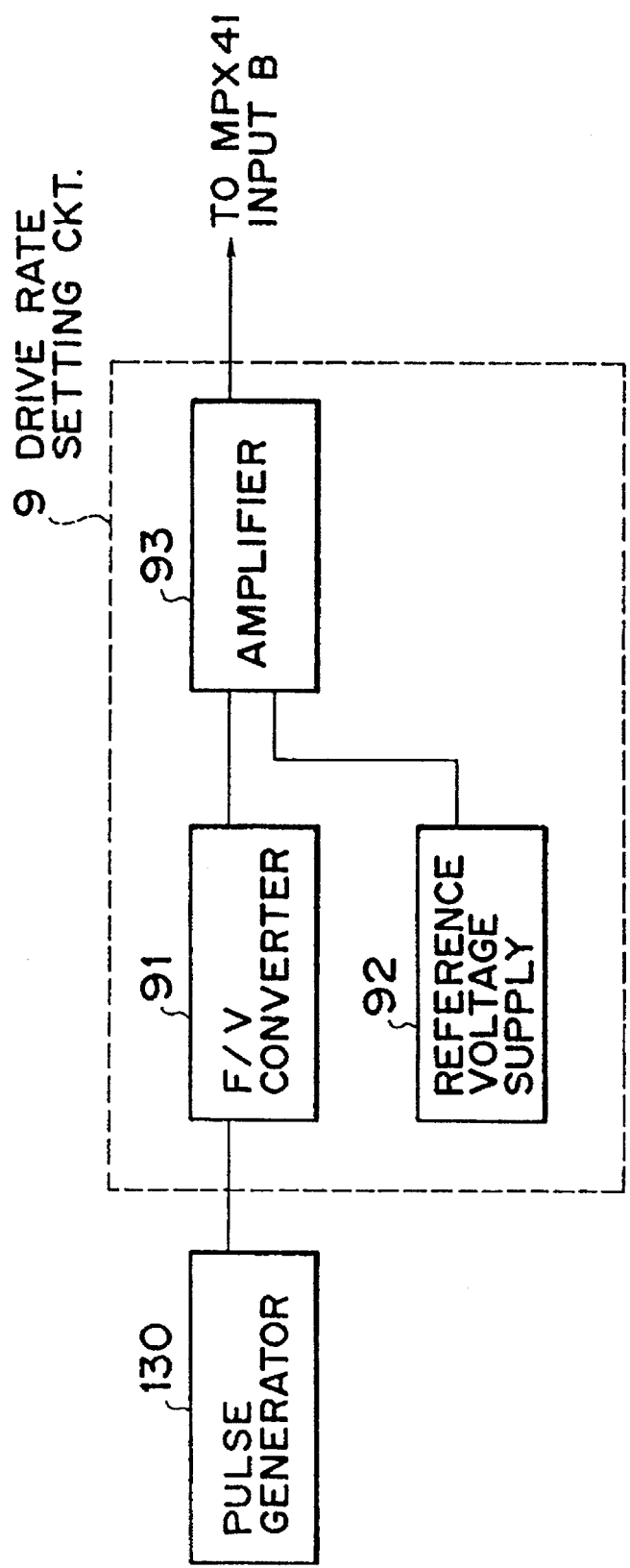
FIG. 28 is a circuit diagram of a 4th example.

The drive device of the present invention for the ultrasonic wave motor is also applicable in feedback speed control by detecting the speed of the rotor 100-1 of the ultrasonic wave motor. In such case, the variable resistor 43 of the 1st example shown in FIG. 24 is replaced by a pulse generator 130 and a speed setting circuit 9 shown in FIG. 28.

The pulse generator 130 is coupled with the rotor 100-1 of the ultrasonic wave motor and generates pulses in response to the speed of said rotor 100-1. The drive speed setting circuit 9 is composed of an F/V converter 91, a reference voltage supply 92, and an amplifier 93. The F/V converter 91 converts the pulse signal from the pulse generator 130 into a voltage signal proportional to the frequency of said pulse signal and constituting a speed feedback voltage signal, for supply to the amplifier 93. The reference voltage supply 92 releases a constant voltage, corresponding to the drive speed instruction for the ultrasonic wave motor. The amplifier 93 determines and amplifies the difference between the voltage signal from the F/V converter 91 and that from the reference voltage supply 92.

In the following is explained the function of the above-explained circuit.

When the monitor voltage VM is in a state $VM2 \leq VM \leq VM1$, namely when the drive voltage of the motor is between the upper and lower limits, the multiplexer 41 selects the input B. The pulse generator 130 sends a pulse signal of a frequency corresponding to the drive speed of the motor to the F/V converter 91, which converts said pulse signal into a voltage signal, namely speed feedback voltage signal for supply to the amplifier 93. Said amplifier 93 calculates the error between the speed instruction signal from the reference voltage supply 2 and the above-mentioned speed feedback signal, and amplifies said error. The amplified error signal is supplied through the multiplexer 41 to the variable output power supply 47 whereby the drive voltage for the ultrasonic wave motor is controlled in the same manner as in the 1st example.

In case the monitor voltage VM is in a state $VM > VM1$ or

VM<VM2, the drive voltage for the ultrasonic wave motor is controlled between the upper and lower limits by the voltage detecting circuit 1, the upper limit detecting circuit 2 and the lower limit detecting circuit 3 as in the 1st example, whereby the motor is driven in stable manner.

In the foregoing examples, the upper limit detecting means is constituted by the voltage detecting circuit 1 and the upper limit detecting circuit 2; the lower limit detecting means by the voltage detecting circuit 1 and the lower limit detecting circuit 3; the first voltage limiting means by the multiplexer 41, resistor 42, capacitor 46 and variable output power supply 47; the second voltage limiting means by the multiplexer 41, resistor 44, capacitor 46 and variable voltage power supply 47; the third voltage limiting means by the multiplexer 51, resistor 52, capacitor 56 and voltage-controlled oscillator 57; and the fourth voltage limiting means by the multiplexer 51, resistor 54, capacitor 56 and voltage-controlled oscillator 57.

[Examples of the 2nd embodiment of the present invention]

In the following there will be explained examples of the 2nd embodiment of the present invention.

Figure 29:
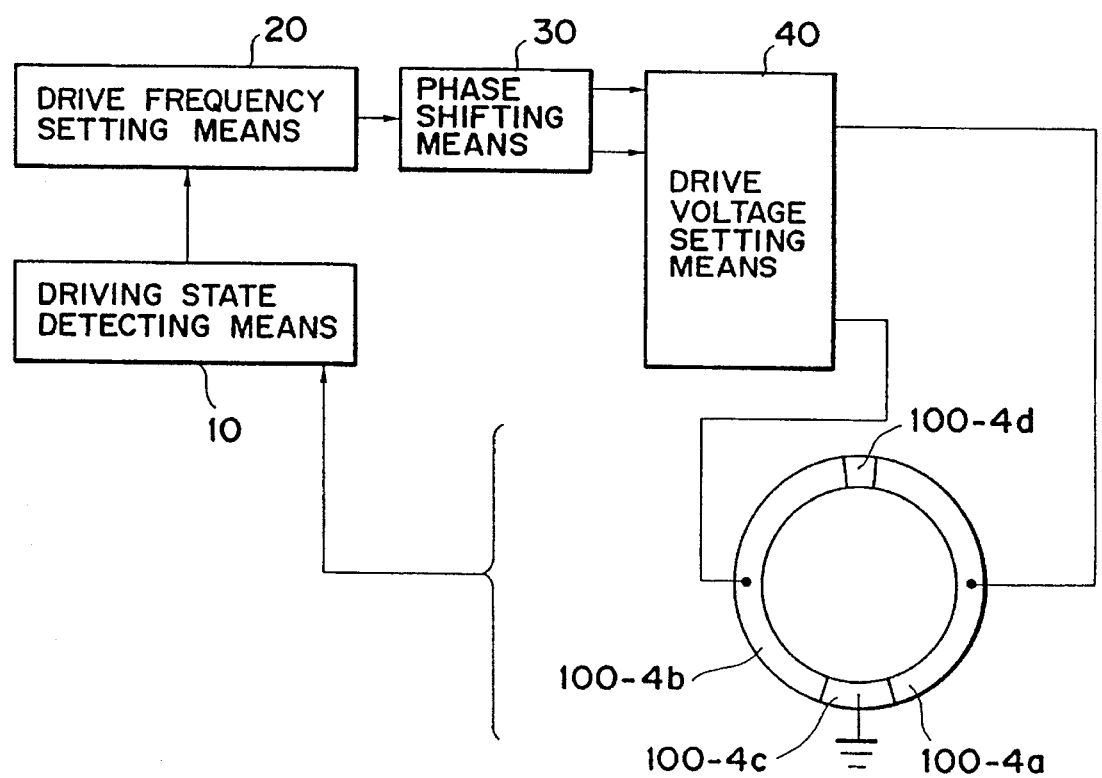
FIG. 29 is a schematic block diagram of a 5th example.

FIG. 29 schematically shows the structure of the 2nd embodiment of the present invention. In brief, the driving device for the ultrasonic wave motor is constituted by drive state detecting means 10, drive frequency setting means 20, phase shifting means 30, and drive voltage setting means 40. Said drive frequency setting means 20 releases a cyclic signal, of which frequency is correlated with the drive frequency for the ultrasonic wave motor and is controlled by the output of said drive detecting means 10. Said phase shifting means 30 divides the frequency of the output cyclic signal of said drive frequency setting means 20 and generates cyclic signals of a mutual phase difference of $\pi/2$, for supply to said drive voltage setting means 40. Said setting means 40 amplifies the outputs of said phase shifting means 30 to a drive voltage required for driving the ultrasonic wave motor, and renders said drive voltage variable, thereby varying the drive speed of the motor. Said drive state detecting means 10 detects whether the motor is driven in the antiresonance state, and controls said drive frequency setting means in the manner explained before, so as to maintain the motor constantly in a state driven at the antiresonance frequency. Such detection whether the ultrasonic wave motor is driven at the antiresonance frequency by the drive state detecting means and control to constantly maintain the drive frequency at the antiresonance frequency allow obtaining a constantly high drive efficiency even when the drive speed is arbitrarily set by a change in the drive voltage.

[5th example]

Figure 30:
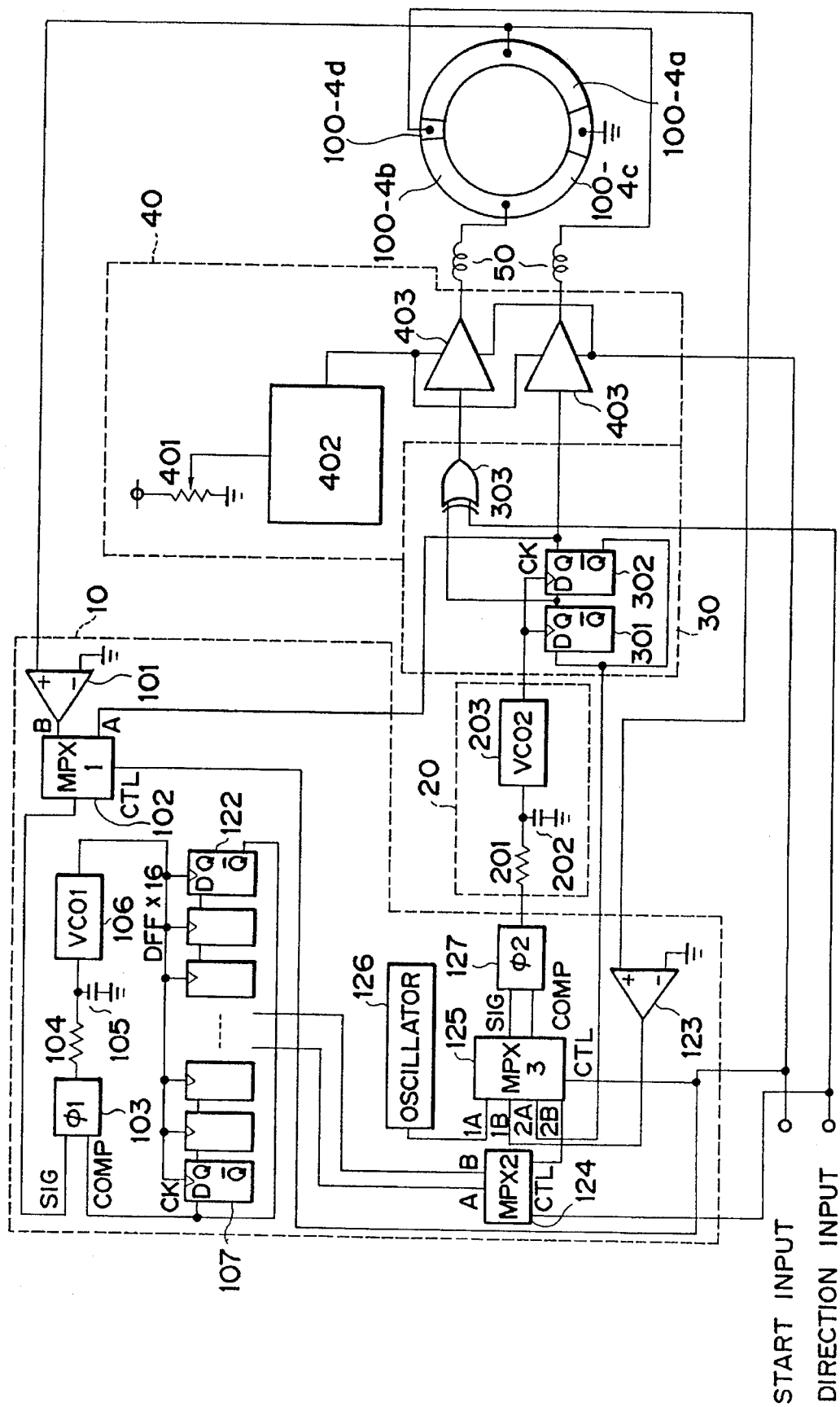
FIG. 30 is a circuit diagram of the 5th example.

FIG. 30 is a block diagram of a driving device constituting an example of the 2nd embodiment of the present invention and designed to maintain the drive frequency at the antiresonance frequency of the ultrasonic wave motor according to the aforementioned phase difference $\phi m$ between the drive voltage for the motor and the output voltage of the monitor electrode. A start input signal starts or stops the ultrasonic wave motor respectively at a high- or low-level state. A direction input signal switches the driving direction of the motor, depending on a high- or low-level state, by inverting the phase difference relationship of the drive voltage supplied to the two input electrodes of the motor.

Figure 7:
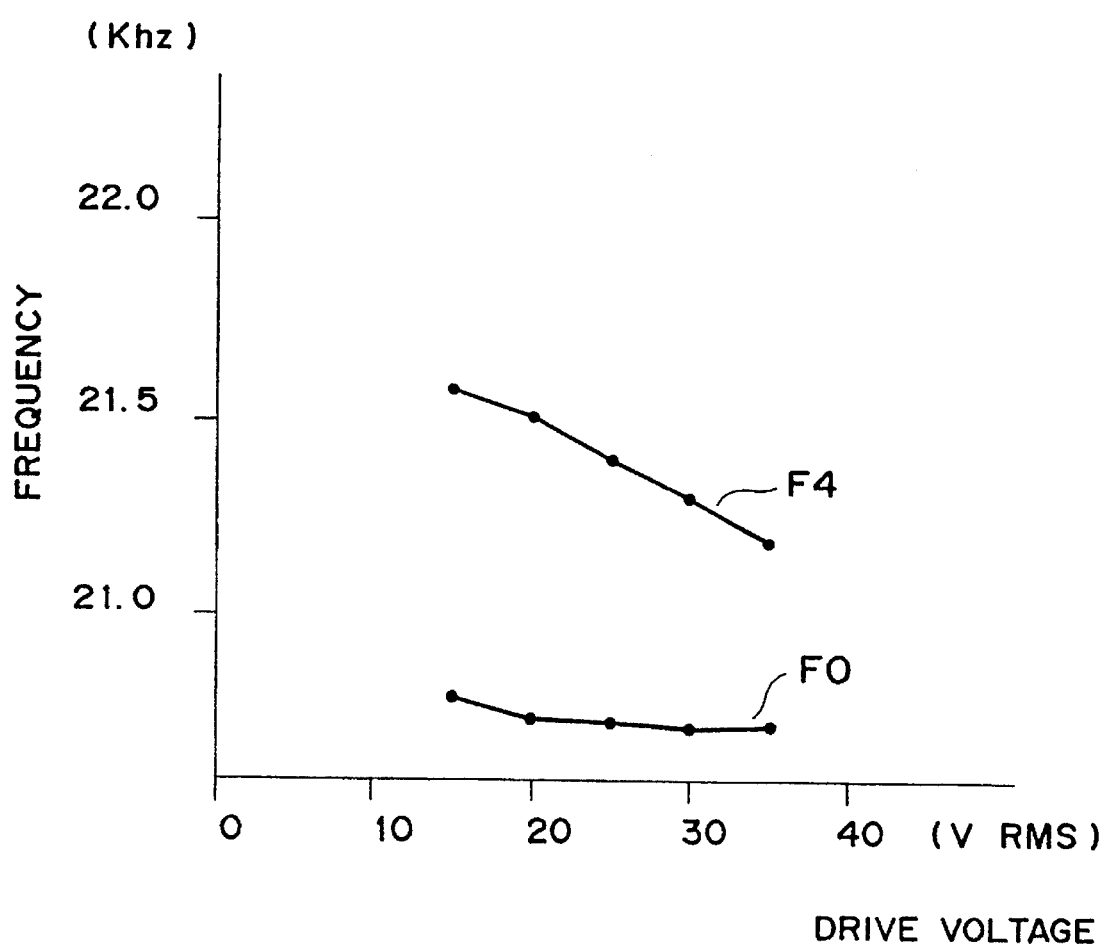
FIG. 7 is a chart showing the resonance and antiresonance frequencies of an ultrasonic wave motor as a function of the drive voltage.
Figure 8:
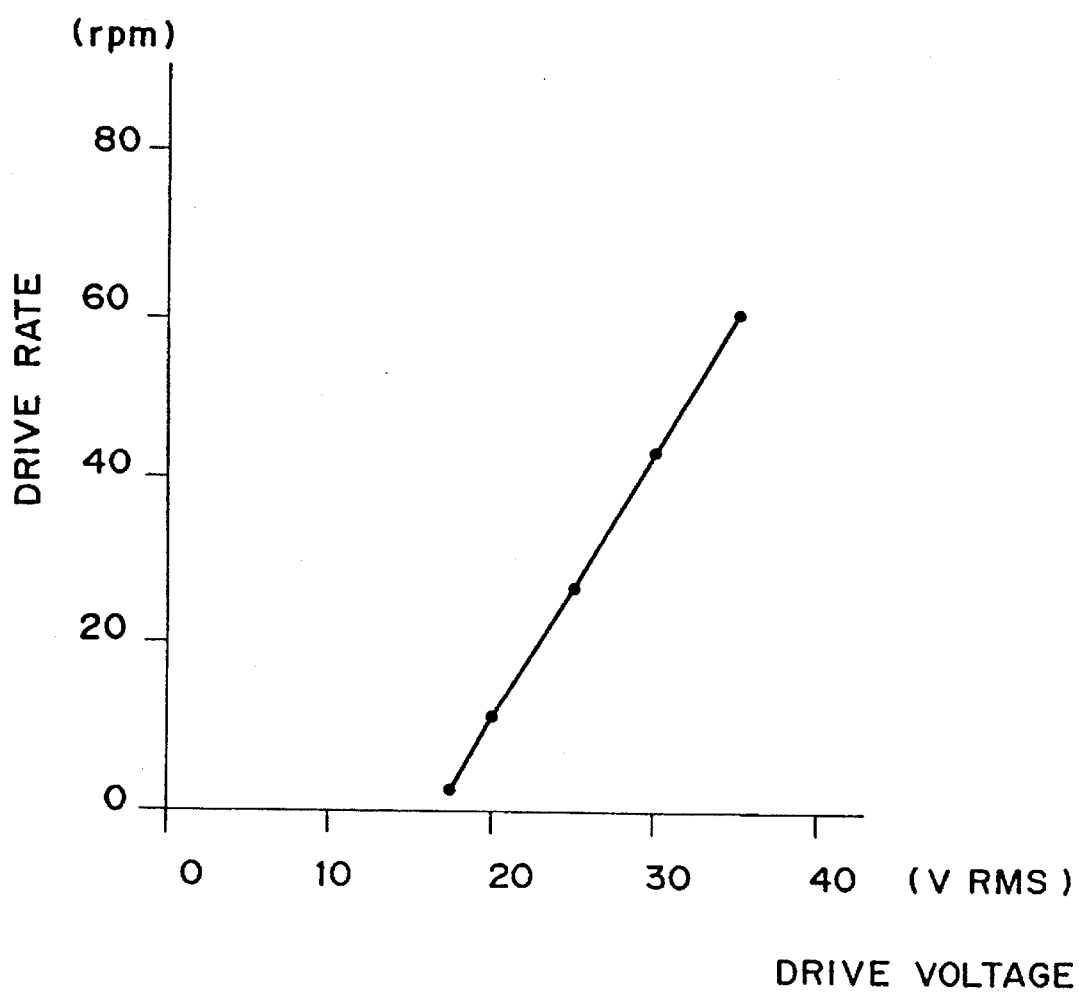
FIG. 8 is a chart showing the change of the drive speed at the antiresonance frequency as a function of the drive voltage.
Figure 9:
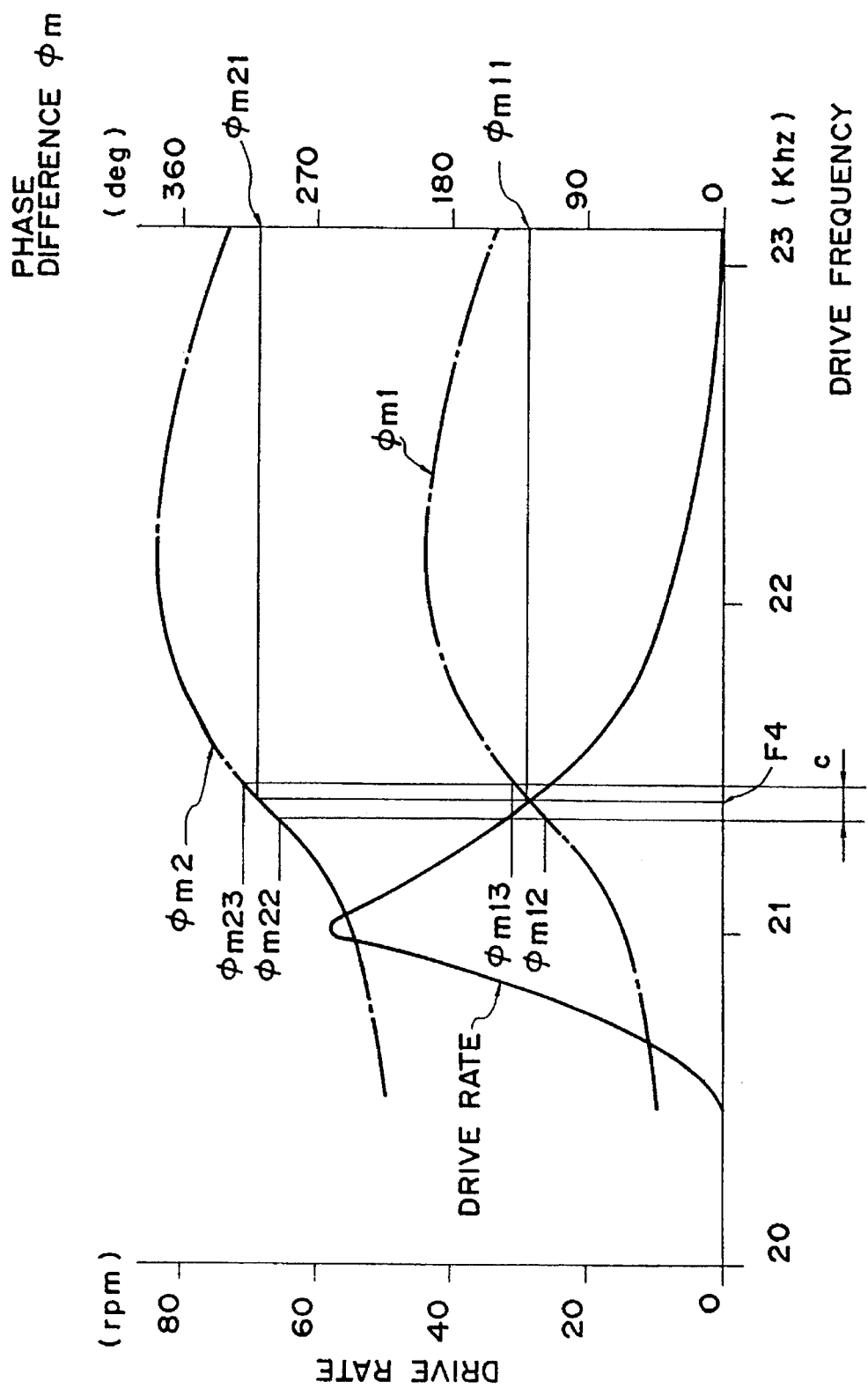
FIG. 9 is a chart showing the drive speed, and the phase difference between the drive voltage and the output voltage of a monitor electrode, as a function of the drive frequency.
Figure 10:
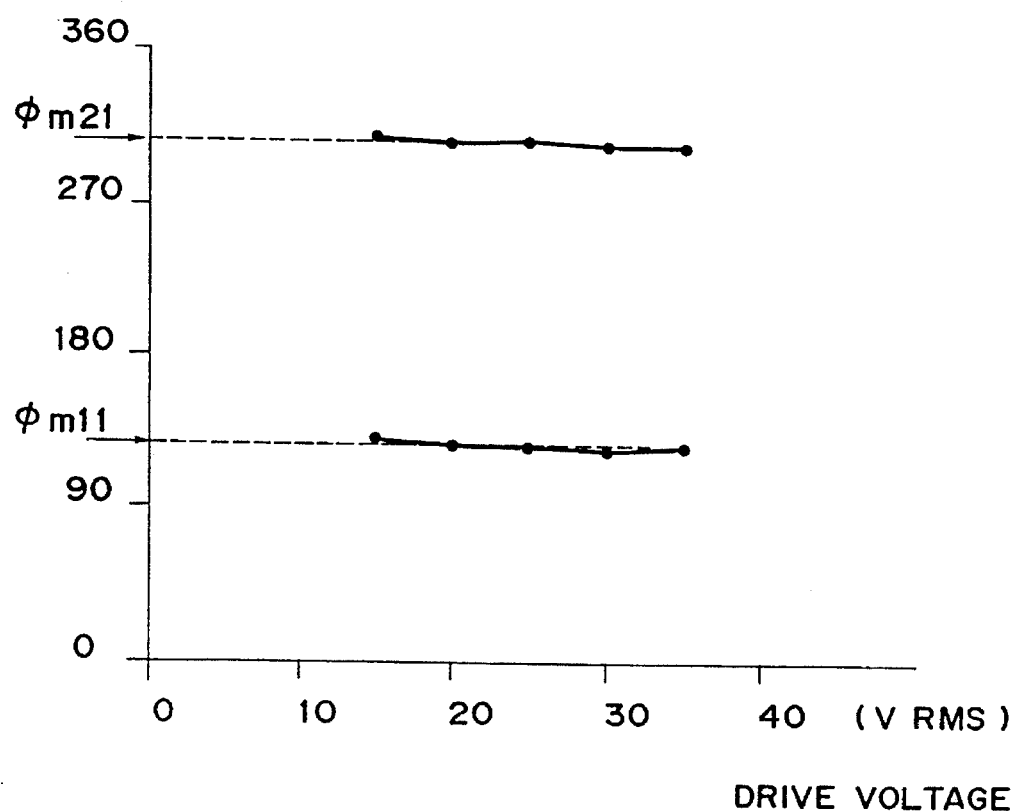
FIG. 10 is a chart showing the phase difference between the drive voltage and the output voltage of a monitor electrode, at the antiresonance frequency, as a function of the drive voltage.
Figure 11:
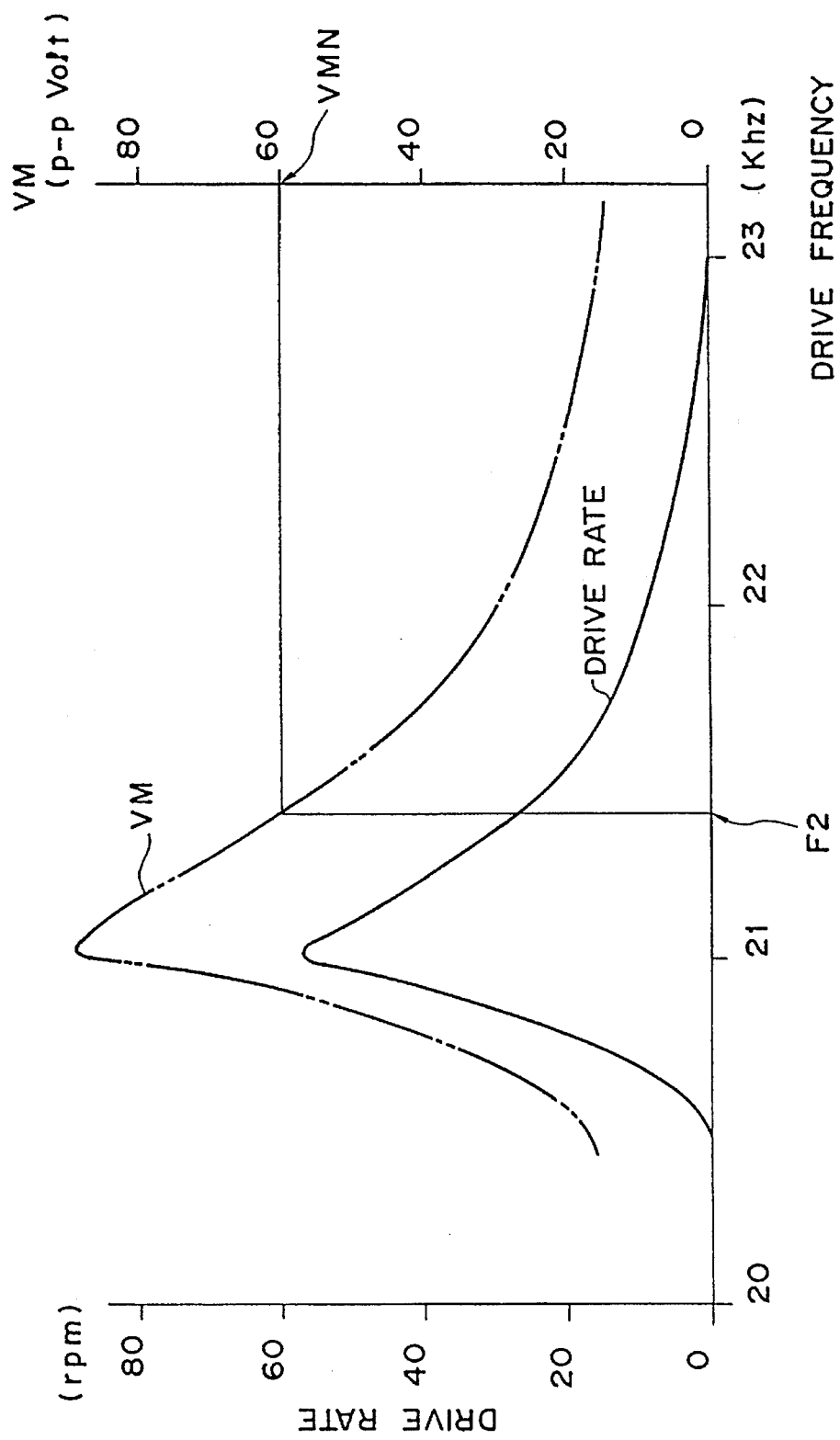
FIG. 11 is a chart showing the drive speed and the output voltage of the monitor electrode as a function of the drive frequency.

The drive state detecting means is composed of a first phase-locked loop consisting of a wave form shaper 101, a multiplexer 102 (MPX1), a phase comparator 103 ($\phi1$), a resistor 104, a capacitor 105, a voltage-controlled oscillator 105 (VCO1) and a known shift resistor composed of 16 D-flip-flops 107–122; a wave form shaper 123; a multiplexer 124 (MPX2); another multiplexer 125 (MPX3); an oscillator 126; and a phase comparator 127 ($\phi2$). The drive frequency setting means 20 is composed of a resistor 201, a capacitor 202, and a voltage-controlled oscillator 203 (VCO2). Frequency dividing/shifting means 30 is composed of two D-flip-flops 301, 302, and an EXOR gate 303. The drive voltage setting means 40 is composed of a variable 401, a variable output power supply 402 of which output voltage is varied according to the output voltage of said variable resistor, and two power amplifiers 403 receiving the output of said variable output power supply. Said power amplifiers intercept the start input signal at the low-level state but amplify said start input signal at the high-level state. Inductive elements 50 are provided respectively between the two input electrodes of the ultrasonic wave motor and said two power amplifiers. Also in case the inductive elements 50 are provided between the input electrodes and the power amplifiers 403 as shown in FIG. 30, if the output voltage VL of said power amplifiers is maintained constant, the drive speed or the phase differences $\phi m1$, $\phi m2$ between the drive voltages and the output voltage of monitor electrode is correlated with the drive frequency as shown in FIG. 9, and said phase difference at the antiresonance frequency becomes almost constant regardless of the output voltage of the power amplifier, as shown in FIG. 10. Also the antiresonance frequency F4 increases or decreases in response to an increase or decrease of said output voltage VL, as shown in FIG. 7. The following explanation will be based on the relationship shown in FIGS. 9 and 10.

It is now assumed that the start input signal is at the low-level state and the direction input signal is at the high-level state. As the start input signal is at the low-level state, the outputs of said power amplifiers are turned off, so that the drive voltages are not supplied to the input electrodes of the motor, which is therefore in the stopped state. Said MPX1, receiving the start input signal at the control terminal CTL, selects an input A out of two inputs when said terminal CTL is at the low-level state. The inputs A and B are respectively connected to the output Q of said D-flip-flop 302 and the output of said wave form shaper 101. Thus the output Q of said D-flip-flop 302 is supplied to an input SIG of the phase comparator $\phi1$, of which the other input COMP is connected to the input D of the D-flip-flop 107. Said phase comparator $\phi1$ is composed of a known phase frequency comparator (PFC), of which structure and function will be explained in the following.

Figure 31:
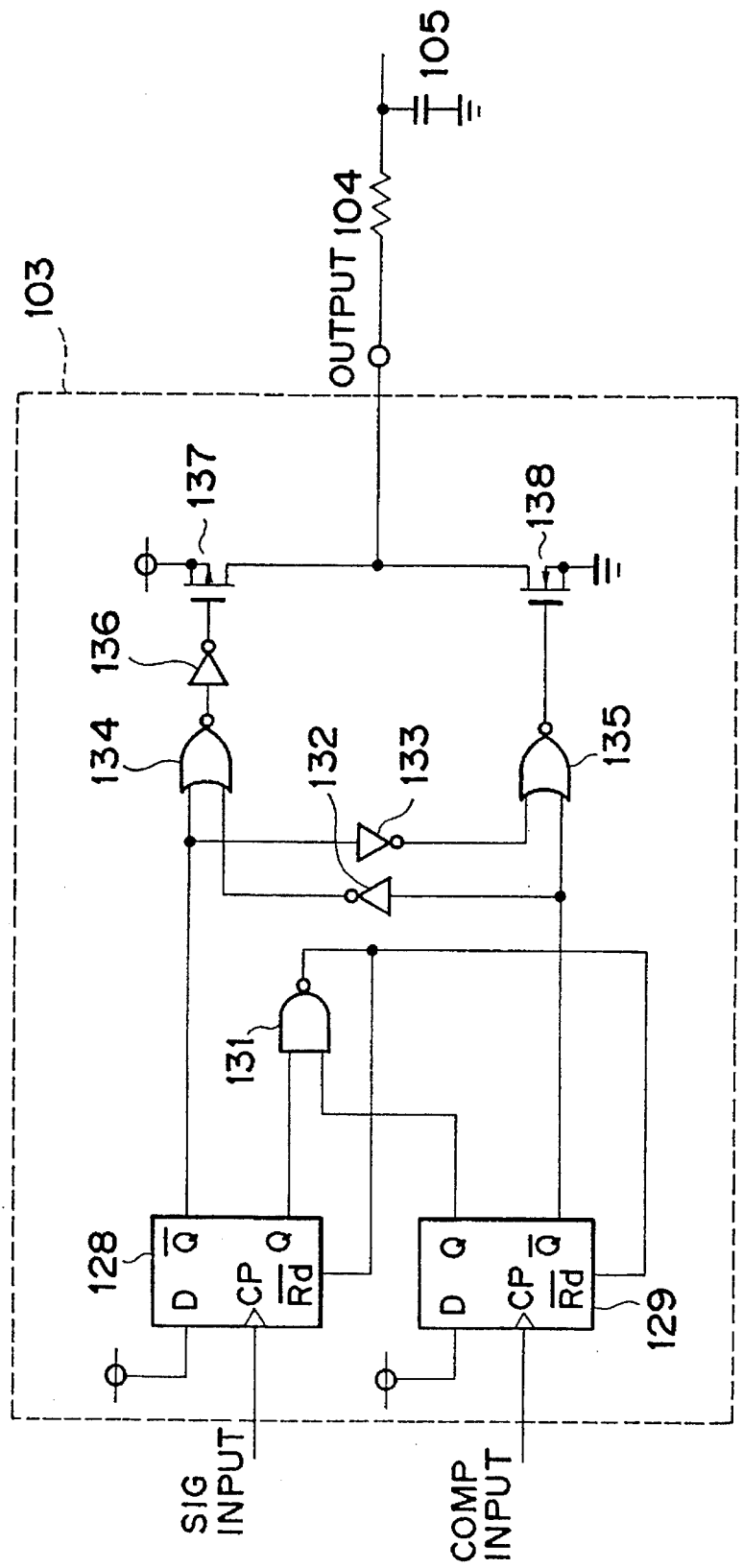
FIG. 31 is a circuit diagram of an example of a phase/frequency comparator.
Figure 32:
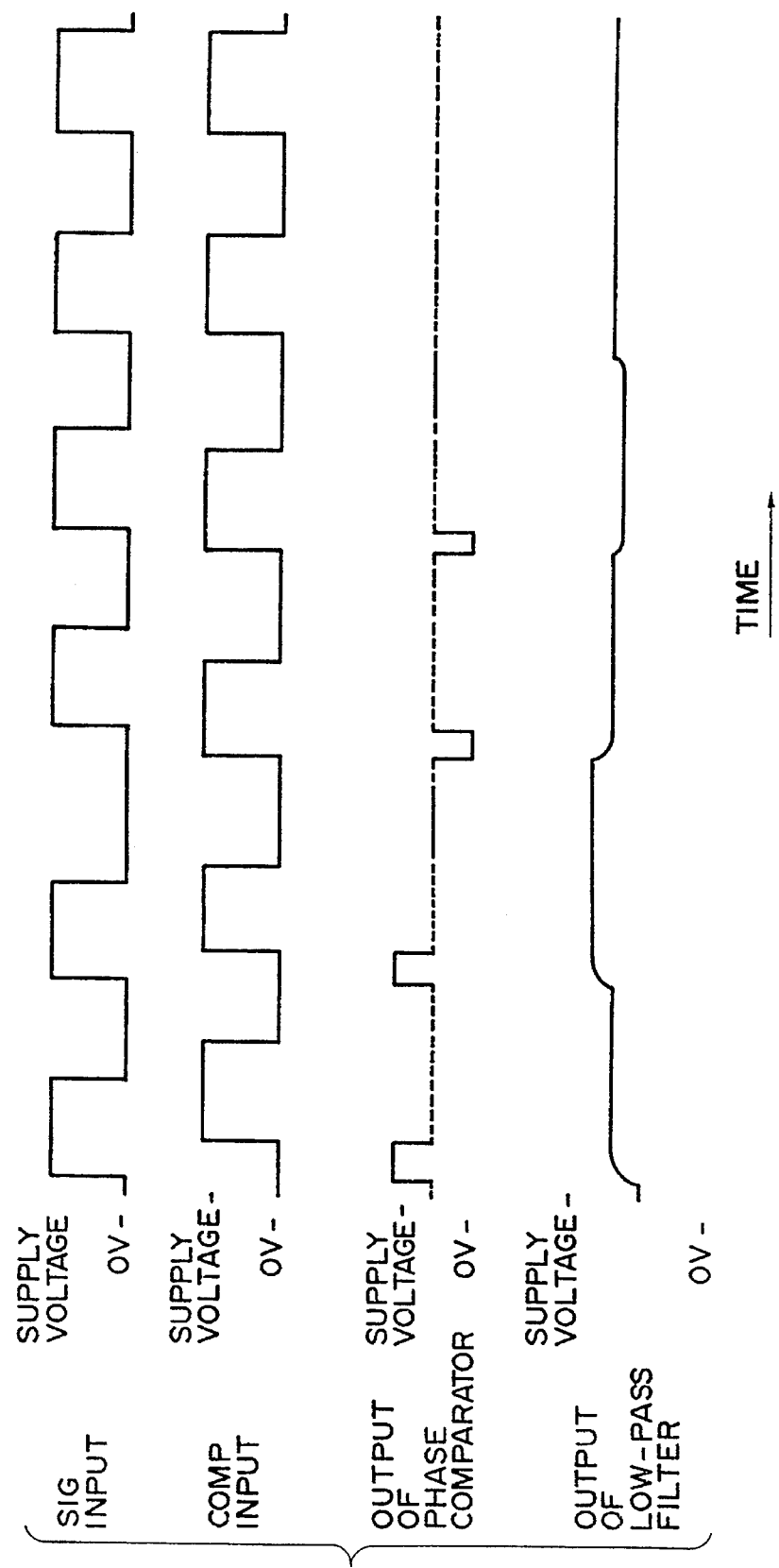
FIG. 32 is a chart showing the function of the phase/frequency comparator.

FIG. 31 is a circuit diagram showing an example of said phase frequency comparator, composed of J-K flip-flops 128, 129, a NAND gate 131, inverters 132, 133, NOR gates 134, 135, an inverter 136 and MOS transistors 137, 138. The CP terminals of said two J-K flip-flops constitute the input terminals SIG, COMP. If the input signal to SIG is advanced in phase in comparison with that to COMP, the MOS transistor 136 is turned on during the phase difference to release the power supply voltage as the output. On the other hand, in case the input signal to COMP is advanced in phase, the MOS transistor 137 is turned on during the phase difference to release 0 (V) as the output. Both input signals are of a same phase, MOS transistors 136, 137 are both turned off whereby the output is insulated. A resistor 104 and a capacitor 105 constitute a low-pass filter, which integrated the output of the above-explained phase comparator φ1 for supply to the voltage-controlled oscillator VCO1. FIG. 32 is a wave form chart showing the above-explained function, wherein chain lines indicate that the output of the phase frequency comparator is in the insulated state. Said comparator also functions by the difference in frequency of two input signals, and elevates or lowers the output voltage of said low-pass filter respectively the frequency of the input signal to SIG is higher or lower than that of the input signal to COMP.

Figure 33:
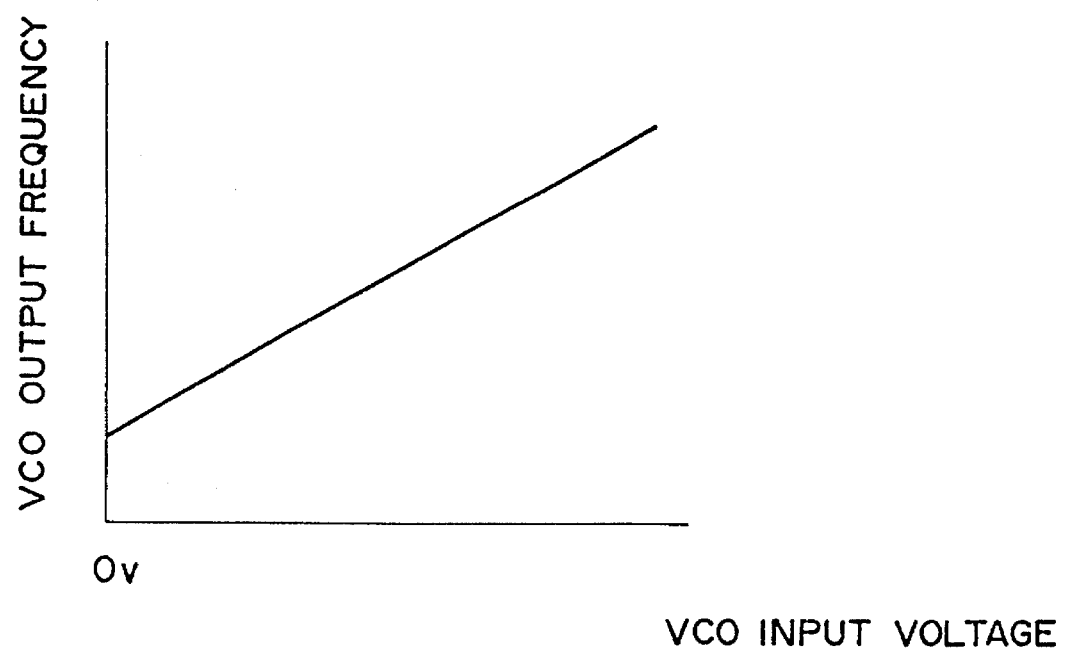
FIG. 33 is a chart showing the relationship between the input voltage and output frequency of a voltage-controlled oscillator.
Figure 34:
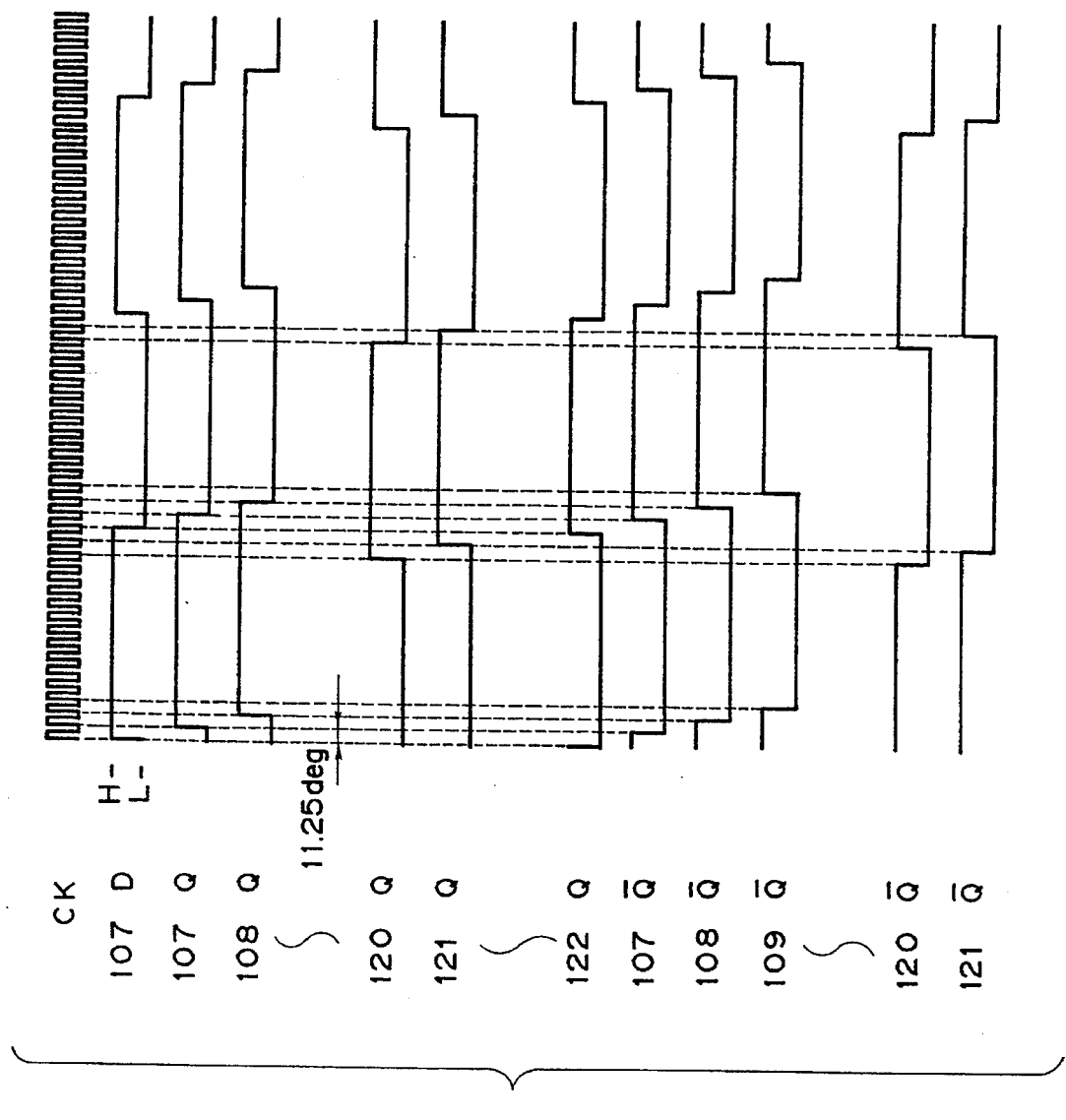
FIG. 34 is a timing chart showing the function of a shift register.

The VCO1 is a known voltage-controlled oscillator releasing a cyclic signal of which frequency is correlated with the input voltage as shown in FIG. 33. The output frequency increases or decreases respectively as the input voltage becomes higher or lower. The output cyclic signal of said voltage-controlled oscillator VCO1 is supplied to clock terminals CK of the D-flip-flops 107–122 constituting a known shift register, which divides the frequency of said output cyclic signal into 1/(number of D-flip-flops ×2), or 1/32 in this case. As a result, the first phase-locked loop effects a feedback operation to bring the COMP input cyclic signal equal to the SIG input cyclic signal in frequency and in phase. Thus the output frequency of the voltage-controlled oscillator VCO1 becomes equal to 32 times of the SIG input frequency, of the comparator φ1, or the output Q of the flip-flop 302. The output signals Q and $\overline{Q}$ of the D-flip-flops constituting said shift register are of the same frequency as that of the SIG input signal. The D input signal of the flip-flop 107 is of the same phase as that of said SIG input signal, and, as shown in FIG. 34, the output Q of said flip-flop 107 is delayed in phase by 360/32=11.25 (deg). The outputs Q of the subsequent flip-flops down to 122 are stepwise delayed by 11.25 (deg). Also the output $\overline{Q}$ of the flip-flop 107 ms different by 180 (deg), and the subsequent output $\overline{Q}$ are stepwise delayed by 11.25 (deg).

The multiplexer MPX2 receives the direction input signal at the control terminal CTL and selects the input A or B according to the driving direction of the ultrasonic wave motor. The multiplexer MPX3, composed of a known two-system multiplexer, receives the start input signal at the control terminal CTL, the output of the oscillator 126 at the input 1A, the output of the multiplexer MPX2 at the input 2B, the output $\overline{Q}$ of the D-flip-flop 302 at the input 2A, and the output of the wave form shaper at the input 2B. When said control terminal CTL is at the low-level state, the inputs 1A and 2A are selected and released, so that the phase frequency comparator φ2, same as the aforementioned comparator φ1, receives the output of the oscillator 126 and the output Q of the D-flip-flop 302 respectively at the SIG and COMP input terminals. The output of the comparator φ2 is supplied to the voltage-controlled comparator VCO2 through an integrator composed of a resistor 201 and a capacitor 202. Said voltage-controlled oscillator VCO2 is similar to the VCO1 but has a different output frequency region. The output cyclic signal of said VCO2 is supplied to the clock terminal CK of a known phase shifting divider composed of D-flip-flops 301, 302, whereby the outputs Q, $\overline{Q}$ of said two D-flip-flops provide output signals of a frequency of ¼ of that of output signal of the VCO2 and having mutual phase differences of 90 (deg). The output Q of the flip-flop 301 is advanced by 90 (deg) in comparison with that of the flip-flop 302. Thus the above-explained circuit constitutes a second phase-locked loop, functioning similarly to the aforementioned first phase-locked loop, thereby bringing the output $\overline{Q}$ of the D-flip-flop 302 same as the output of the oscillator 126 in frequency and phase, so that the output frequency of the voltage-controlled oscillator VCO2 becomes 4 times of the frequency of the oscillator 126, and the outputs Q of the flip-flops 301, 302 have the same frequency as that of said oscillator 126. Said oscillator 126 serves to set the starting drive frequency of the ultrasonic wave motor, and can be set at a suitable frequency capable of starting the motor. The output Q of the D-flip-flop 302 is supplied to one of the known power amplifiers 403, and the output Q of the flip-flop 301 is connected to one of input ports of the EXOR gate 303, of which the other input port receives the direction input signal. Consequently said EXOR gate 303 provides the other power amplifier 403 with an inverted signal of the output Q of the flip-flop 301 or said output Q respectively when the direction input signal is in the high-level state or in the low-level state, thereby switching the driving direction of the ultrasonic wave motor.

Said power amplifiers 403 intercept the outputs or amplify the input signals respectively when the start input signal is in the low-level state or in the high-level state. Said power amplifiers receive the output voltage of the known variable output power supply 402, of which output voltage is varied by the variable resistor 401, so that the output voltages VL of said power amplifiers can be varied by varying the output voltage of the variable output power supply by means of said variable resistor. The outputs of the power amplifiers are supplied, respectively through the inductive elements 50, to the input electrodes of the ultrasonic wave motor, but, in the initial state where the start input signal is at the low level state, the motor is not driven because of the absence of the drive voltages.

Figure 35:
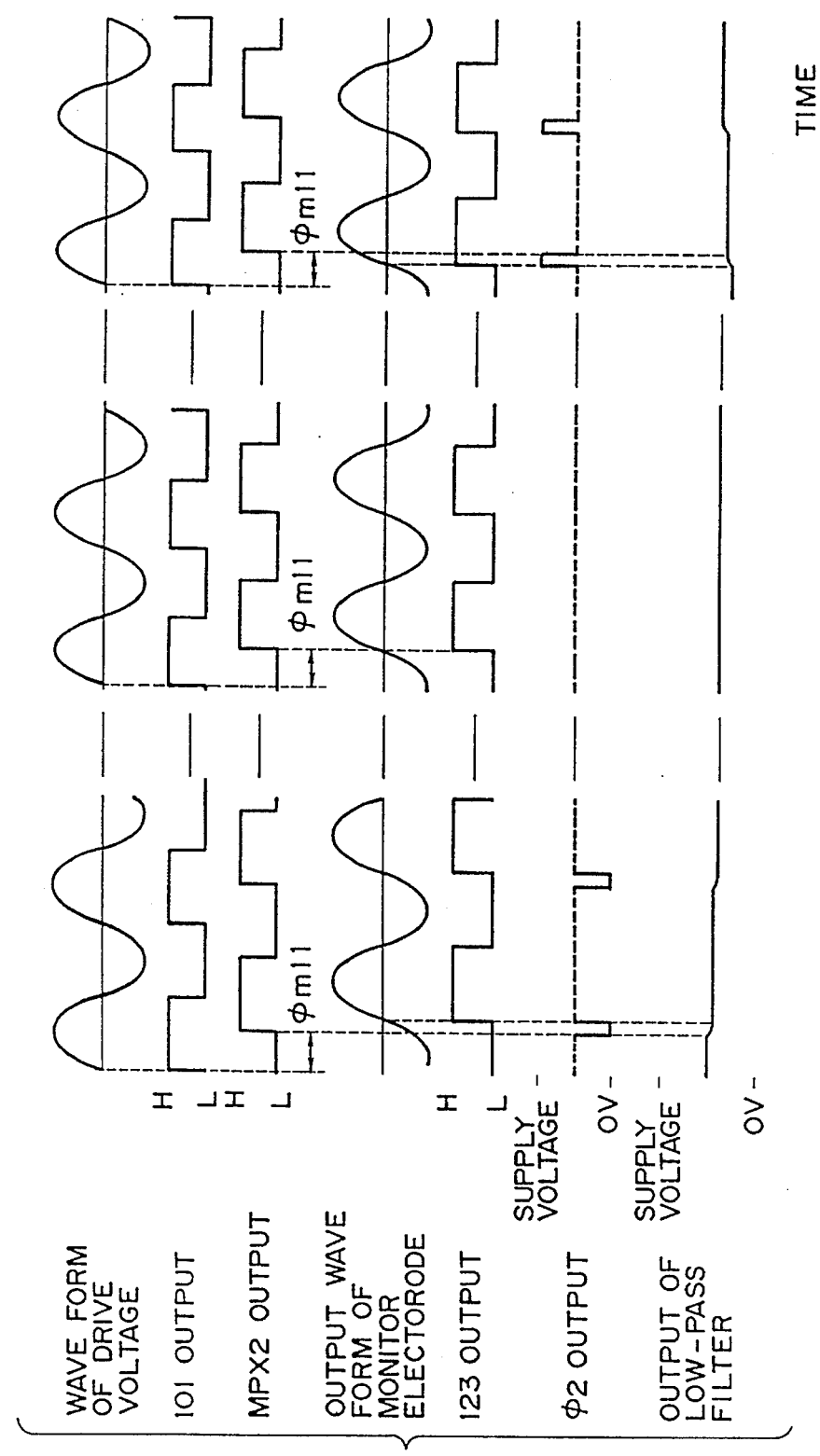
FIG. 35 is a timing chart showing the function of an example shown in FIG. 30.

When the output voltage of said variable output power supply 402 is set by the variable resistor 401 and the start input signal is shifted to the high-level state, the power amplifiers 403 start to apply the drive voltages to the motor, thereby starting the motor drive with a frequency same as the output frequency of the oscillator 126, and the inputs to the multiplexers MPX1, MPX3 are simultaneously switched. The multiplexer MPX1 selects the input B, or the output of the wave form shaper 101, which converts the drive voltage for the input electrode 100-4a into a square wave of a required magnitude. Thus the first phase-lock loop functions in the same manner as in the stopping of the ultrasonic wave motor, in synchronization with the drive voltage supplied to the input electrode 100-4a, whereby the flip-flops 107–122 provide cyclic signals of the same frequency as that of the drive voltage, and with predetermined phase differences. Since said first phase-locked loop is synchronized with the output frequency of said oscillator at the stopping of the ultrasonic wave motor, it can promptly follow the wave form of the drive voltage at the motor starting. In said second phase-locked loop, the multiplexer MPX3 is switched to select the inputs 1B and 2B, so that the comparator φ2 receives the output of said wave form shaper 123 at the SIG input terminal. Said wave form shaper 123 converts the output voltage of said monitor electrode into a square wave of a necessary magnitude. Also the COMP input terminal receives the output of said multiplexer MPX2, which selects the input A or B respectively when the direction input signal is at the low- or high-level state. In the present example, since the direction input signal is assumed to be in the high-level state, the drive voltage supplied to the input electrode 100-4a is advanced in phase than that to the electrode 100-4b. Consequently, the multiplexer MPX2 is given, respectively at the inputs A and B, outputs of the shift register corresponding to φm21 and φm11 in FIGS. 9 and 10, whereby the second phase-locked loop effects a feedback operation so as to bring the output of the monitor electrode at the same phase as that of the cyclic signal corresponding to φm11 or φm21. Even if a signal completely matching φm11 or φm21 in phase is not available, a considerably high drive efficiency can be obtained by selecting a closest output signal of the shift register. It is also possible to increase the number of division of phase by increasing the number of D-flip-flops constituting said shift register. Thus the phase comparator φ2 compares the output wave form of the monitor electrode and a cyclic signal having a phase difference φm11 or φm21 with respect to the wave form of the drive voltage. Since the direction input signal is assumed to be at the high-level state, the multiplexer MPX2 selects the input B and releases a cyclic signal of a phase difference φm11 with respect to the drive voltage for the input electrode 100-4a. As the output of the monitor electrode is delayed in phase with respect to said cyclic signal corresponding to φm11, namely in a situation φm1>φm11 in FIG. 9, and, if the drive frequency is higher than the antiresonance frequency F4, the output of the phase comparator φ2 releases 0 (V) during a period corresponding to said phase difference. Thus the output voltage of the low-pass filter is lowered to reduce the output frequency of the voltage-controlled oscillator VCO2, thereby reducing the drive frequency toward the antiresonance frequency F4. Thus the phase difference φm1 becomes smaller. In this state the first phase-locked loop functions in constant synchronization with the drive voltage, so that the multiplexer MPX2 continues to provide a cyclic output signal of a phase difference φm11 with respect to the drive voltage despite of the change in the drive frequency. When the drive frequency becomes equal to the antiresonance frequency, or when the output of the monitor electrode becomes equal in phase to the aforementioned cyclic signal of the phase difference φm11 with respect to the drive voltage, through the above-explained operation, the output of the phase comparator φ2 is insulated whereby the output of the low-pass filter is no longer varied. Thus the drive frequency no longer varies and is maintained at the antiresonance frequency. On the other hand, in case the output of the monitor electrode is advanced in phase, or φm1≦φm11, the drive frequency is lower than the antiresonance frequency. Thus the SIG input signal of the phase comparator φ2 is advanced in phase than the COMP input signal, so that said phase comparator releases the power supply voltage during a period corresponding to said phase difference. Consequently the output frequency of the voltage-controlled oscillator VCO2 is shifted higher to increase the drive frequency, thereby increasing φm1 and bringing the drive frequency toward the antiresonance frequency. When the drive frequency becomes equal to the antiresonance frequency and the monitor voltage becomes equal in phase to the cyclic signal corresponding to φm11, the output of the phase comparator φ2 becomes insulated whereby the drive frequency no longer varies and is maintained at the antiresonance frequency. The drive frequency is thus controlled at the antiresonance frequency, through the above-explained operations, which are represented in FIG. 35. The aforementioned comparators φ1, φ2 may be replaced by phase comparators of other types in constituting the phase-locked loops.

When the output voltage of the variable output power supply 402 is changed by the variable resistor 401, a phase difference between φm11 and φm1 is generated due to a change in the antiresonance frequency. In such situation the first and second phase-locked loops effect the above-explained operations to control the drive frequency setting means so as to maintain the drive frequency at the antiresonance frequency, thereby driving the ultrasonic wave motor constantly at a high drive efficiency.

When the driving direction is switched by shifting the direction input signal to the low-level state, the multiplexer MPX2 selects the input B to release a cyclic signal corresponding to φm21 in FIGS. 9 and 10, whereupon an operation similar to that explained in the foregoing is conducted to maintain the drive frequency at the antiresonance frequency.

Figure 4:
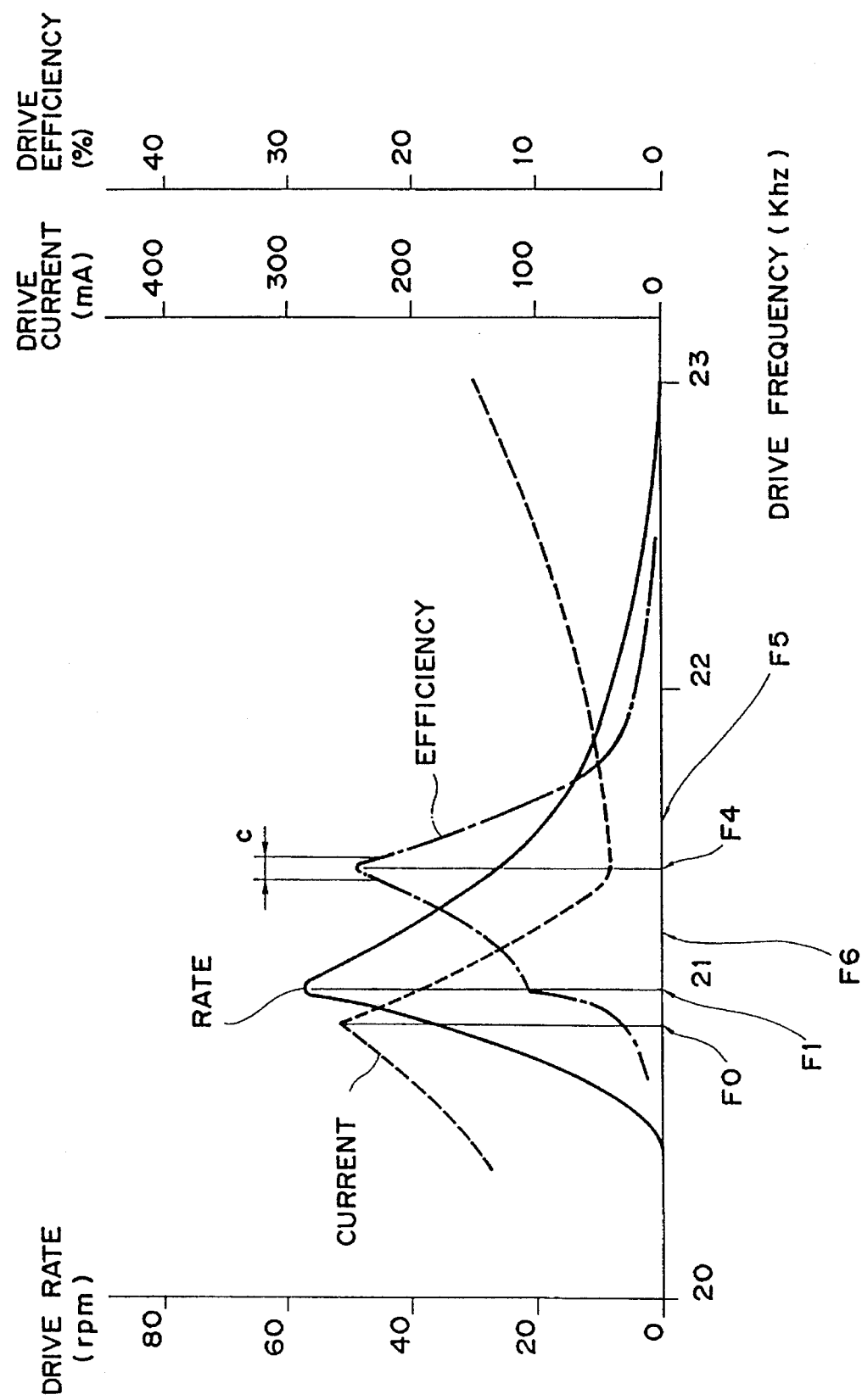
FIG. 4 is a chart showing an example of relationship among the drive speed, drive efficiency, drive current and drive frequency of an ultrasonic wave motor.
Figure 5:
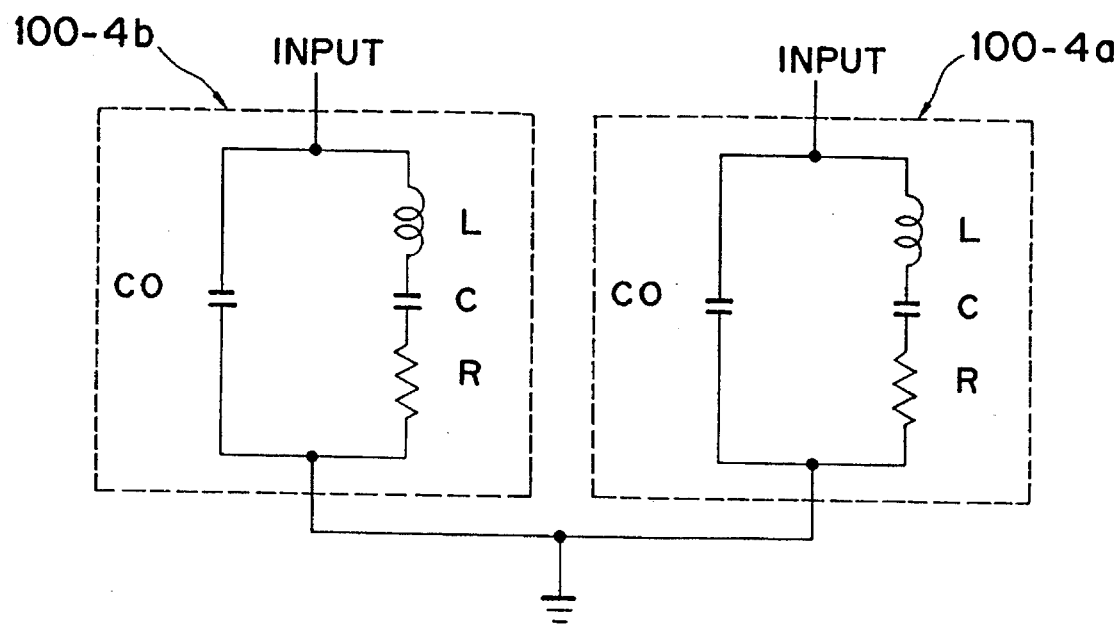
FIG. 5 is an equivalent circuit diagram of an ultrasonic wave motor.
Figure 6:
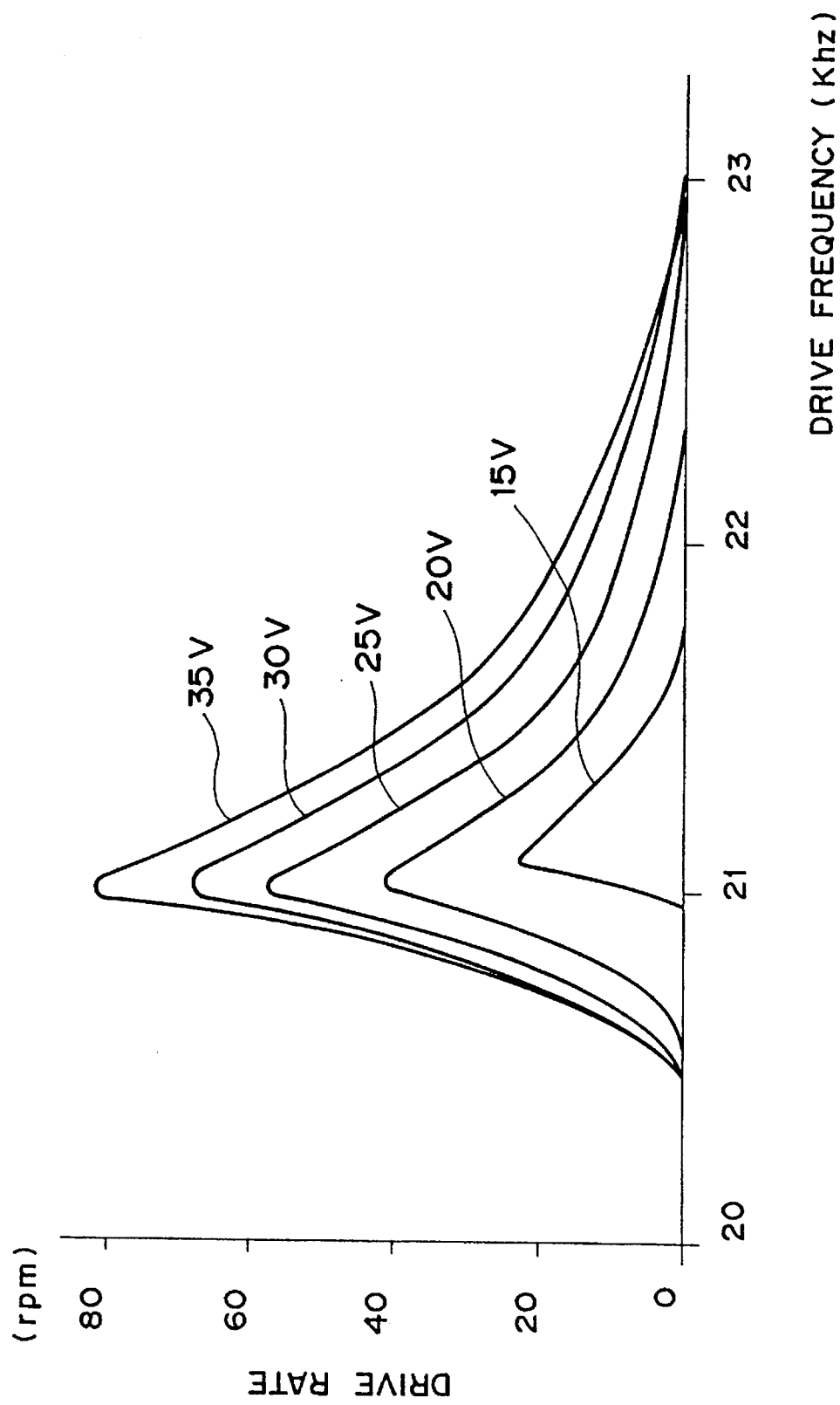
FIG. 6 is a chart showing an example of relationship between the drive speed and the drive frequency at different drive voltages.
Figure 36:
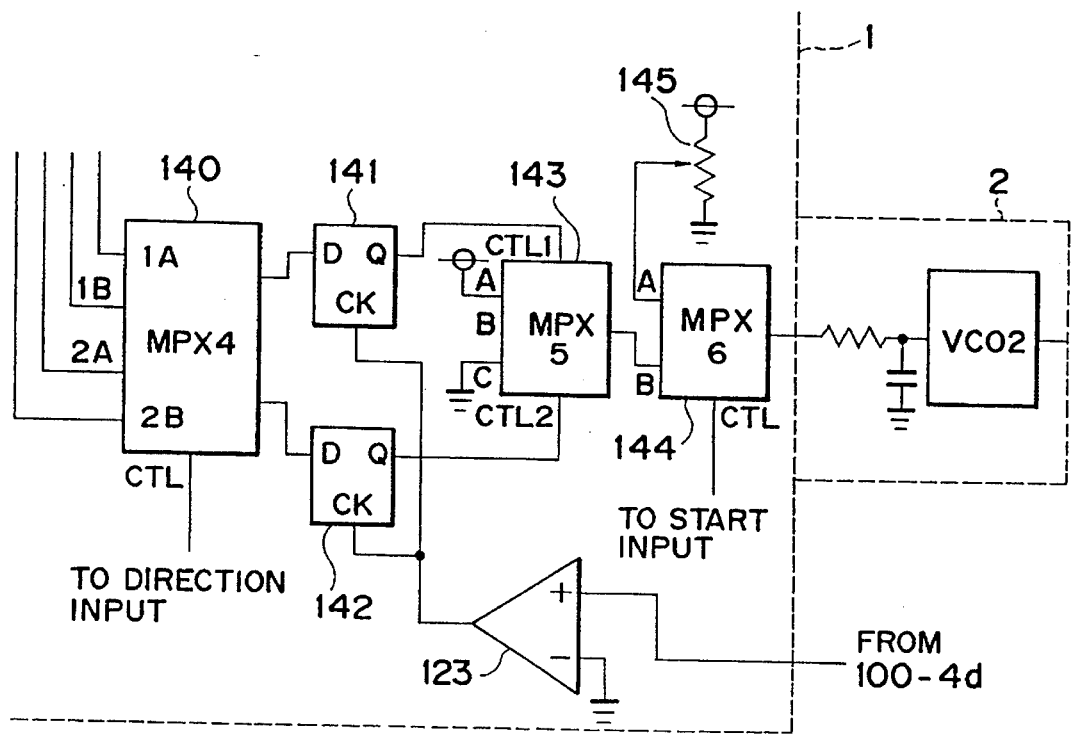
FIG. 36 is a partial circuit diagram of a modification of the 5th example.

In the following there will be explained a modification for controlling the drive frequency in a frequency region a shown in FIG. 4, including the antiresonance frequency, with reference to FIG. 36. Said modification is different from the example shown in FIG. 30 only in the drive state detecting means 10, and such different part alone is shown in FIG. 36 and will be explained in the following. The aforementioned first phase-locked loop is same as explained before and is not illustrated. The antiresonance state detecting means 1 is composed of said first phase-locked loop, a multiplexer 140 (MPX4), D-flip-flops 141, 142, known analog multiplexer 143, 144, a variable resistor 145 and the aforementioned wave form shaper 123. Said multiplexer MPX4, similar to the MPX3, receives the direction input signal at the control terminal CTL, and selects the inputs 1A, 2A or 1B, 2B respectively at the low- or high-level state of said direction input signal. The phase differences at the lower and higher frequencies at φm1, φm2 when the region a in FIG. 4 is applied to FIG. 9 are respectively represented by φm12, φm13, φm22, φm23, and the inputs 1A, 2A, 1B, 2B are respectively given outputs of said shift register corresponding to φm22, φm23, φm12, φm13. Two outputs of said multiplexer MPX4 are connected to the D input ports of the D-flip-flops, of which clock ports CK receive the output of the wave form shaper 123. The outputs Q of said D-flip-flops are connected to the control terminals CTL1, CTL2 of the multiplexer MPX5, which selects the input A when the terminals CTL1, CTL2 are both in the low-level state, or the input B when the CTL1, CTL2 are respectively in the high- and low-level states, or the input C when the CTL1, CTL2 are both in the high-level state.

The input A of said multiplexer MPX5 is connected to the power supply, while the input B is insulated, and the input C is grounded. The output of said multiplexer MPX5 is connected to the input B of the multiplexer MPX6, of which the input A receives the output of the variable resistor 145.

Said multiplexer MPX6 is connected, at the output thereof, to the drive frequency setting means 20, and, receiving the start input signal at the control terminal CTL, selects the input A or B respectively at the low- or high-level state of said start input signal. In the low-level state of the start input signal, the multiplexer MPX6 selects and releases the input A, whereby the output frequency of said drive frequency setting means 20 can be varied by said variable resistor 145, which is therefore set at a frequency capable of starting the ultrasonic wave motor.

In starting the motor by setting the direction input signal and the start input signal at the high-level state as in FIG. 30, said multiplexer MPX6 selects the input B. Also the multiplexer MPX4 selects and releases the inputs 1B, 2B because of the high-level state of the terminal CTL, whereby the D-input ports of the D-flip-flops 141, 142 respectively receive cyclic signals corresponding to φm12 and φm13. Since the ports CK receive the out,put of the wave form shaper 123, there can be discriminated whether the cyclic signal supplied to each D-input port is advanced or delayed in phase with respect to the output voltage of the monitor electrode, and the output assumes a high- or low-level state if said cyclic signal is advanced or delayed in phase, respectively. If the outputs Q of the flip-flops 141, 142 are both in the high-level state, the drive frequency is higher than the aforementioned region c, so that the multiplexer MPX5 selects the input C. Consequently the input voltage of the voltage-controlled oscillator VCO2 is reduced to decrease the drive frequency toward the region c. If the outputs Q of the flip-flops 141, 142 are respectively in the high- and low-level states, the drive frequency is positioned within said region c. In this case the multiplexer MPX5 selects the insulated input B, so that the input to the voltage-controlled oscillator VCO2 does not change and the drive frequency is retained. If said outputs Q are both in the low-level state, the drive frequency is lower than said region c. In this case the multiplexer MPX5 selects the input A, whereby the input voltage of the voltage-controlled oscillator VCO2 is elevated to increase the drive frequency toward said region c.

As explained above, if the drive frequency is higher or lower than the region c, it is shifted toward said region c, and, if it is contained within said region c, it is retained. When the direction input signal is shifted to the low-level state, the multiplexer MPX4 selects the inputs 1A, 2A and a similar operation is conducted.

In this manner the drive frequency is always controlled within a region c including the antiresonance frequency, whereby a high drive efficiency can be attained.

Said variable output power supply 402 may be composed of a DC-DC converter of variable output, as shown in FIG. 37. The output voltage of said DC/DC converter is divided by resistors 410, 411, and the divided voltage is compared by a voltage comparator 409 with a voltage obtained by dividing the voltage of a reference voltage supply 413 with a variable resistor 412. If said output voltage reaches the reference voltage, the output of an oscillator 415 is intercepted by an AND gate 414 to terminate the function of a switching transistor 406. If said output voltage does not reach the reference voltage, said switching transistor is activated by said oscillator through said AND gate, thereby elevating the output voltage of said DC/DC converter to the reference voltage. Said output voltage can be easily regulated by varying the reference voltage with said variable resistor 412. A variable output power supply can be constructed in simple manner with such DC/DC converter.

As an alternative method, a similar result can be obtained by replacing said variable output power supply with a fixed output power supply and controlling the gain of said power amplifiers.

Figure 38:
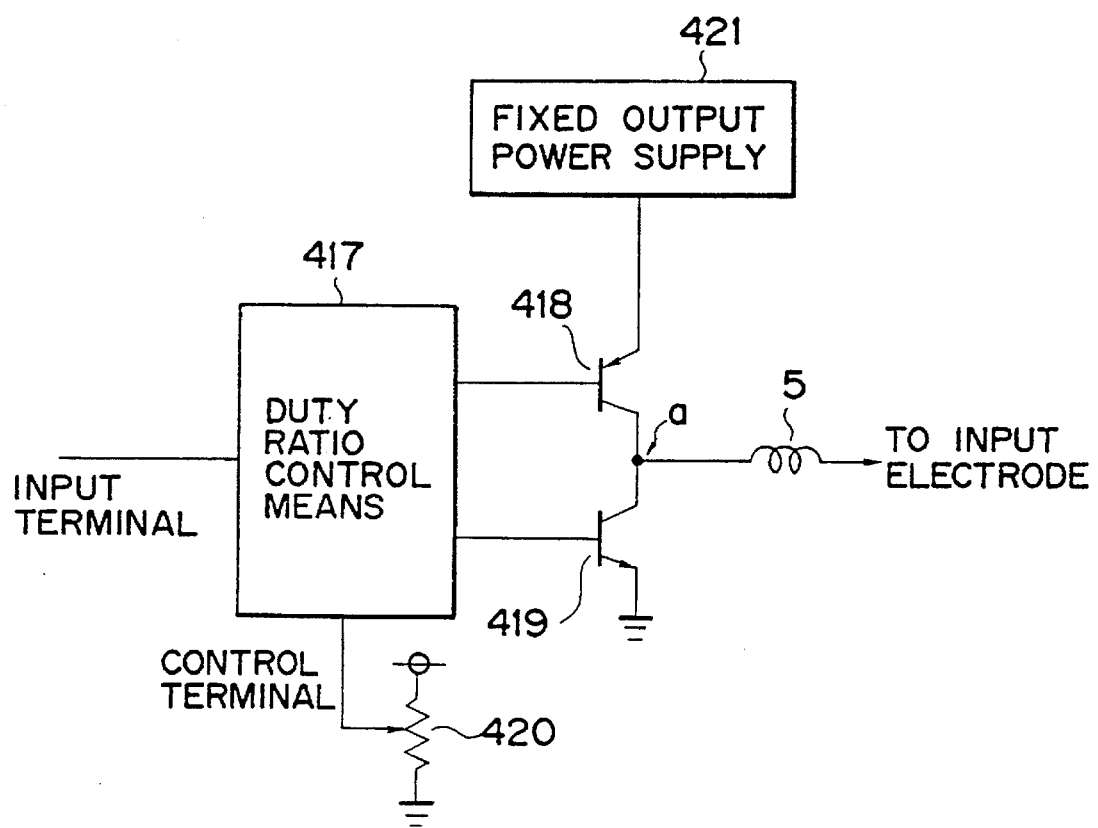
FIG. 38 is a circuit diagram of an example of drive voltage setting means.

Also there may be employed a method as shown in FIG. 38, in which said variable output power supply 402 is replaced by a fixed output power supply 421 and the drive voltage is regulated by controlling the on/off time ratio of power transistors 418, 419 by duty ratio control means 417. Said transistors are activated by the cyclic output signal of said control means 417, and the on-time of said transistors is so selected as not to exceed 50%. When the voltage supplied to the control terminal of said duty ratio control means 417 is decreased or increased by the variable resistor 420, the ratio of the on-time is respectively lowered to reduce the drive voltage or elevated to increase the drive voltage. When the drive frequency is varied with said ratio constant, the maximum drive efficiency is obtained at a drive frequency equal to the anti resonance frequency. Also when said ratio of on-time of the transistors is varied by said duty ratio control means, the antiresonance frequency becomes lower as said ratio increases. Also at the antiresonance frequency, the drive voltage becomes higher and the drive speed increases as said ratio increases. Consequently the drive speed can be arbitrarily regulated by varying the voltage supplied to said control terminal, and a high drive efficiency can be attained by the drive frequency controlling method explained in the foregoing.

As already explained before, the ultrasonic wave motor may run into troubles such as generation of abnormal noises or an unstable operation state if the drive voltage is excessively high or low. In order to prevent such drawbacks, the drive voltage setting means 40 is preferably given upper and lower limits in the drive voltage, which can be experimentally determined. Also the output voltage VM of the monitor electrode is substantially proportional to the amplitude of stator oscillation, and naturally increases or decreases as the drive voltage becomes larger or smaller. In consideration of this relationship, the drive voltage setting means 40 may be controlled by said output voltage VM. More specifically, the drive voltage setting means 40 is so controlled that the output voltage thereof no longer increases or decreases when the output voltage VM reaches a predetermined maximum or minimum value.

It is naturally possible to easily achieve a feedback control providing an arbitrary drive speed, by replacing, in said drive voltage setting means, the variable resistor for setting the drive voltage with speed detecting means such as a tachogenerator or a pulse encoder coupled with the rotor of the ultrasonic wave motor, comparing the output of said speed detecting means with a reference speed signal corresponding to the desired speed and accordingly controlling the drive voltage released from the drive voltage setting means.

Figure 39:
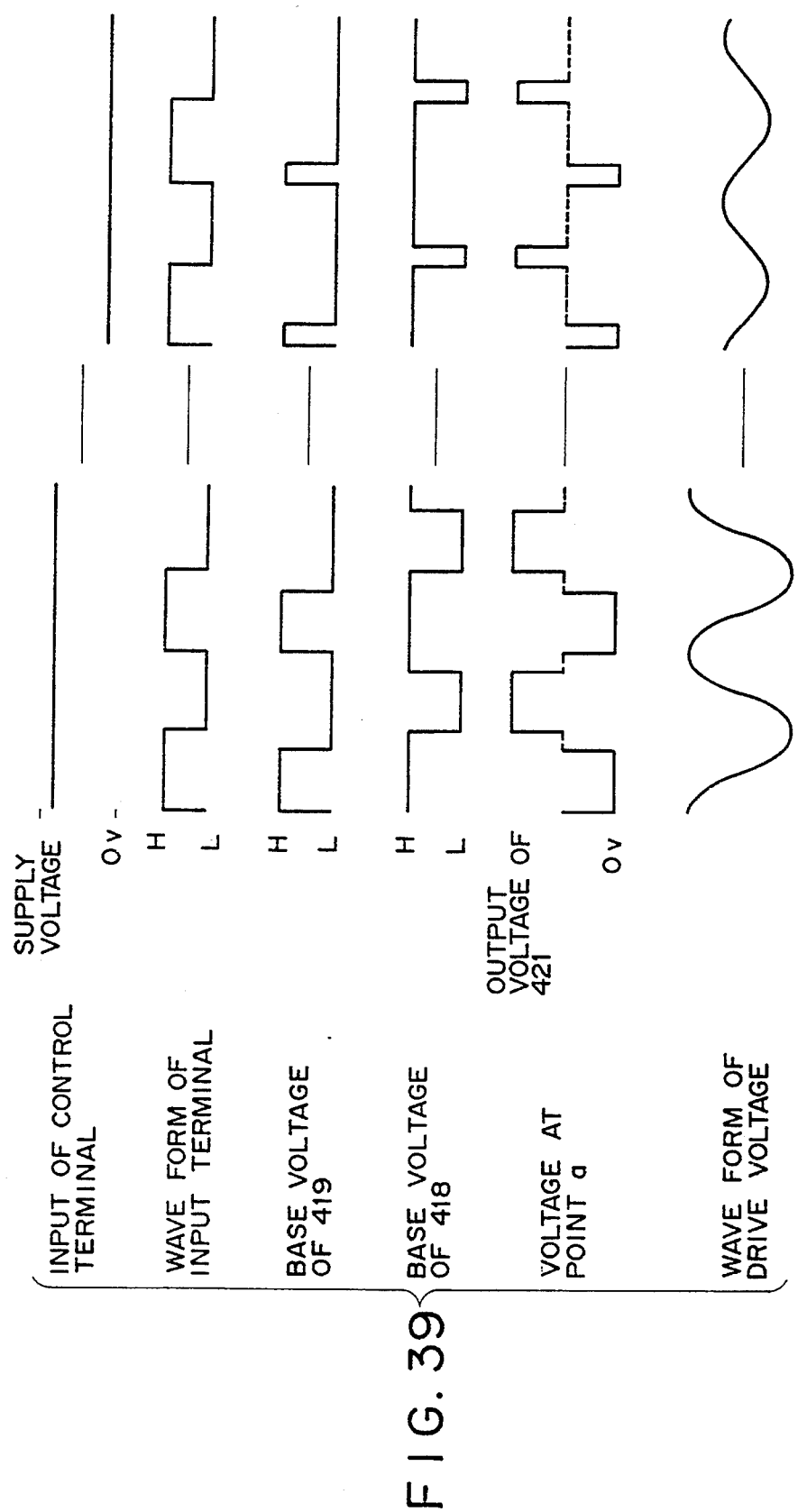
FIG. 39 is a timing chart showing the function of the circuit shown in FIG. 38.

FIG. 39 is a timing chart, showing the functions of the circuit shown in FIG. 38.

[6th example]

Figure 40:
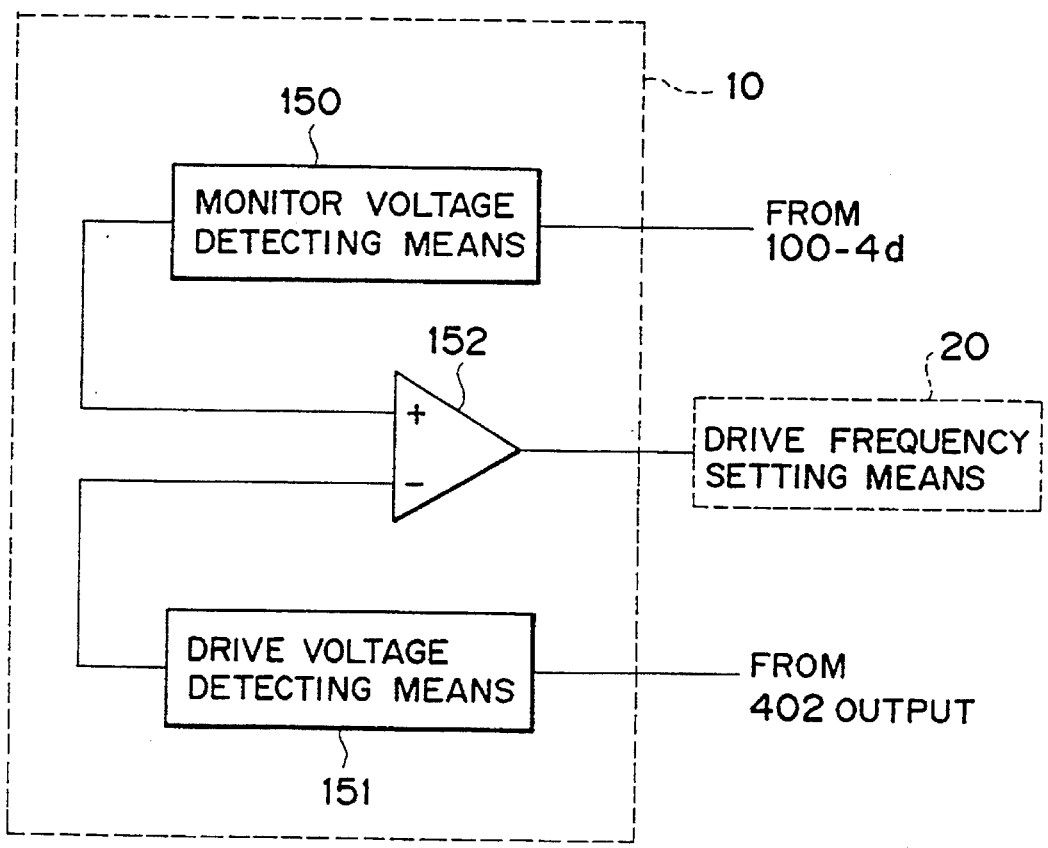
FIG. 40 is a circuit diagram of a 6th example.

In the following there will be briefly explained another example of the 2nd embodiment of the present invention, with reference to FIG. 40. In this 6th example, the drive frequency of the ultrasonic wave motor is controlled at the antiresonance frequency, according to the output voltage of said monitor electrode 100-4d. FIG. 40 illustrates the drive state detection means 10 only, as other portions are same as those in the 5th example.

Figure 12:
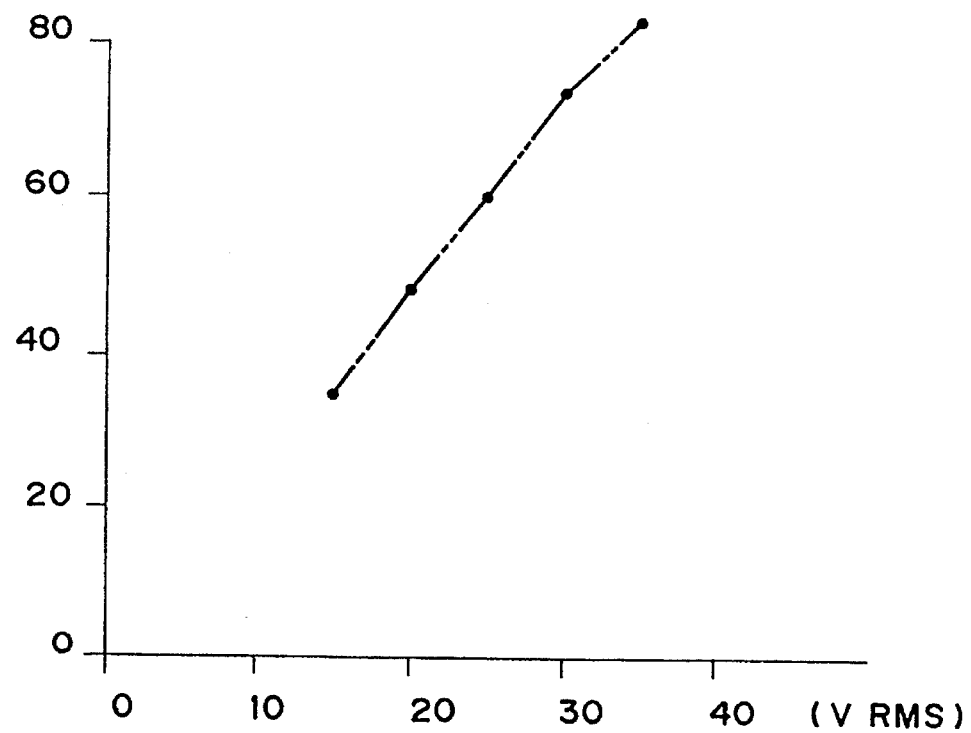
FIG. 12 is a chart showing the output voltage of the monitor electrode at the antiresonance frequency, as a function of the drive voltage.
Figure 13:
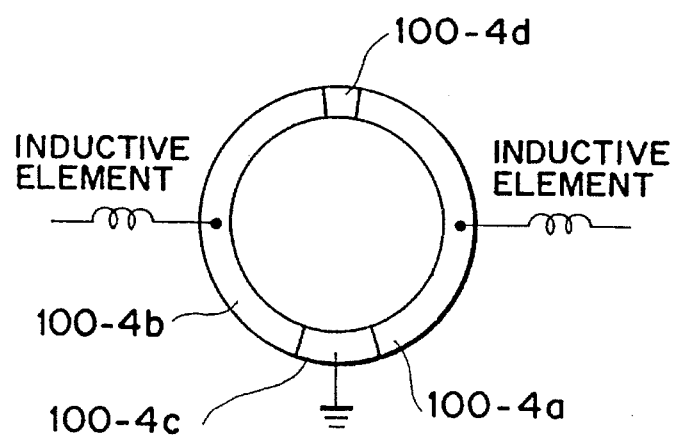
FIG. 13 is a view showing inductive elements connected to the input electrodes of the piezoelectric member constituting an ultrasonic wave motor.
Figure 41:
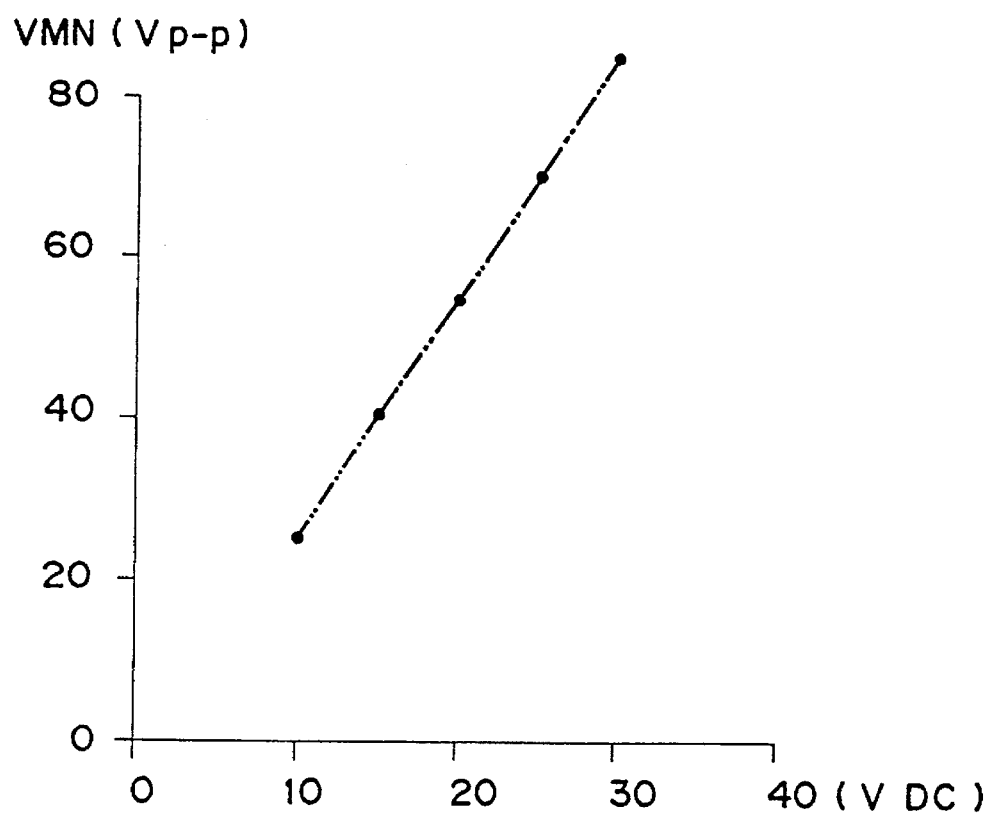
FIG. 41 is a chart showing the relationship between the output voltage of variable power source and the output voltage of the monitor electrode at the antiresonance frequency in the 6th example.

Said drive state detecting means is composed of monitor voltage detecting means 150, drive voltage detecting means 151 and a known error amplifier 152. The monitor voltage detecting means 150 converts the output cyclic voltage of the monitor electrode 100-4d into a DC voltage of an appropriate level. The drive voltage detecting means 151 detects the output voltage of the variable output power supply 402 and converts it into an appropriate level. The error amplifier 152 amplifies the difference between the outputs of said monitor voltage detecting means and said drive voltage detecting means. Because of the presence of the inductive elements between the power amplifiers and the input electrodes of the ultrasonic wave motor, the drive voltages supplied to said input electrodes vary depending on the drive frequency, even if the variable output power supply has a constant output, so that the output voltage of said variable output power supply is detected. It is also possible to detect the variable output voltage of the variable resistor 401. In the absence of said inductive elements, said drive voltages may naturally be detected. Even in the presence of said inductive elements between the power amplifiers and the input electrodes, the output voltage of said variable output power supply is correlated as shown in FIG. 12 with the output voltage of the monitor electrode at the antiresonance frequency. Thus the monitor voltage VMN at the antiresonance frequency becomes higher as the output voltage of the variable output power supply increases, as shown in FIG. 41.

The function of said drive state detecting means will be briefly explained in the following. The relationship between the output voltage of said drive voltage detecting means and the output of said monitor voltage detecting means is so selected as to satisfy the relation shown in FIG. 41, namely in such a manner that output voltage of the drive voltage detecting means corresponding to the output voltage of said variable output power supply coincides with the output of the monitor voltage detecting in response to said output voltage VMN at said output of the variable output power supply. Said error amplifier compares the outputs of said drive voltage detecting means and said monitor voltage detecting means. As the latter is lower in case the drive frequency is higher than the antiresonance frequency, the output voltage of said error amplifier decreases to reduce the drive frequency whereby the output voltage VMN of the monitor electrode increases. On the other hand, if the drive frequency is lower than the antiresonance frequency, the output voltage of the monitor voltage detecting means is higher than that of the drive voltage detecting means, so that the output voltage of said error amplifier increases to elevate the drive frequency whereby the output voltage VMN of the monitor electrode decreases. Through the operations explained above, the drive frequency setting means 2 is so controlled that the outputs of said drive voltage detecting means and of the monitor voltage detecting means mutually coincide, whereby the drive frequency is controlled at the antiresonance frequency. In case of FIG. 41, as an almost linear relationship stands between the output of said variable output power supply and the output voltage VMN, the drive frequency can be easily controlled at the antiresonance frequency by varying the drive speed with said variable resistor.

Also in case said relationship is not linear, the drive frequency can be easily controlled at the antiresonance frequency by investigating, in advance, the relation of VMN and the output voltage or the drive voltage.

[7th example]

In the following there will be explained, with reference to FIG. 42, another example of the 2nd embodiment of the present invention, for controlling the drive frequency at the antiresonance frequency in case the inductive elements are connected between the power amplifiers and the input electrodes of the ultrasonic wave motor, according to the phase difference between the voltages across said inductive element, namely the phase difference between the output voltage of the power amplifier and the drive voltage.

Figure 42:
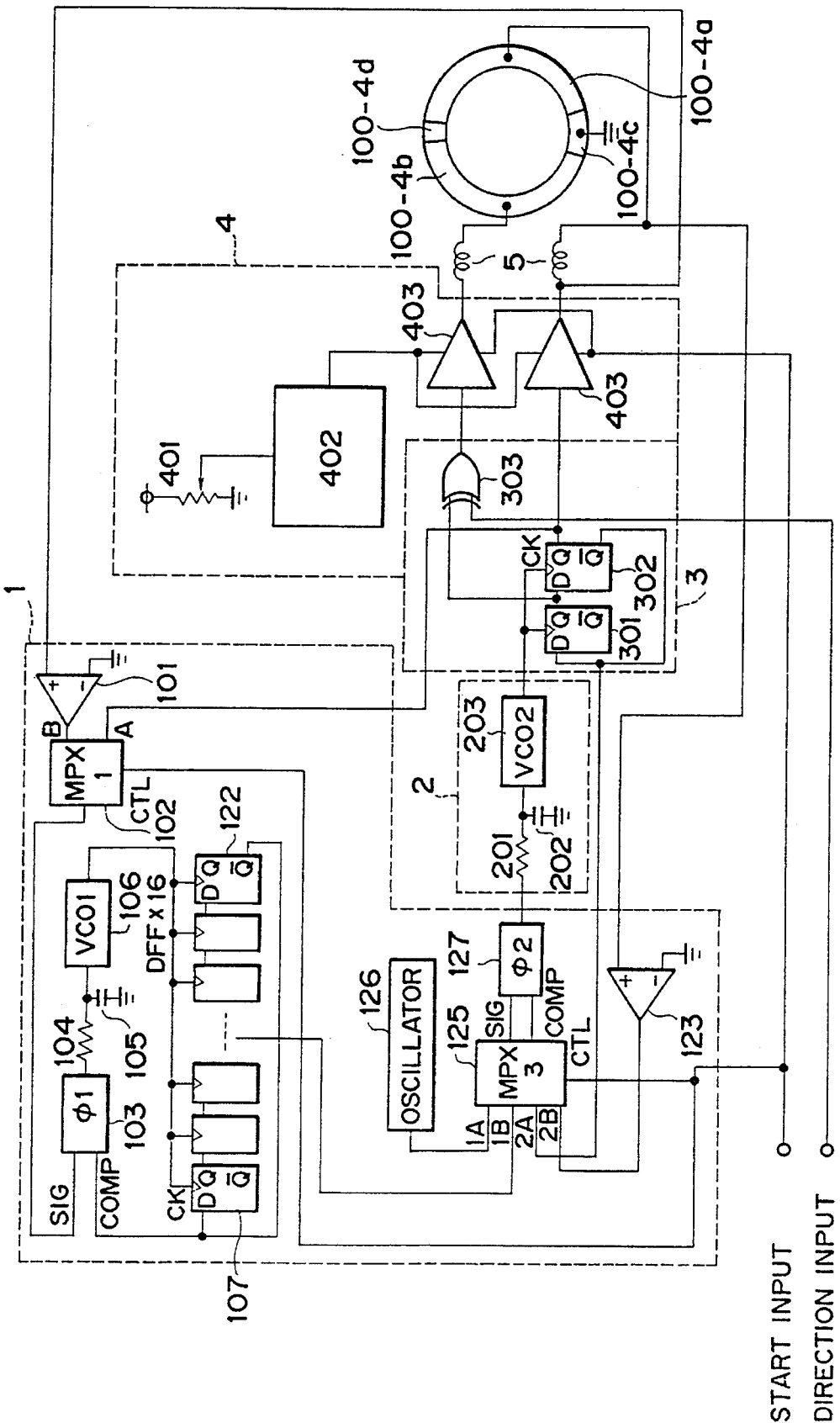
FIG. 42 is a circuit diagram of a 7th example.

The example shown in FIG. 42 is same as the 4th example shown in FIG. 30, except the drive state detecting means 1. In the present example, an input port of the wave form shaper 101 is connected to the output of the power amplifier for supplying electric power to the input electrode 100-4a, and an input port of the wave form shaper 123 is connected to said input electrode 100-4a. In the present example the multiplexer MPX2 is omitted because the phase difference between the voltages across the inductive element is not varied, unlike the 5th example, by the switching of the driving direction. The function when the ultrasonic wave motor is stopped by the low-level state of the start input signal is same as that in the 5th example.

When the start input signal is shifted to the high-level state for starting the motor, there are given drive voltages with a frequency released from the oscillator 126, and the multiplexers MPX1, MPX3 are switched to the inputs B, 1B and 2B.

Figure 14:
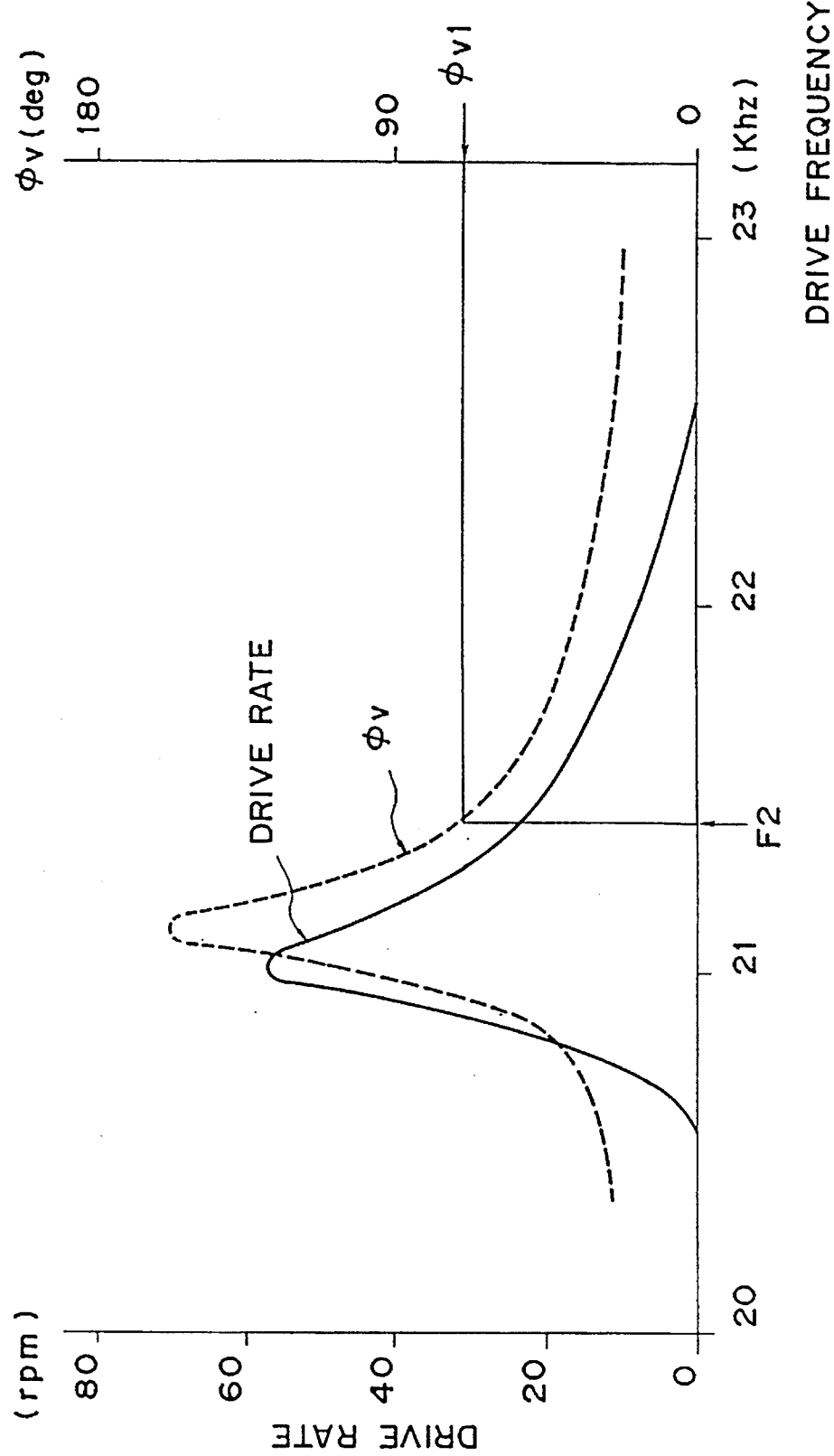
FIG. 14 is a chart showing an example of the drive speed and the phase difference between the voltages across an inductive element, as a function of the drive frequency.
Figure 15:
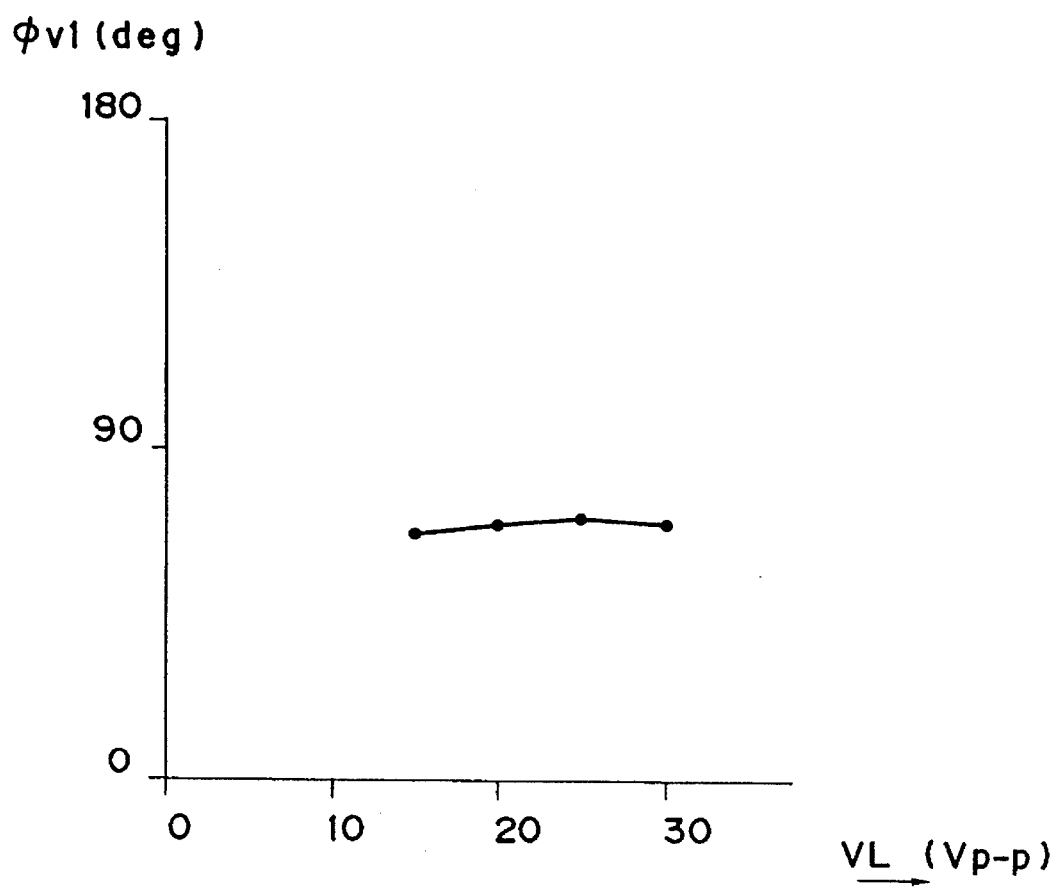
FIG. 15 is a chart showing the phase difference between the voltages across the inductive element at the antiresonance frequency, as a function of the voltage applied to said inductive element.

The first phase-locked loop functions in synchronization with the output voltages of the power amplifiers, whereby the D-input signal to the D-flip-flop 107 becomes same in phase as the output of said wave form shaper 101, and the D-flip-flops 107–122 constituting the shift register provide respectively cyclic signals of predetermined phase differences as explained in the 5th example. Among said cyclic signals, an output signal corresponding to $\phi v1$ shown in FIG. 14 is selected and supplied to the input 1B of the multiplexer MPX3. If a completely coinciding signal is not available, there may be taken measures as explained in the 5th example.

The input 2B of the multiplexer MPX3 is given the output of the wave form shaper 123, whereby the second phase-locked loop so functions as to cancel the phase difference between said cyclic signal corresponding to $\phi v1$ and the output of said wave form shaper 123 or the drive voltage applied to said input electrode 100-4a. For example if the output of the wave form shaper 123 is advanced in phase with respect to the cyclic signal corresponding to $\phi v1$, there stands a situation $\phi v < \phi v1$ and the drive frequency is higher than the antiresonance frequency. In such case the phase comparator $\phi 2$ releases 0 V according to the phase difference, whereby the output voltage of the low-pass filter composed of a resistor 201 and a capacitor 203 is lowered and the drive frequency is decreased toward the antiresonance frequency. When both signals coincide in phase, the output of the comparator $\phi 2$ is insulated. Thus the output of the low-pass filter no longer varies and the drive frequency is retained at the antiresonance frequency. On the other hand, in case the drive voltage is delayed in phase in comparison with said cyclic signal corresponding to $\phi v1$, there stands a situation $\phi v > \phi v1$ and the drive frequency is lower than the antiresonance frequency. In such case the comparator $\phi 2$ releases the power supply voltage according to the phase difference, whereby the output voltage of said low-phase filter is elevated to increase the drive frequency. When both signals coincide in phase, the output voltage of said low-pass filter is retained, and the drive frequency is retained at the antiresonance frequency. Also in case the antiresonance frequency varies due to a change in the ambient conditions in the course of motor operation, the drive frequency is constantly maintained at the antiresonance frequency through a similar operation.

8th example

Figure 16:
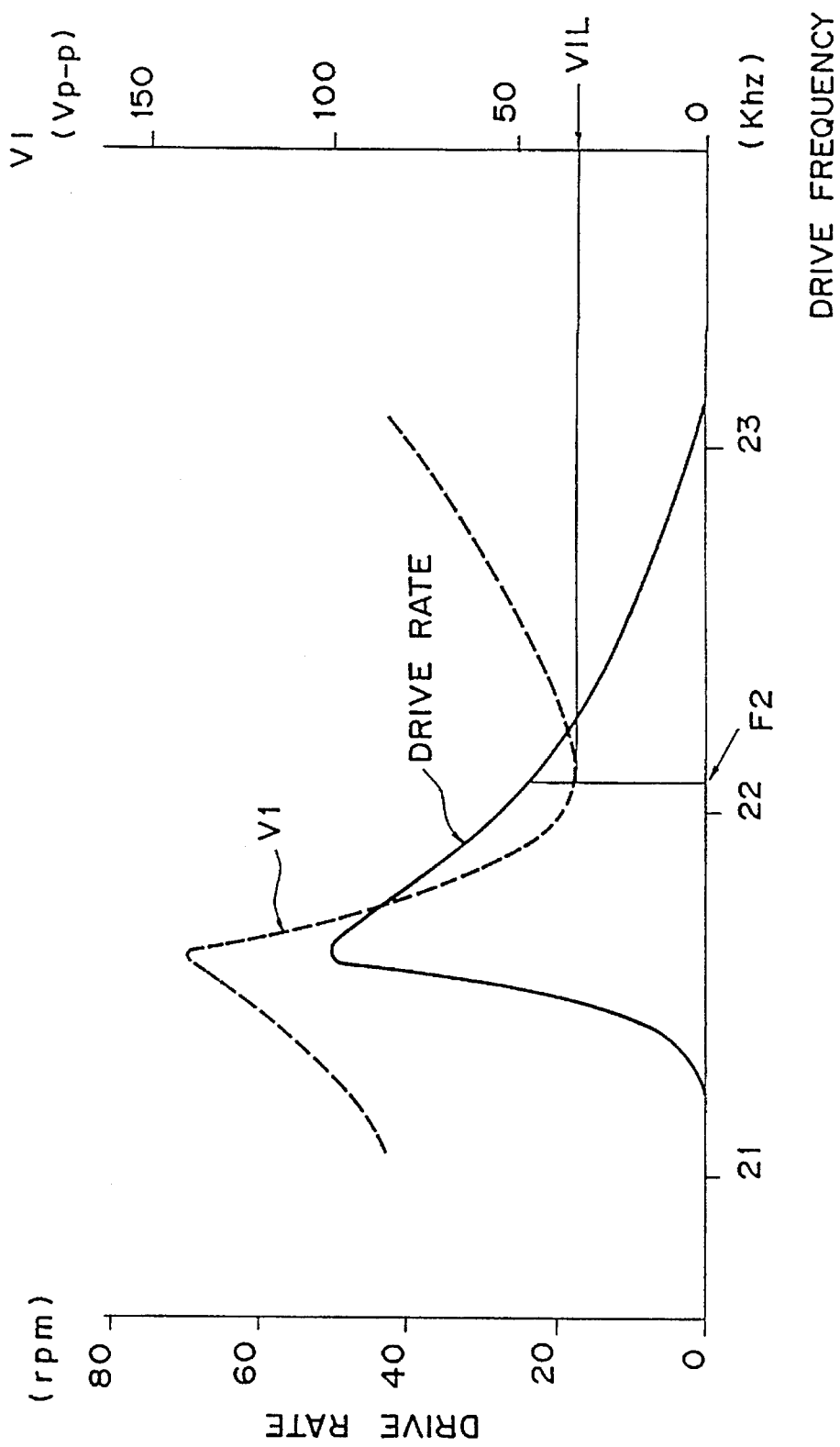
FIG. 16 is a chart showing an example of the drive speed and the voltage applied to the input electrode of the ultrasonic wave motor as a function of the drive frequency, when the driving power is supplied through inductive elements.
Figure 43:
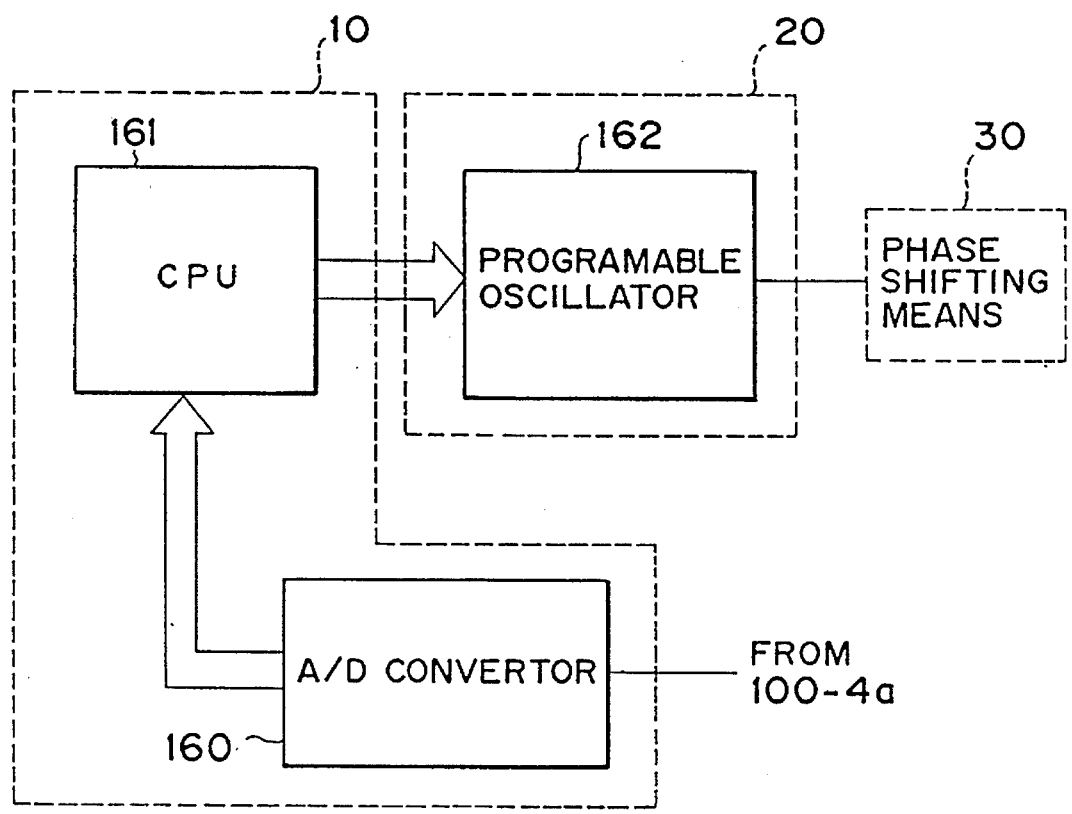
FIG. 43 is a circuit diagram of an 8th example.

In the following there will be explained another example in which, in driving the ultrasonic wave motor by connecting the inductive elements between the power amplifiers and the input electrodes of said motor as in the 7th example, the drive frequency is controlled at the antiresonance frequency by a change in the drive voltage, with reference to FIG. 43 in which the frequency dividing/shifting means 30 and the drive voltage setting means 40 are omitted as they are same as those shown in FIG. 30. The drive state detecting means 10 is composed of an A/D converter 160 and a microcomputer (CPU) 161, while the drive frequency setting means 20 is composed of a programmable oscillator (POSC) 162. Said microcomputer receives the wave form of the drive voltage supplied to the input electrode 100-4a in the form of digital data through said A/D converter. Said programmable oscillator 162 is connected with the microcomputer 161 through a bus, and the output frequency is determined by an instruction from said microcomputer. The drive frequency is thus controlled by said microcomputer 161. A control on the programmable oscillator 162 to vary the output frequency thereof so as to minimize the drive voltage received from said A/D converter 160 corresponds to an adjustment in FIG. 16 of bringing the voltage VI to VIL, so that the drive frequency is controlled at the antiresonance frequency.

Figure 17:
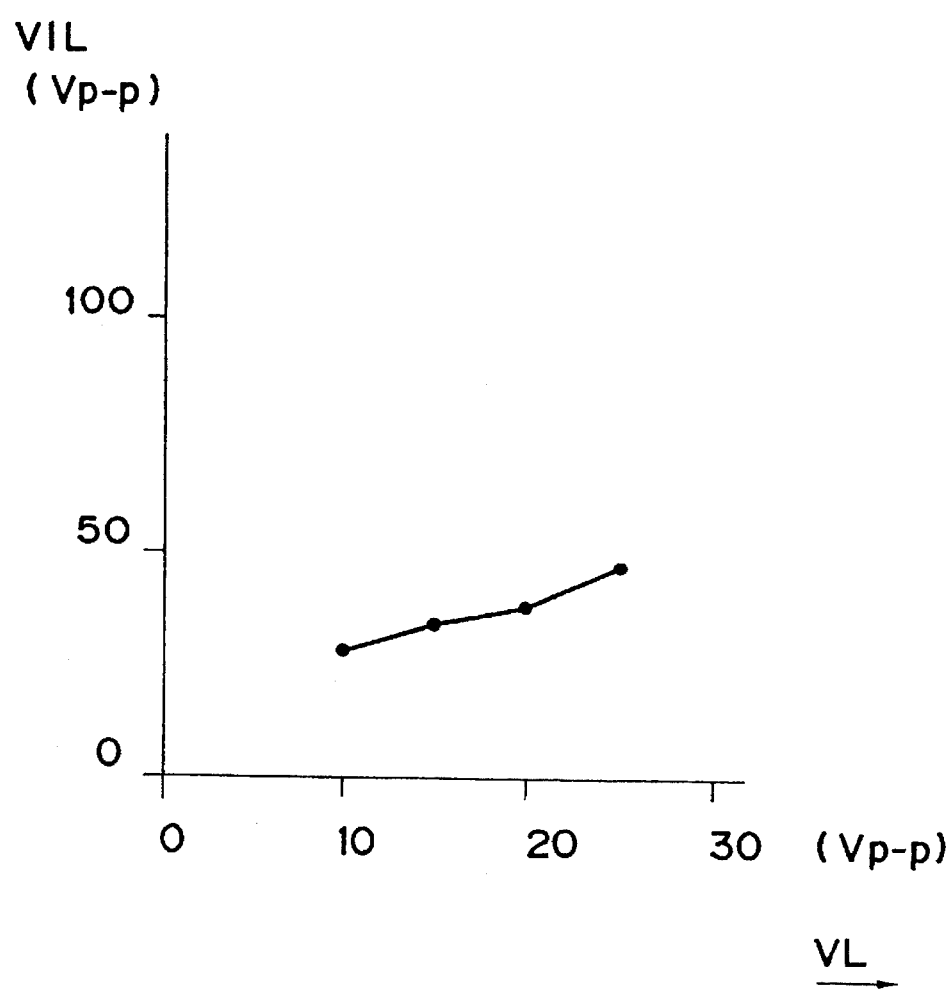
FIG. 17 is a chart showing the applied voltage shown in FIG. 16, as a function of the voltage applied to the inductive element at the antiresonance frequency.

It is also possible to detect the voltage VL applied to said inductive element by the CPU through an unrepresented additional A/D converter, determine the VIL from the relation shown in FIG. 17, and control the programmable oscillator by the CPU so as to obtain a drive frequency corresponding to the VIL in this state.

9th example

Figure 18:
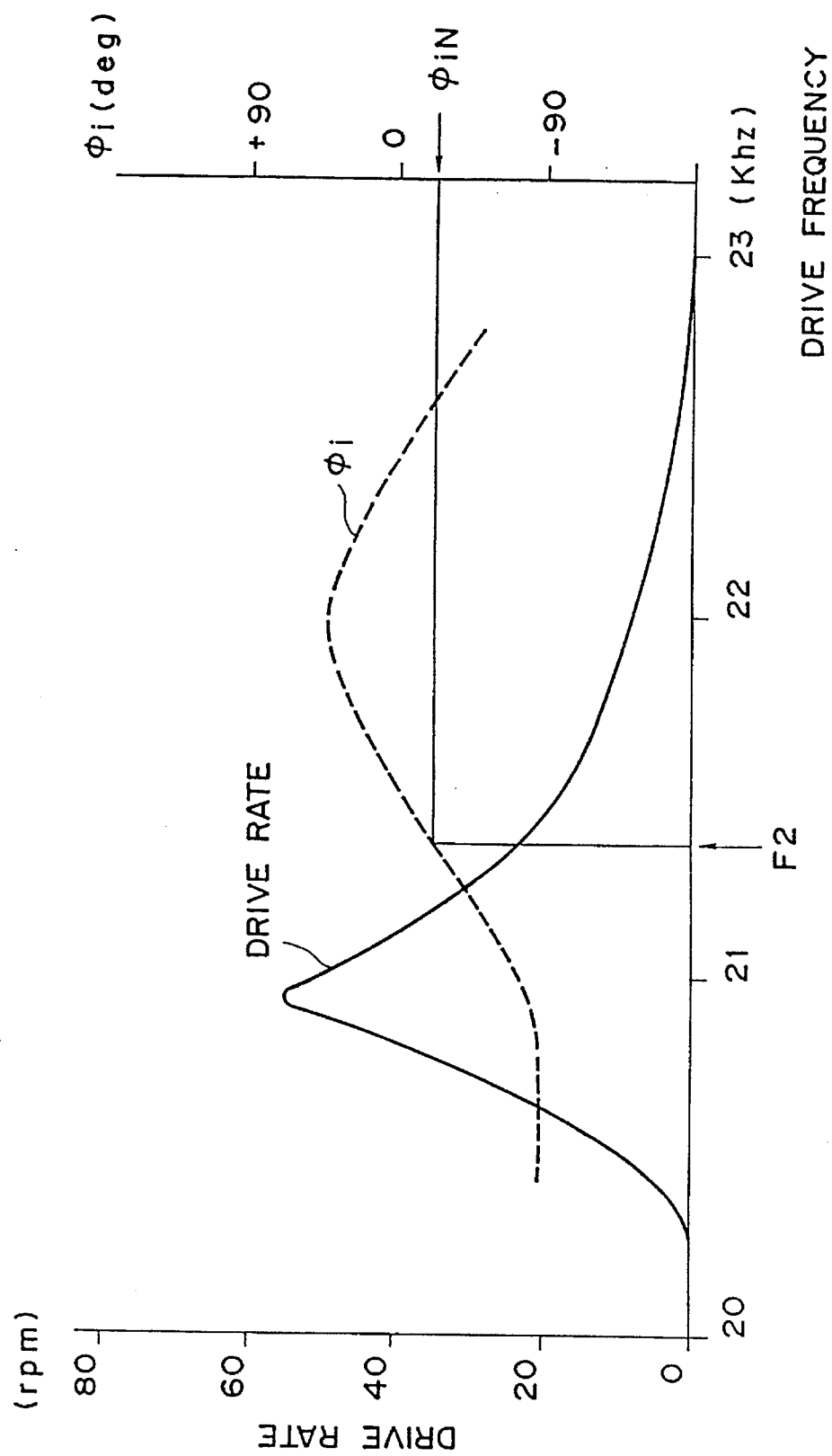
FIG. 18 is a chart showing the drive speed and the phase difference between the drive voltage and the current flowing into the input electrode as a function of the drive frequency.
Figure 19:
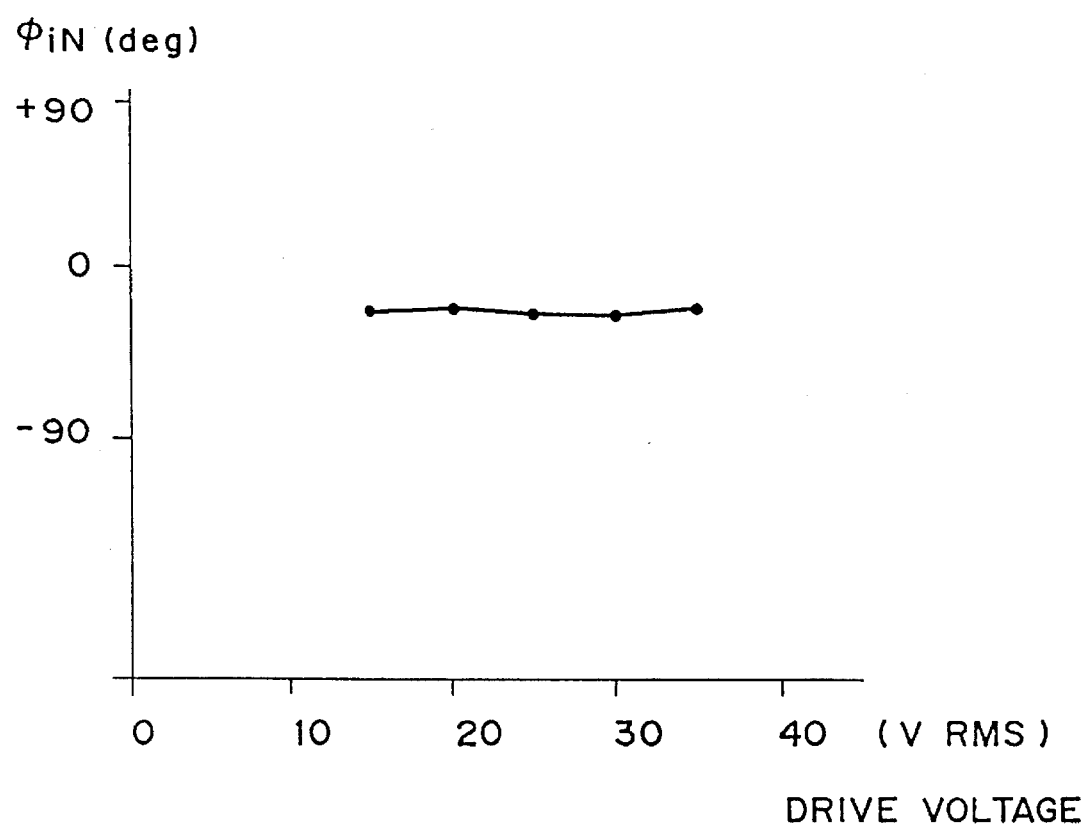
FIG. 19 is a chart showing the phase difference between the drive voltage and the flowing current as a function of the drive voltage at the antiresonance frequency.
Figure 44:
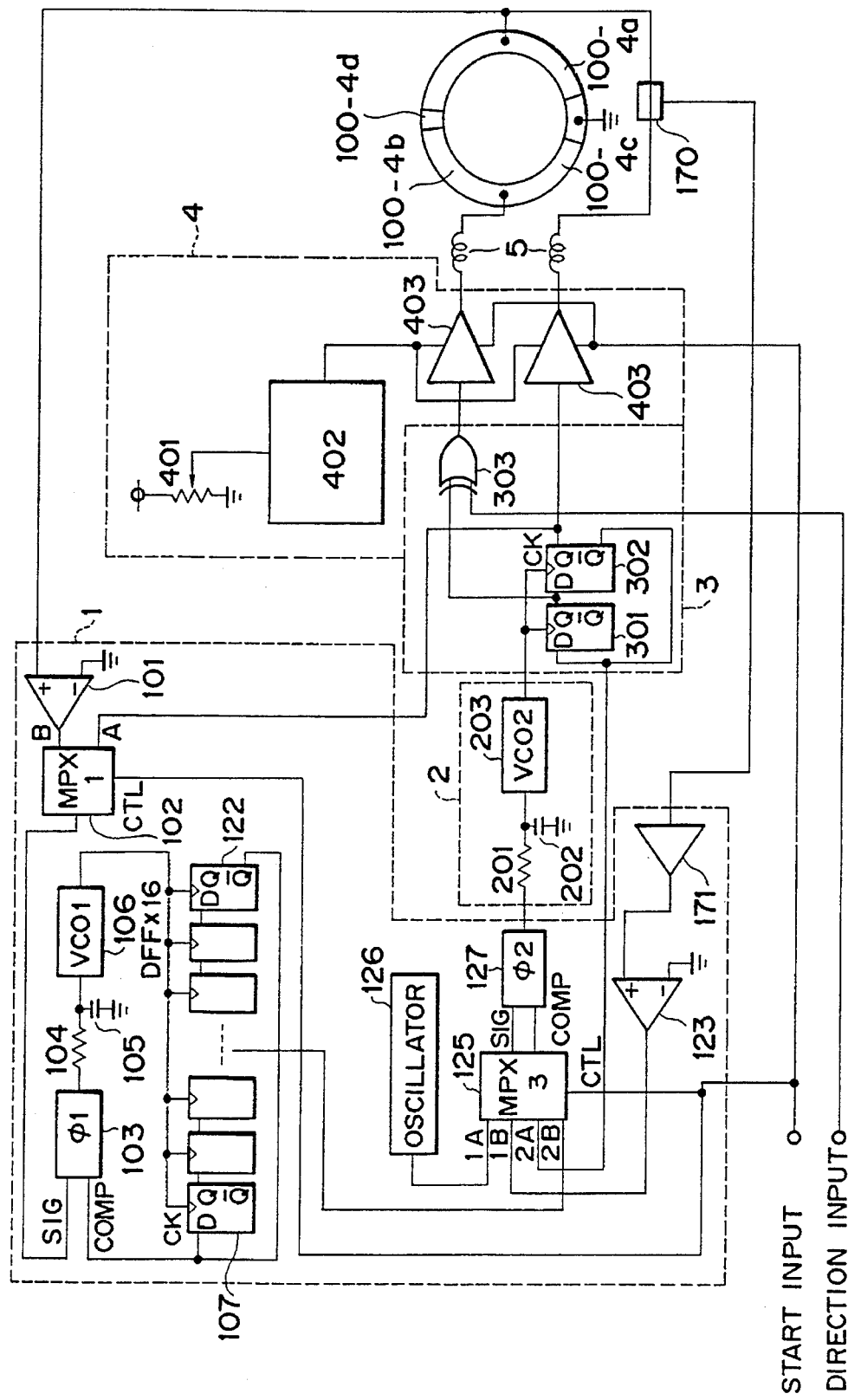
FIG. 44 is a circuit diagram of a 9th example.

A next 9th example effects control by the phase difference between the current flowing into the input electrode and the drive voltage. In this case, as shown in FIG. 44, a current detecting element such as a Hall element 170 is provided at the junction between the input electrode and the power amplifier or the inductive element, thereby detecting the current flowing into said input electrode, and the drive frequency is controlled so as to bring the phase difference $\phi i$ shown in FIG. 18 to $\phi iN$ through a process similar to that of the 5th example. In this case the multiplexer MPX2 is omitted since the phase difference $\phi i$ does not vary by the driving direction so that the signal corresponding to $\phi iN$ need not be switched according to the driving direction. An amplifier 171 is provided for amplifying the output of the Hall element, and sends the output to the wave form shaper 123. The function of this example is similar to that of the foregoing examples and will not, therefore, be explained further.

10th example

Figure 45:
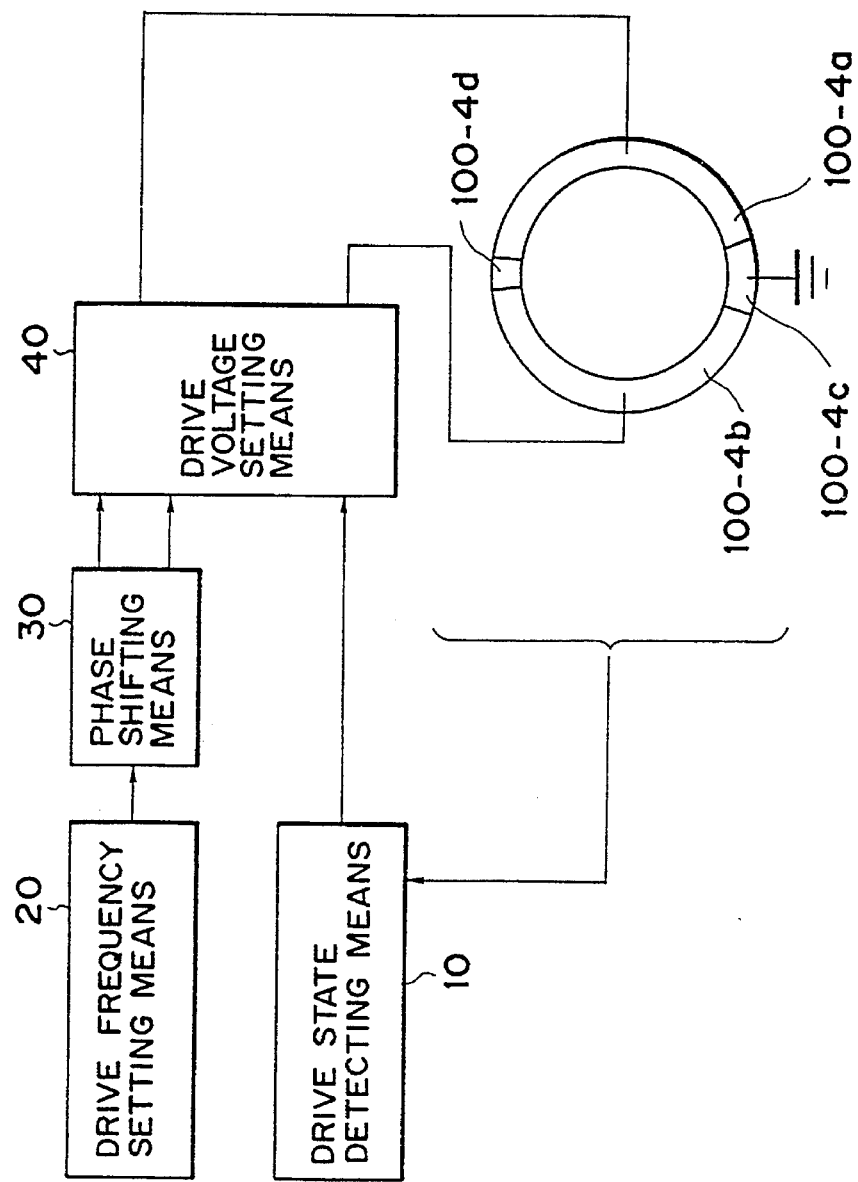
FIGS. 45 and 46 are diagrams of a 10th example.
Figure 46:
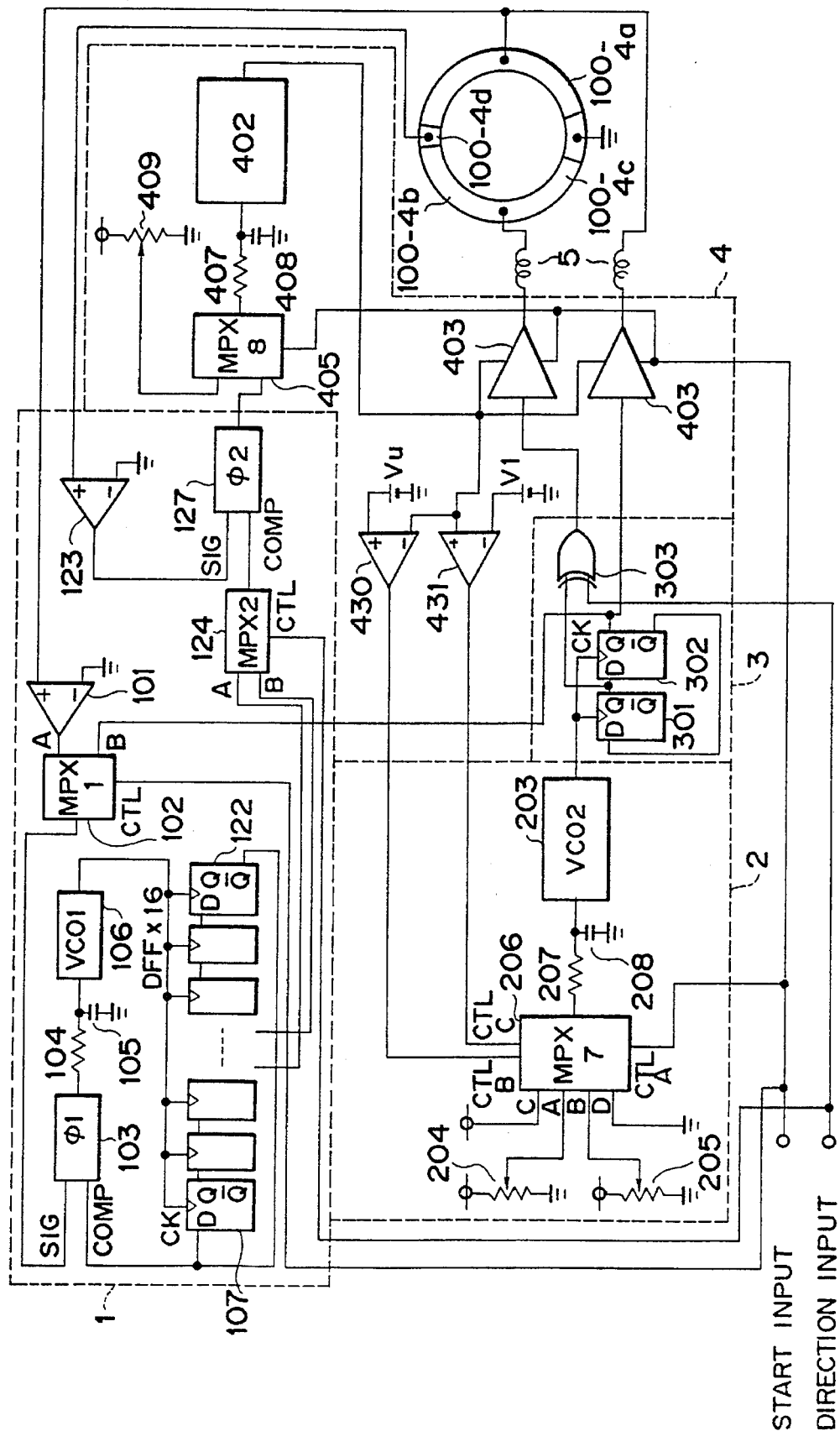

A 10th example is shown in FIGS. 45 and 46. FIG. 45 is a schematic view showing the structure of the present example, in which, different from the foregoing examples, the drive speed is regulated by varying the drive frequency through the drive frequency setting means, and the drive state detecting means 10 controls the drive voltage setting means 40 to vary the drive voltage thereby setting said drive frequency at the antiresonance frequency.

In the present example, the antiresonant state is detected from the phase difference $\phi m$ between the output voltage of the monitor electrode and the drive voltage. Referring to FIG. 9, if the phase difference at the antiresonance frequency is in a state $\phi m1<\phi m11$ or $\phi m2<\phi m21$, the drive frequency is lower than the antiresonance frequency. Thus, according to the relationship between the drive voltage and the antiresonance frequency shown in FIG. 7, an increase in the drive voltage reduces the antiresonance frequency whereby the phase differences $\phi m1$, $\phi m2$ increase without change in the drive frequency to realize a state $\phi m1=\phi m11$ or $\phi m2=\phi m21$. On the other hand, in case of $\phi m1>\phi m11$ or $\phi m2>\phi m21$, where the drive frequency is higher than the antiresonance frequency, a reduction of the drive voltage elevates the antiresonance frequency, whereby the phase differences $\phi m1$, $\phi m2$ decrease without change in the drive frequency to realize a state $\phi m1=\phi m11$ or $\phi m2=\phi m21$. Thus the drive frequency can be matched with the antiresonance frequency.

In brief, the drive frequency setting means 20 is composed of variable resistors 204, 205, a known analog multiplexer 206 (MPX7), a resistor 207, a capacitor 208, and a voltage-controlled oscillator VCO2 same as that in the 4th example. Said multiplexer MPX7 selects the output of the variable resistor 204 in case the start input signal is at the low-level state, or the output of the variable resistor 205 in case said start input signal is at the high-level state, or the input C connected to the power supply to the grounded input D according to the outputs to the drive voltage detecting means 430, 431 to be explained later. Said variable resistor 204 is provided for setting the drive frequency at the motor starting and is so set to obtain a drive frequency capable of starting the motor from the voltage-controlled oscillator VCO2. More specifically, said starting drive frequency is preferably selected higher than the drive frequency where the drive voltage is minimum and the drive speed is maximum, and lower than the drive frequency higher than the above-mentioned drive frequency, where the drive voltage is maximum and the drive speed is zero. More preferably said drive frequency is matched with the antiresonance frequency. As the output of the variable resistor 205 is selected while the motor is driven, the drive speed is regulated by said variable resistor 205. As the output of said drive frequency setting means 20 is divided into ¼ by the frequency dividing/shifting means 30 to provide the drive frequency, the output frequency of said VCO2 is selected at 4 times of the drive frequency.

The drive voltage setting means 40 is different from that of the 5th example shown in FIG. 30 in that a low-pass filter composed of a resistor 407 and a capacitor 408 is connected between the input of the variable output power supply 402 and the output of the drive state detecting means 10, and that the multiplexer MPX8 selects the output of a variable resistor 406 or the output of said drive state detecting means 10 respectively when the start input signal is at the low- or high-level state. The variable resistor 409 sets the output voltage of the variable output power supply 402 at the motor starting. The drive state detecting means 10, functioning as in the 1st example, is composed of a first phase-locked loop for generating cyclic signals with phase differences $\phi m11$ and $\phi m21$ with respect to the drive voltage, a multiplexer MPX2 for selecting said two cyclic signals according to the driving direction, and a phase comparator $\phi 2$ for detecting the phase difference between the cyclic signal selected by said multiplexer MPX2 and the output voltage of the monitor electrode. The wave form shapers 101, 123 are same as those shown in FIG. 30. Said phase comparator $\phi 2$ receives the output of the wave form shaper 123 and the output of the multiplexer MPX2 respectively at the SIG input and COMP input.

Thus, in case the phase difference $\phi m1$ or $\phi m2$ between the drive voltage and the output voltage of the monitor electrode is in a state $\phi m1<\phi m11$ or $\phi m2<\phi m21$, the drive frequency is lower than the antiresonance frequency and the SIG input of the comparator $\phi 2$ is advanced in phase in comparison with the COMP input. Thus the comparator $\phi 2$ releases the power supply voltage according to said phase difference to elevate the output voltage of said low-pass filter, whereby the output voltage of the variable output power supply is elevated to increase the drive voltage for the ultrasonic wave motor, thus reducing the antiresonance frequency. In the opposite case, the comparator $\phi 2$ releases 0 V according to the phase difference to lower the output voltage of said variable output power supply, whereby the drive voltage is reduced to increase the antiresonance frequency. When a state $\phi m1=\phi m11$ or $\phi m2=\phi m21$ is reached through the above-explained operation, the output of the comparator φ2 is insulated whereby the drive voltage is maintained constant. Thus the drive frequency is controlled at the antiresonance frequency.

The ultrasonic wave motor may show troubles such as generation of abnormal noises or an unstable operation if it is driven in the vicinity of the resonance frequency, or with a frequency significantly different from the originally designed drive frequency, or with an excessively high or low drive voltage. Consequently the region of the output frequency of the voltage-controlled oscillator VCO2 is preferably selected at least higher than a frequency where the output voltage of said variable output power supply is minimum and the drive speed is maximum, and lower than a higher frequency where the output voltage of the variable output power supply is maximum and the drive speed is zero, in order to avoid unnecessarily high or low drive voltage, thereby realizing a stable operation. However, if the voltage-controlled oscillator cannot satisfy such conditions, there may be detected the output frequency of the VCO2 and controlled the input to the VCO2 so as to satisfy the above-explained conditions, or there may be employed the procedure of the present example.

In brief, if the maximum drive voltage obtainable with the drive voltage setting means 40 is reached, the input voltage to the voltage-controlled oscillator VCO2 is so controlled that the drive frequency does not become lower than the value corresponding to said maximum drive voltage, and, in this manner the drive frequency of the ultrasonic wave motor does not come close to the resonance frequency where the motor operation becomes unstable. For this purpose the aforementioned drive voltage detecting means is composed of voltage comparators 430, 431 and serves to control the multiplexer MPX7, thus avoiding the above-mentioned troubles in the course of operation of the ultrasonic wave motor. When the voltage comparator 430 detects that the output voltage of the variable output power supply has reached the upper limit, the multiplexer MPX7 selects the input C connected to the power supply, whereby the input voltage of the voltage-controlled oscillator VCO2 is elevated to increase the drive frequency. Thus the output voltage of the variable output power supply is reduced, thus reducing the drive voltage. When the output of the voltage comparator 430 is inverted by the decrease of the output of the variable output power supply and the multiplexer MPX7 again selects the variable resistor 205, the output of the variable output power supply is elevated. When said output again reaches the upper limit through this operation, the above-explained sequence is repeated, so that the drive frequency does not come close to the resonance.

Also in case of increasing the drive frequency by the variable resistor 205 in order to reduce the drive speed, there is selected a minimum drive voltage in said drive voltage setting means and the input to the voltage-controlled oscillator VCO2 is so controlled that the drive frequency does not go higher when the drive voltage reaches said minimum value. This is achieved by switching the multiplexer MPX7 to the grounded input D, upon detection by the voltage comparator 431 that the output voltage of the variable output power supply has reached the lower limit, thereby reducing the drive frequency and thus elevating the drive voltage. This method not only avoids the unstable operation in the vicinity of the resonance frequency but also allows to set a limit in operation at high drive frequency and low drive speed, thereby constantly providing a stable operation. In FIG. 46, Vu and Vl, connected to input ports of the voltage comparators 430,431 are reference voltage supplies for setting the upper and lower limits of said variable output power supply.

Also there can be prevented troubles of the ultrasonic wave motor such as generation of abnormal noises or unstable operation, encountered in case of an excessively high or low drive voltage.

The foregoing examples are designed to maximize the drive efficiency, but it is also possible to effect the control so as to maximize the start torque. It is experimentally confirmed by the present inventor that for a constant drive voltage, the drive frequency F5 providing the maximum start torque is, as shown in FIG. 4, different from and slightly higher than the drive frequency providing the maximum drive efficiency, and that said drive frequency providing the maximum start torque varies in a similar manner as the drive frequency providing the maximum drive efficiency, in response to a change in the drive voltage. Thus the start torque can be maximized through a control similar to that for maximizing the drive efficiency. More specifically, for a drive voltage set by the drive voltage setting means, the drive frequency setting means is so controlled as to bring the drive frequency of the ultrasonic wave motor to the drive frequency maximizing the start torque, according to the output of the drive state detecting means. As an example, in case of control with the phase difference φm, the drive frequency maximizing the start torque is determined experimentally, and the drive frequency is so controlled as to attain a corresponding phase difference. In case the drive frequency is determined in advance, the drive voltage may be controlled so as to attain said phase difference.

A control to a drive frequency providing the maximum output is likewise possible. It is experimentally confirmed that the drive frequency F6 providing the maximum output, as shown in FIG. 4, is lower than the frequency providing the maximum drive efficiency but higher than the frequency providing the maximum speed, and that such frequency providing the maximum output varies similarly to the frequency providing the maximum efficiency, depending on the drive voltage. Also in this case the control can be conducted in a similar manner as in the case of control for the maximum efficiency, for example by the control of the drive frequency according to the phase difference φm. More specifically a phase difference φm corresponding to the drive frequency providing the maximum output is experimentally determined in advance, and the drive frequency is so controlled as to constantly attain said phase difference.

It is therefore possible to maintain the ultrasonic wave motor in the optimum drive state according to the required conditions, by selecting the control for maximizing the drive efficiency, for maximizing the start torque, or for maximizing the output. For example, the motor may be started under the control providing the maximum start torque, and driven with a constant speed under the control maximizing the drive efficiency, and accelerated under the control maximizing the output.

The present invention is not limited to the control for maximizing the drive efficiency, start torque or output but can also be applied to the control to a drive frequency providing any other drive state. Also the desired drive state may be suitably switched or varied in continuous manner.

As explained in the foregoing, the drive state of the ultrasonic wave motor can be controlled to a desired state, by detecting the drive state of said motor by the drive state detecting means.

Similar controls are naturally applicable also to the example shown in FIG. 45.

I claim:

1. A device for driving an ultrasonic wave motor, comprising:

a drive frequency setting circuit for setting the frequency of a drive signal for said ultrasonic wave motor, said drive frequency setting circuit having a reference signal generating circuit for generating a reference signal corresponding to a frequency maximizing the torque at the starting of said motor;

a phase shifting circuit for generating cyclic signals with a mutual phase difference, based on the output of said drive frequency setting circuit;

a drive voltage setting circuit for transforming said cyclic signals from said phase shifting circuit into voltages for driving said ultrasonic wave motor; and a drive state detecting circuit for detecting the drive state of said ultrasonic wave motor and producing a drive state detecting signal on the basis of the detected drive state, said drive frequency setting circuit setting the drive signal frequency at a frequency corresponding to said reference signal on the basis of said reference signal and said drive state detecting signal.

2. A device for driving an ultrasonic wave motor, comprising:

a drive frequency setting circuit for setting the frequency of a drive signal for said ultrasonic wave motor;

a phase shifting circuit for generating cyclic signals with a mutual phase difference, based on the output of said drive frequency setting circuit;

a drive voltage setting circuit for transforming said cyclic signals from said phase shifting circuit into voltages for driving said ultrasonic wave motor, said drive voltage setting circuit having a reference signal generating circuit for generating a reference signal corresponding to a voltage magnitude maximizing the torque at the starting of said motor; and a drive state detecting circuit for detecting the drive state of said ultrasonic wave motor and producing a drive state detecting signal on the basis of the detected drive state, said drive voltage setting circuit setting the drive voltage at a voltage magnitude corresponding to said reference signal on the basis of said reference signal and said drive state detecting signal.

3. A device according to claim 1, wherein said ultrasonic wave motor is of a type including an elastic member and a piezoelectric member provided with at least a pair of input electrodes, and wherein said voltages for driving said ultrasonic wave motor are applied to said pair of input electrodes.

4. A device according to claim 2, wherein said ultrasonic wave motor is of a type including an elastic member and a piezoelectric member provided with at least a pair of input electrodes, and wherein said voltages for driving said ultrasonic wave motor are applied to said pair of input electrodes.

* * * * *